(12) United States Patent
Heo et al.

(10) Patent No.: US 9,965,176 B2
(45) Date of Patent: May 8, 2018

(54) TRANSPARENT DISPLAY DEVICE AND OPERATION METHOD THEREOF

(71) Applicant: LG ELECTRONICS INC., Seoul (KR)

(72) Inventors: Jeongyun Heo, Seoul (KR); Shinnyue Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

(21) Appl. No.: 14/922,966

(22) Filed: Oct. 26, 2015

(65) Prior Publication Data

US 2017/0017388 A1    Jan. 19, 2017

(30) Foreign Application Priority Data

Jul. 14, 2015    (KR) .......................... 10-2015-0100082

(51) Int. Cl.
| | |
|---|---|
| *G06F 3/00* | (2006.01) |
| *G06F 3/0488* | (2013.01) |
| *G06F 3/0482* | (2013.01) |
| *G06F 3/0346* | (2013.01) |
| *G06F 3/041* | (2006.01) |
| *G06F 3/0484* | (2013.01) |
| *G06T 11/60* | (2006.01) |

(52) U.S. Cl.
CPC ........ *G06F 3/04883* (2013.01); *G06F 3/0346* (2013.01); *G06F 3/0414* (2013.01); *G06F 3/0482* (2013.01); *G06F 3/04845* (2013.01); *G06T 11/60* (2013.01); *G06F 2203/04803* (2013.01); *G06F 2203/04808* (2013.01)

(58) Field of Classification Search
CPC .................................................... G06F 1/1618
See application file for complete search history.

(56) References Cited

U.S. PATENT DOCUMENTS

| | | | |
|---|---|---|---|
| 9,519,371 B2 * | 12/2016 | Nishida | G06F 3/04886 |
| 2006/0034043 A1 * | 2/2006 | Hisano | G06F 1/1616 361/679.04 |
| 2012/0327122 A1 | 12/2012 | Imamura | |
| 2014/0009415 A1 | 1/2014 | Nishida | |
| 2014/0164976 A1 | 6/2014 | Kim et al. | |
| 2015/0123916 A1 * | 5/2015 | Inomata | G06F 1/1643 345/173 |

FOREIGN PATENT DOCUMENTS

EP    2703976    3/2014

OTHER PUBLICATIONS

European Patent Office Application Serial No. 15194218.6, Search Report dated Dec. 20, 2016, 9 pages.

* cited by examiner

*Primary Examiner* — Jeffrey A Gaffin
*Assistant Examiner* — Ayesha Huertas Torres
(74) *Attorney, Agent, or Firm* — Lee, Hong, Degerman, Kang & Waimey

(57) ABSTRACT

A transparent display device is provided. The transparent display device include a display unit is configured to receive a front side touch input and a rear side touch input and display information, and a controller is configured to receive a grip unfolding input for unfolding a two side grip input for touching front and rear sides of the display unit in a predetermined direction, and control the display unit to display a plurality of objects according to the received grip unfolding input.

16 Claims, 80 Drawing Sheets

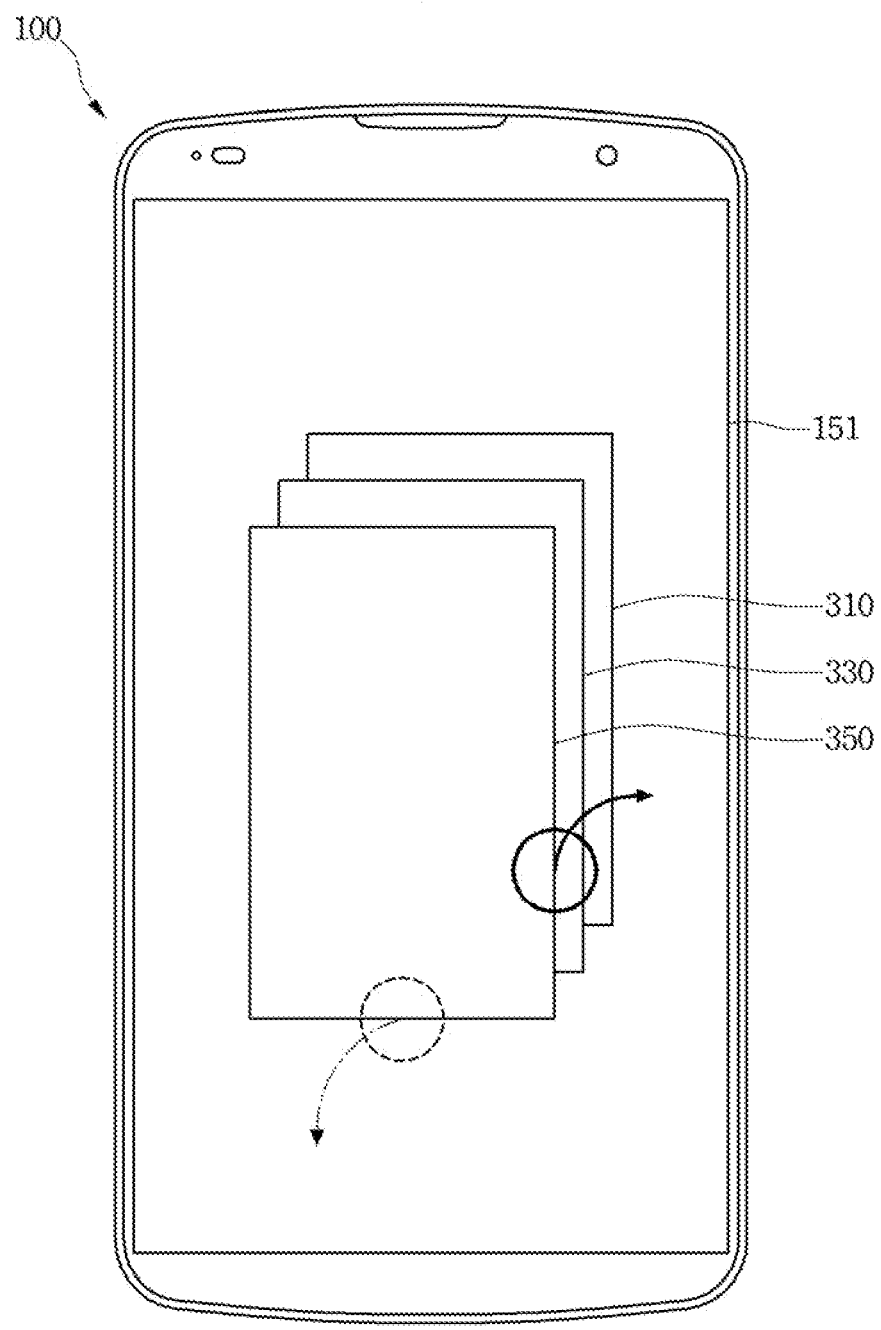

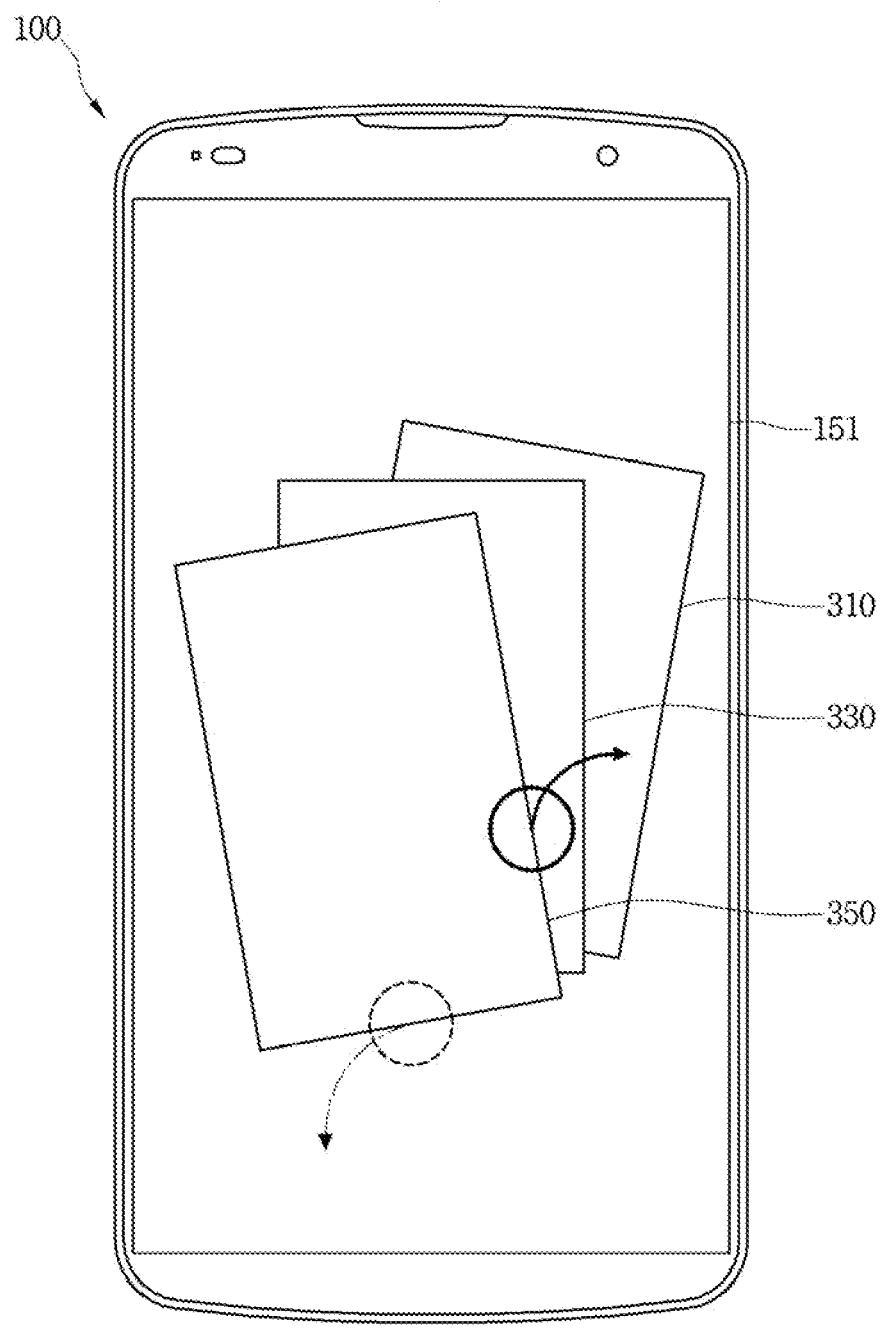

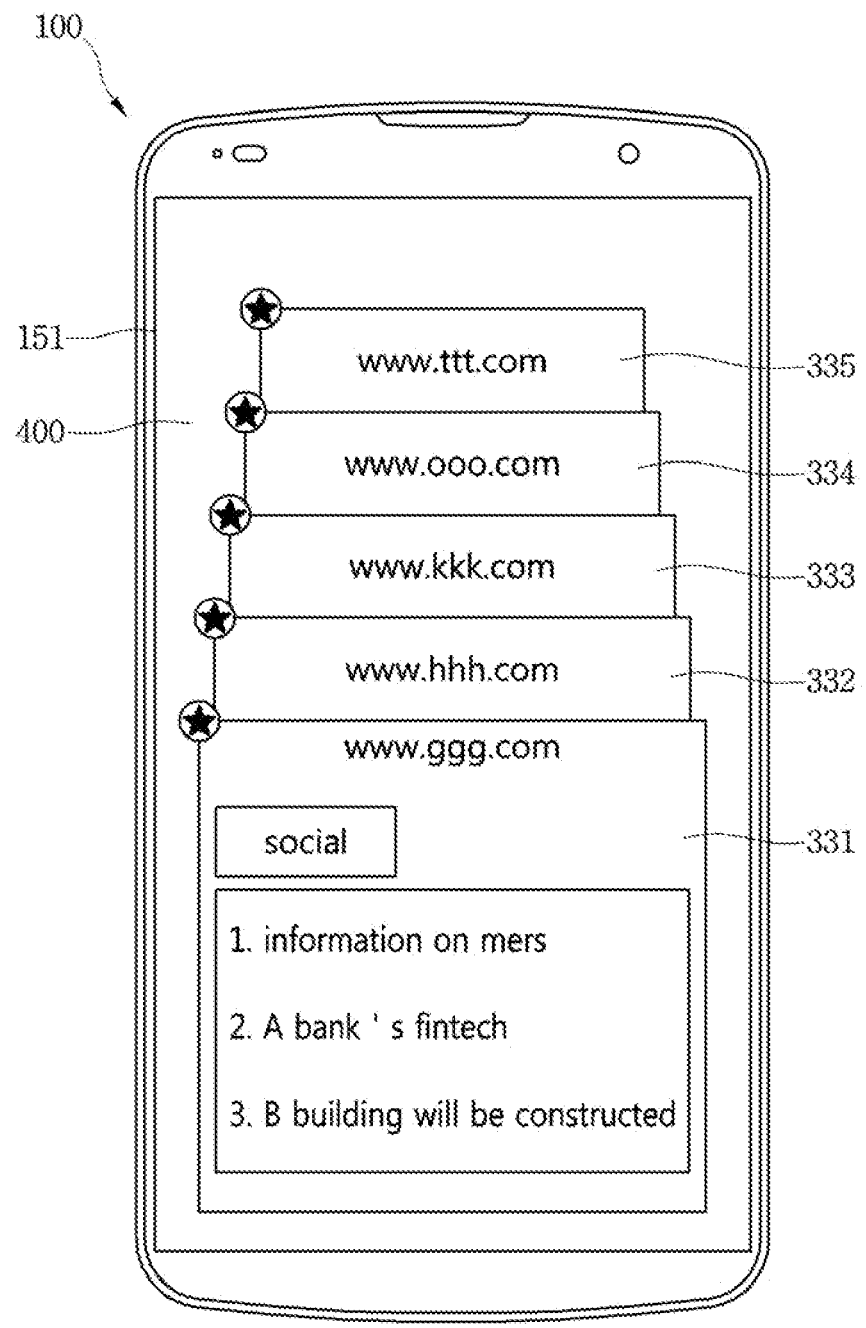

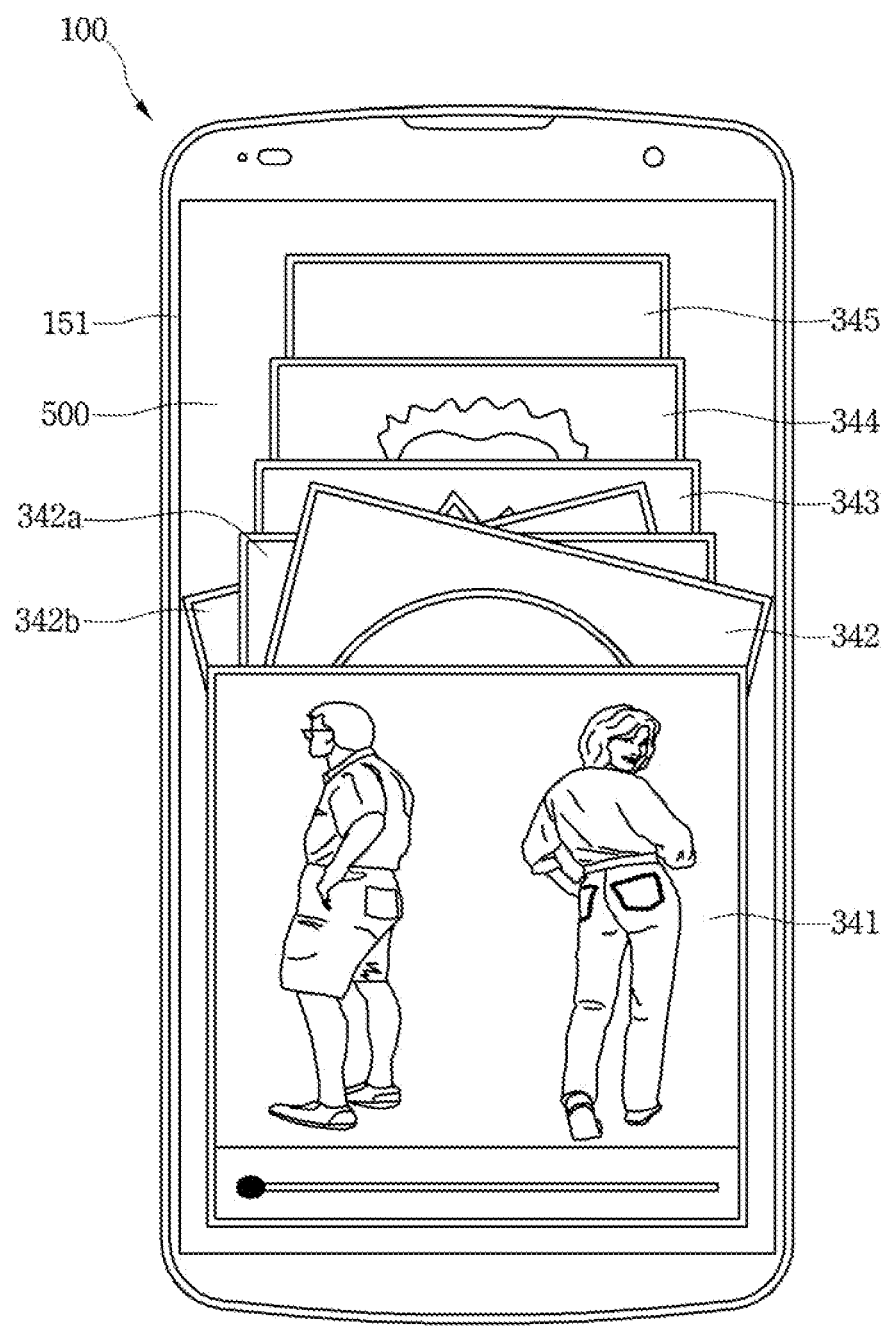

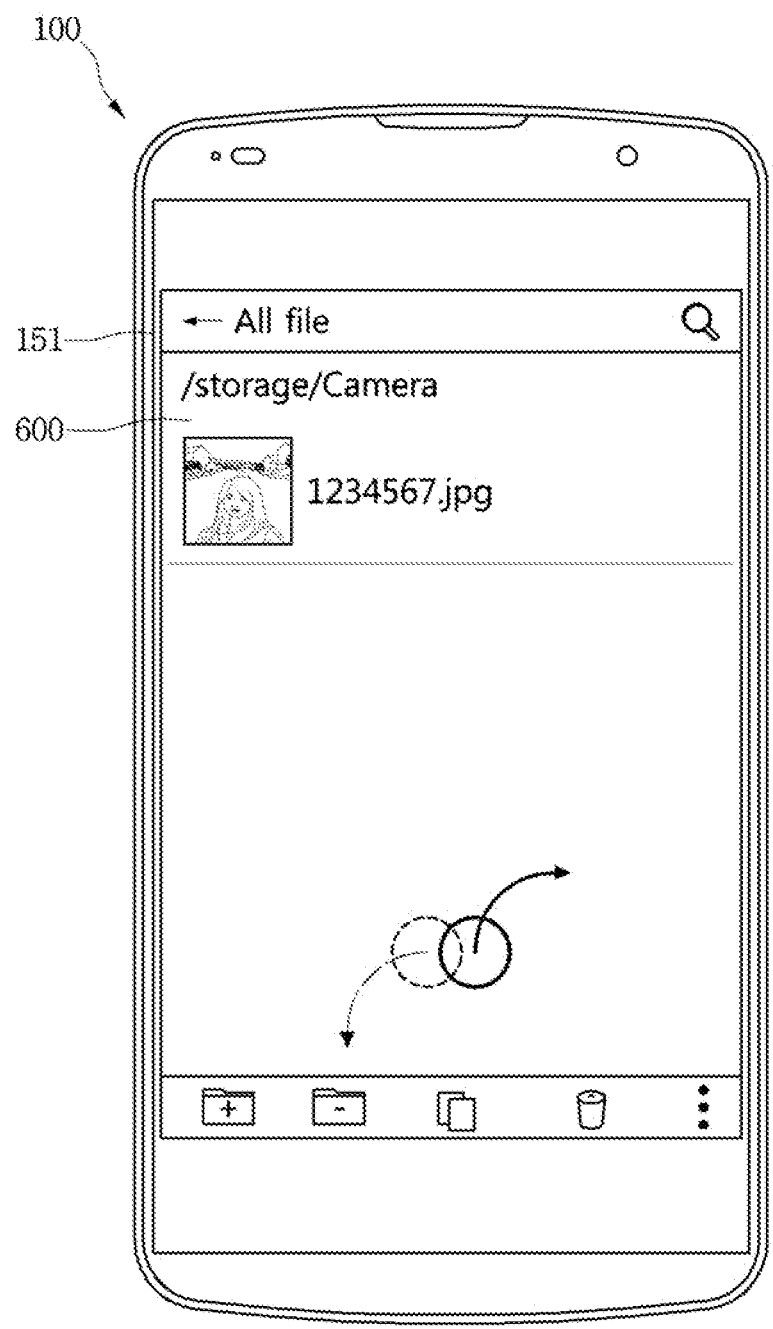

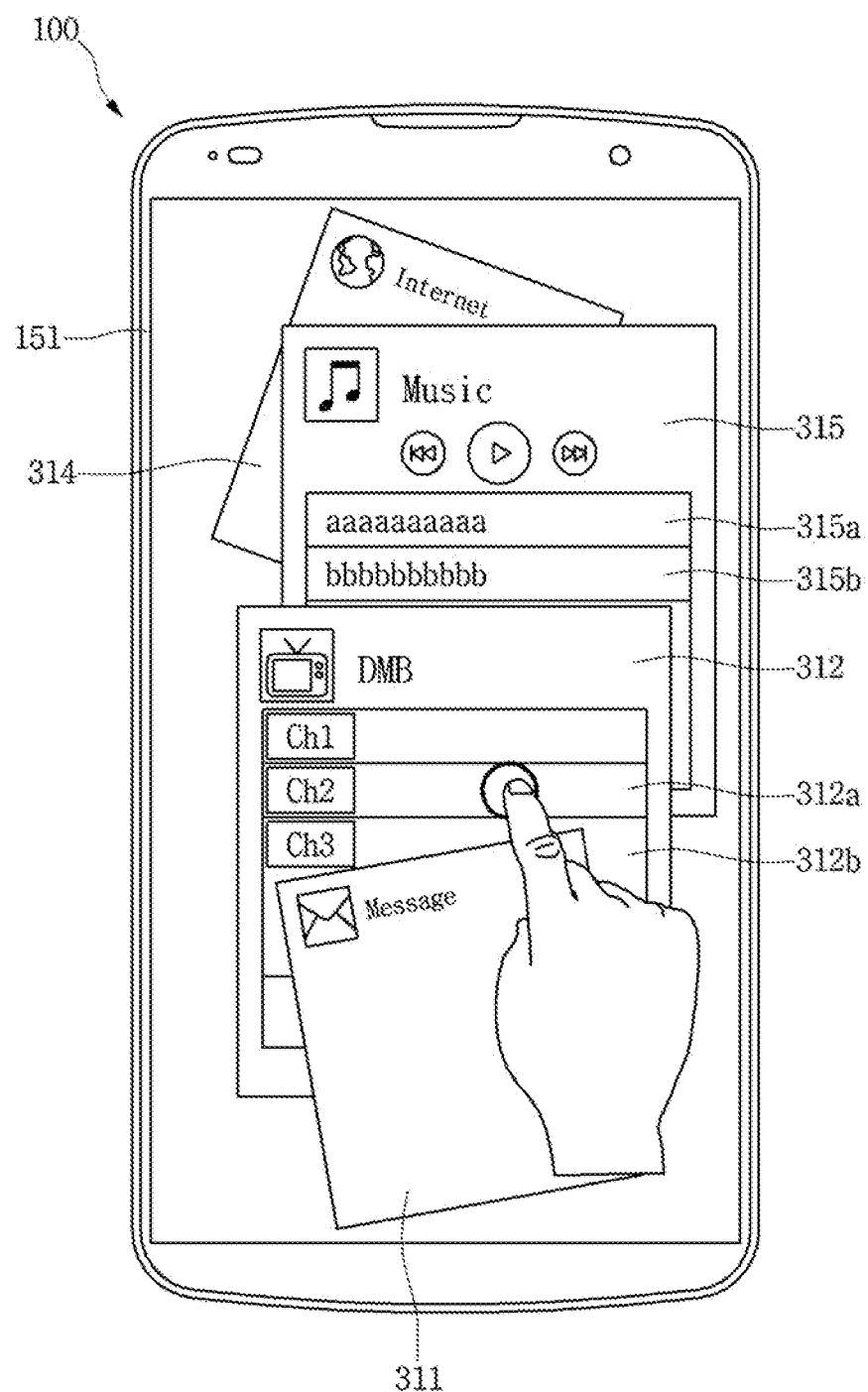

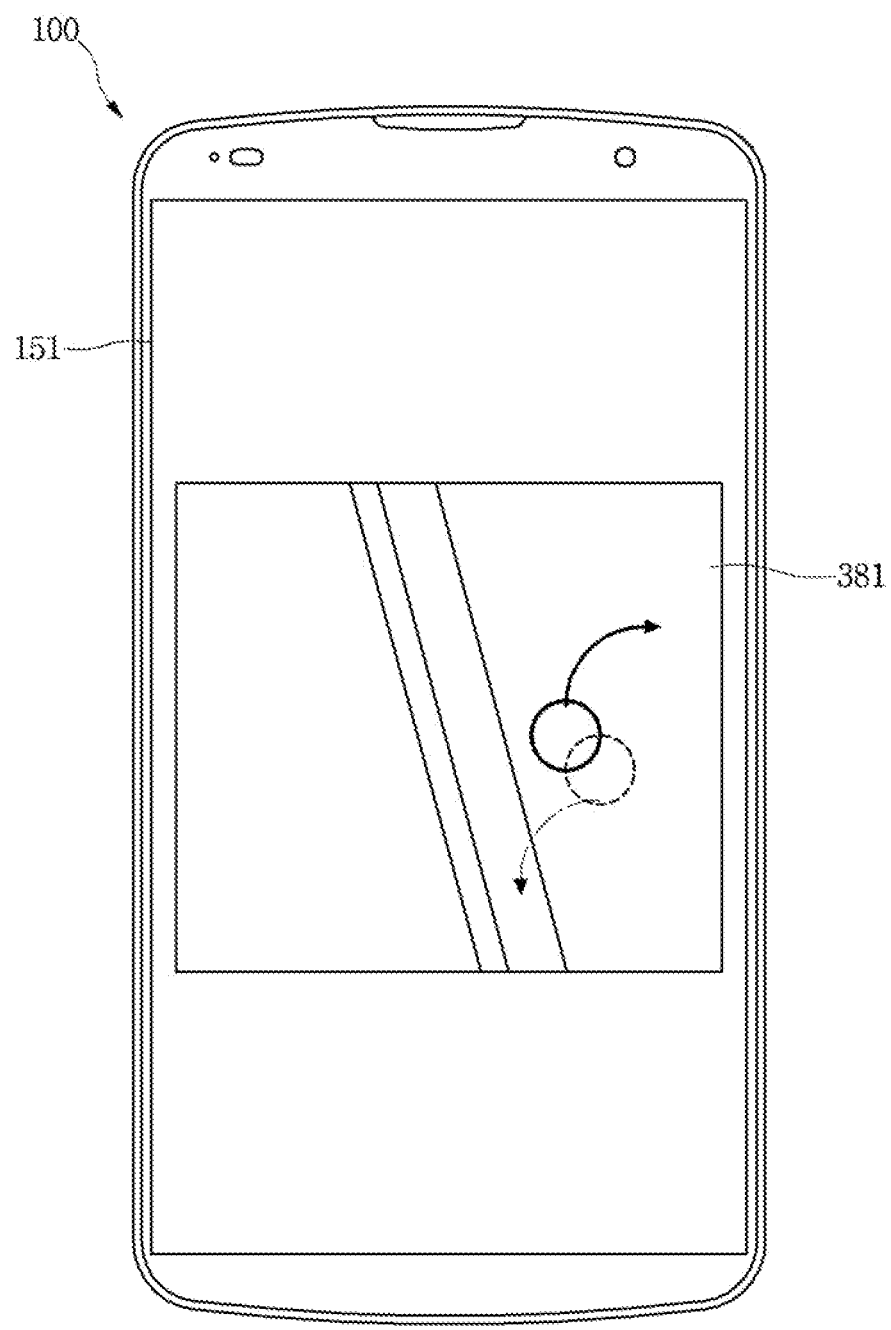

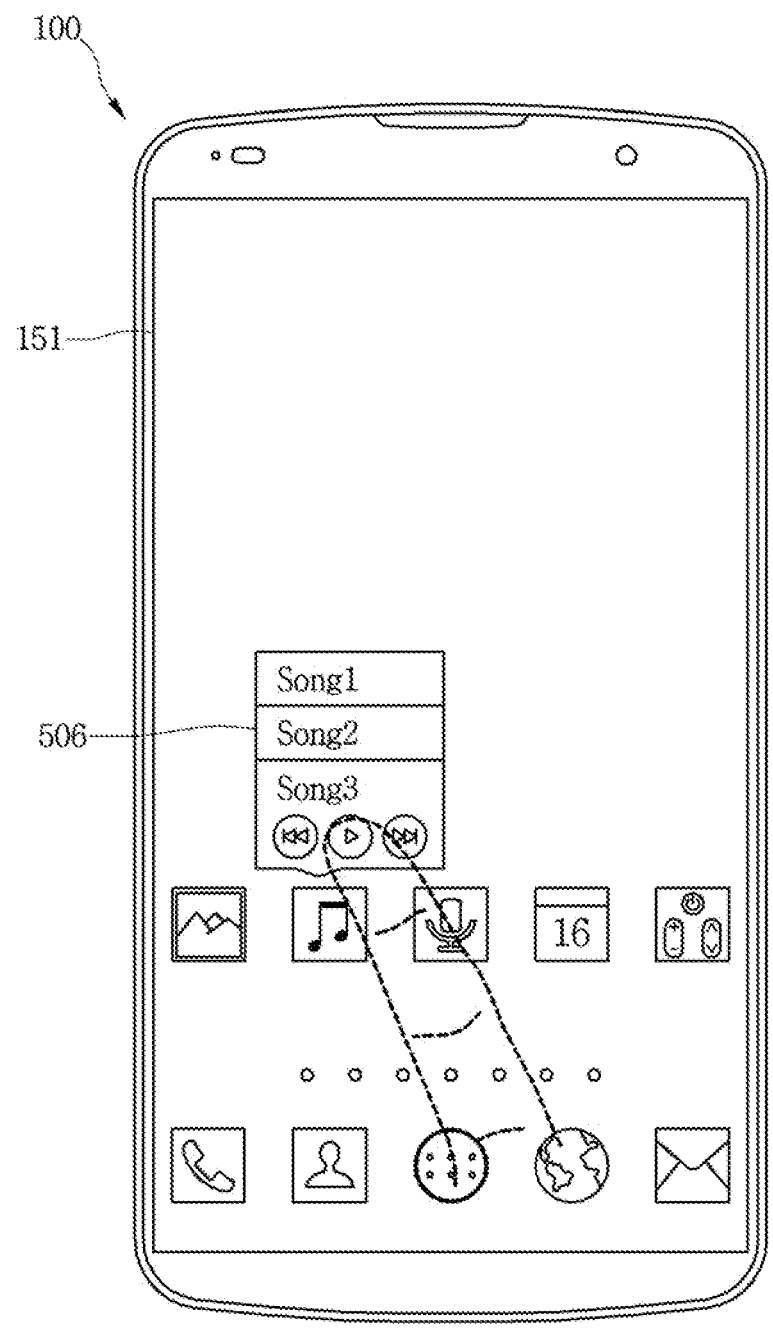

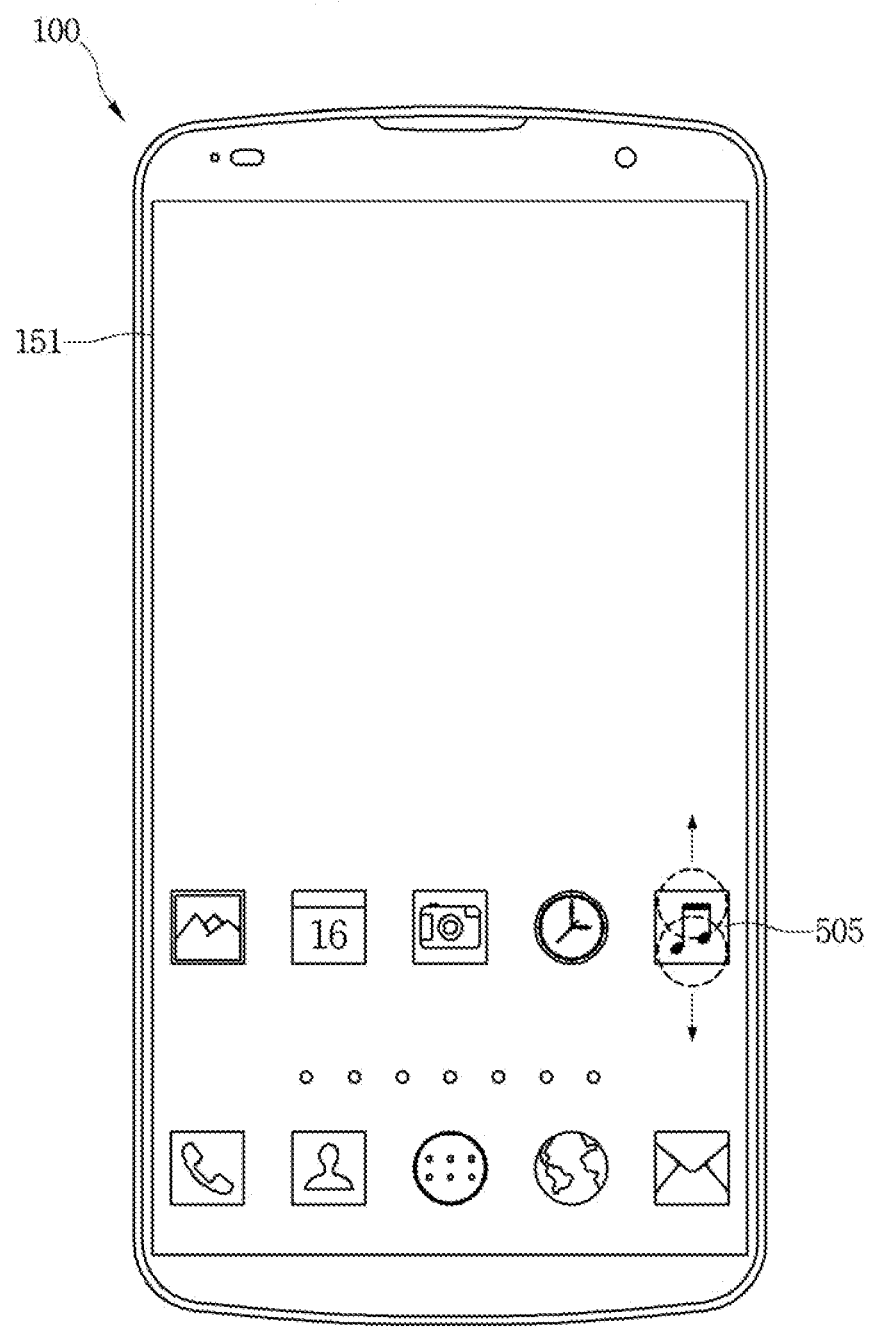

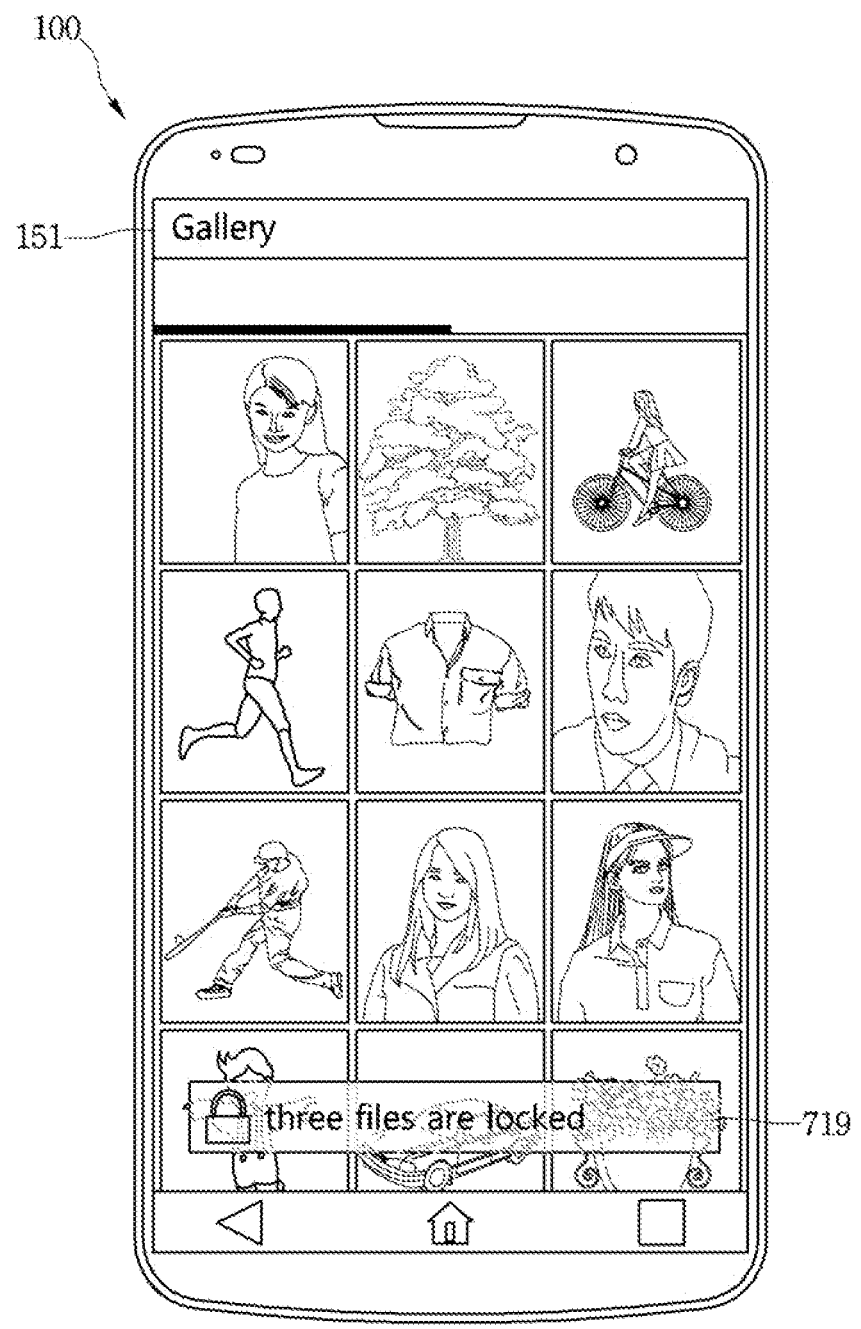

TRANSPARENT DISPLAY DEVICE AND OPERATION METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0100082, filed on Jul. 14, 2015, the contents of which are hereby incorporated by reference herein their entirety.

BACKGROUND

The present invention relates to a transparent display device and an operating method thereof, and particularly to, a transparent display device and an operating method capable of executing various operations according to an input obtained on the transparent display unit.

Recently, techniques for using transparent display devices are being actively developed. The transparent display device is a display for allowing light incident from the rear side to be transmissible and may display a graphic image at the same time.

The transparent display device is realized in a form including a transparent oxide semiconductor film to have a transparent property. Through the transparent display, a user may observe a graphic image displayed on the transparent display device while observing light incident from the rear side of an electronic device. Accordingly, spatial and temporal limitations on existing display devices may be resolved.

However, the existing transparent display device may be controlled only through a touch input on the front side thereof.

SUMMARY

Embodiments provide a transparent display device capable of executing various operations through a touch input from the front and/o rear sides of the transparent display device and an operation method thereof.

In one aspect of the present invention, a transparent display device is provided. The device includes a display unit configured display information and a controller configured to receive a first two side grip input for touching a point on a front side of the display unit and a point on a rear side of the display unit, receive a first grip unfolding input for unfolding the first two side grip input in a predetermined manner and control the display unit to display a plurality of objects according to the received first grip unfolding input.

It is contemplated that the controller is further configured to receive a second two side grip input for touching one of the plurality of displayed objects on both the front side of the display unit and the rear side of the display unit, receive a second grip unfolding input for unfolding the second two side grip input in a predetermined manner and control the display unit to display a plurality of lower layer objects according to the received second grip unfolding input, the plurality of lower layer objects related to the touched one of the plurality of displayed objects. It is further contemplated that the touched one of the plurality of displayed objects corresponds to a screen of a recently accessed web site and each of the displayed plurality of lower layer objects corresponds to a screen previously accessed via the web site.

It is contemplated that the controller is further configured to receive a second two side grip input for touching two of the plurality of displayed objects on both the front side of the display unit and the rear side of the display unit, receive a second grip unfolding input for unfolding the second two side grip input in a predetermined manner and control the display unit to change an arrangement of the displayed plurality of objects according to the received second grip unfolding input. It is further contemplated that the controller is further configured to control the display unit to adjust an interval between the plurality of displayed objects according to an unfold distance of the received second grip unfolding input.

It is contemplated that the controller is further configured to receive a second two side grip input for touching two of the plurality of displayed objects on both the front side of the display unit and the rear side of the display unit and control the display unit to display a first execution screen and a second execution screen in response to the received second two side grip input, the first execution screen corresponding to one of the two touched objects and the second execution screen corresponding to the other of the two touched objects. It is further contemplated that the plurality of displayed objects are related to information displayed on the display unit prior to receiving the first two side grip input.

It is contemplated that the first two side grip input and the first grip unfolding input are received when a home screen is displayed on the display unit and each of the plurality of displayed objects corresponds to either an execution screen of a recently executed application or an execution screen of an application registered as a favorite. It is further contemplated that the controller is further configured to receive the first grip unfolding input in a manner other than the predetermined and control the display unit to display a plurality of different types of objects among the plurality of objects. Preferably, the first grip unfolding input comprises an input for moving the touched point on the front side of the display unit in a first direction and an input for moving the touched point on the rear side of the display unit in a second direction.

In another aspect of the present invention, a method of operating a transparent display device comprising a display unit is provided. The method includes receiving a first two side grip input for touching a point on a front side of the display unit and a point on a rear side of the display unit, receiving a first grip unfolding input for unfolding the first two side grip input in a predetermined manner and controlling the display unit to display a plurality of objects according to the received first grip unfolding input.

It is contemplated that the method further includes receiving a second two side grip input for touching one of the plurality of displayed objects on both the front side of the display unit and the rear side of the display unit, receiving a second grip unfolding input for unfolding the second two side grip input in a predetermined manner and controlling the display unit to display a plurality of lower layer objects according to the received second grip unfolding input, the plurality of lower layer objects related to the touched one both of the plurality of displayed objects. It is further contemplated that the touched one of the plurality of displayed objects corresponds to a screen of a recently accessed web site and each of the displayed plurality of lower layer objects corresponds to a screen previously accessed via the web site.

It is contemplated that the method further includes receiving a second two side grip input for touching two of the plurality of displayed objects on both the front side of the display unit and the rear side of the display unit, receiving a second grip unfolding input for unfolding the second two side grip input in a predetermined manner and controlling the display unit to change an arrangement of the displayed plurality of objects according to the received second grip unfolding input. It is further contemplated that the method further includes controlling the display unit to adjust an interval between the plurality of displayed objects according to an unfold distance of the received second grip unfolding input.

It is contemplated that the method further includes receiving a second two side grip input for touching two of the plurality of displayed objects on both the front side of the display unit and the rear side of the display unit and controlling the display unit to display a first execution screen and a second execution screen in response to the received second two side grip input, the first execution screen corresponding to one of the two touched objects and the second execution screen corresponding to the other of the two touched objects. It is further contemplated that the plurality of displayed objects are related to information displayed on the display unit prior to receiving the first two side grip input.

It is contemplated that the first two side grip input and the first grip unfolding input are received when a home screen is displayed on the display unit and each of the plurality of displayed objects corresponds to either an execution screen of a recently executed application or an execution screen of an application registered as a favorite. It is further contemplated that the method further includes receiving the first grip unfolding input in a manner other than the predetermined and controlling the display unit to display a plurality of different types of objects among the plurality of objects. Preferably, the grip unfolding input comprises an input for moving the touched point on the front side of the display unit in a first direction and an input for moving the touched point on the rear side of the display unit in a second direction.

The details of one or more embodiments are set forth in the accompanying drawings and the description below. Other features will be apparent from the description and drawings, and from the claims.

BRIEF DESCRIPTION OF THE DRAWINGS

FIGS. 6A, 6B and 6C are views for explaining an example for displaying a plurality of objects in response to the grip unfolding input according to an embodiment.

FIGS. 9A and 9B are views for explaining an embodiment in which other kinds of objects are provided based on a direction that the two side grip input is unfolded.

FIGS. 10A, 10B and 10C are views for explaining another embodiment for displaying a plurality of objects related to information, which is displayed on the display unit, according to reception of the grip unfolding input.

FIGS. 11A and 11B are views for explaining another embodiment for displaying a plurality of objects related to information, which is displayed on the display unit, according to input of the grip unfolding input.

FIGS. 13A, 13B, 13C, 13D and 13E are views for explaining an example for displaying, on an object, an execution screen of an application corresponding to the object that is a target of the two side grip input, when an interval between objects is a predetermined distance or longer.

FIGS. 15A, 15B and 15C are views for explaining another embodiment for displaying a plurality of objects related to information displayed on the display unit according to reception of the grip unfolding input.

FIGS. 17A, 17B, 17C and 17D are views for explaining a function providable in response to a rear touch input to an app icon according to another embodiment.

FIGS. 18A, 18B and 18C are views for explaining a function providable in response to a pinch-in or pinch-out input for an app icon on the rear side of the display unit according to an embodiment.

FIGS. 20A, 20B, 20C, 20D and 20E are views for explaining a function provided in response to a two side grip input for touching two sides of content according to an embodiment.

DETAILED DESCRIPTION OF THE EMBODIMENTS

Reference will now be made in detail to the embodiments of the present disclosure, examples of which are illustrated in the accompanying drawings, in which like numbers refer to like elements throughout, and a repetitive explanation will be omitted.

In the following description, usage of suffixes such as 'module', 'part' or 'unit' used for referring to elements is given merely to facilitate explanation of the present invention, without having any significant meaning by itself. In the following description, detailed descriptions of well-known functions or constructions will be omitted since they would obscure the invention in unnecessary detail. In addition, the accompanying drawings are used to help easily understand the technical idea of the present invention and it should be understood that the idea of the present invention is not limited by the accompanying drawings. This invention should not be construed as limited to predetermined disclosure forms, and the spirit and scope of the invention should be understood as incorporating various modifications, equivalents and substitutions.

It will be understood that, although the terms first, second, etc. may be used herein to describe various elements, these elements should not be limited by these terms. These terms are only used to distinguish one element from another.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

As used herein, the singular forms "a," "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof.

A transparent display device described herein may include a mobile phone, a smart phone, a laptop computer, a digital broadcast terminal, a personal digital assistants (PDA), a portable multimedia player (PMP), a navigator, a slate PC, a tablet PC, an ultrabook, a wearable device (for example, a smart watch, a smart glass, or a head mounted display (HMD)).

However, those skilled in the art may easily understand that a configuration according to an embodiment is also applicable to a stationary terminal such as a digital TV, desktop computer, or digital signage, except for a case where the configuration is only applicable to a transparent display device.

Figure 1:
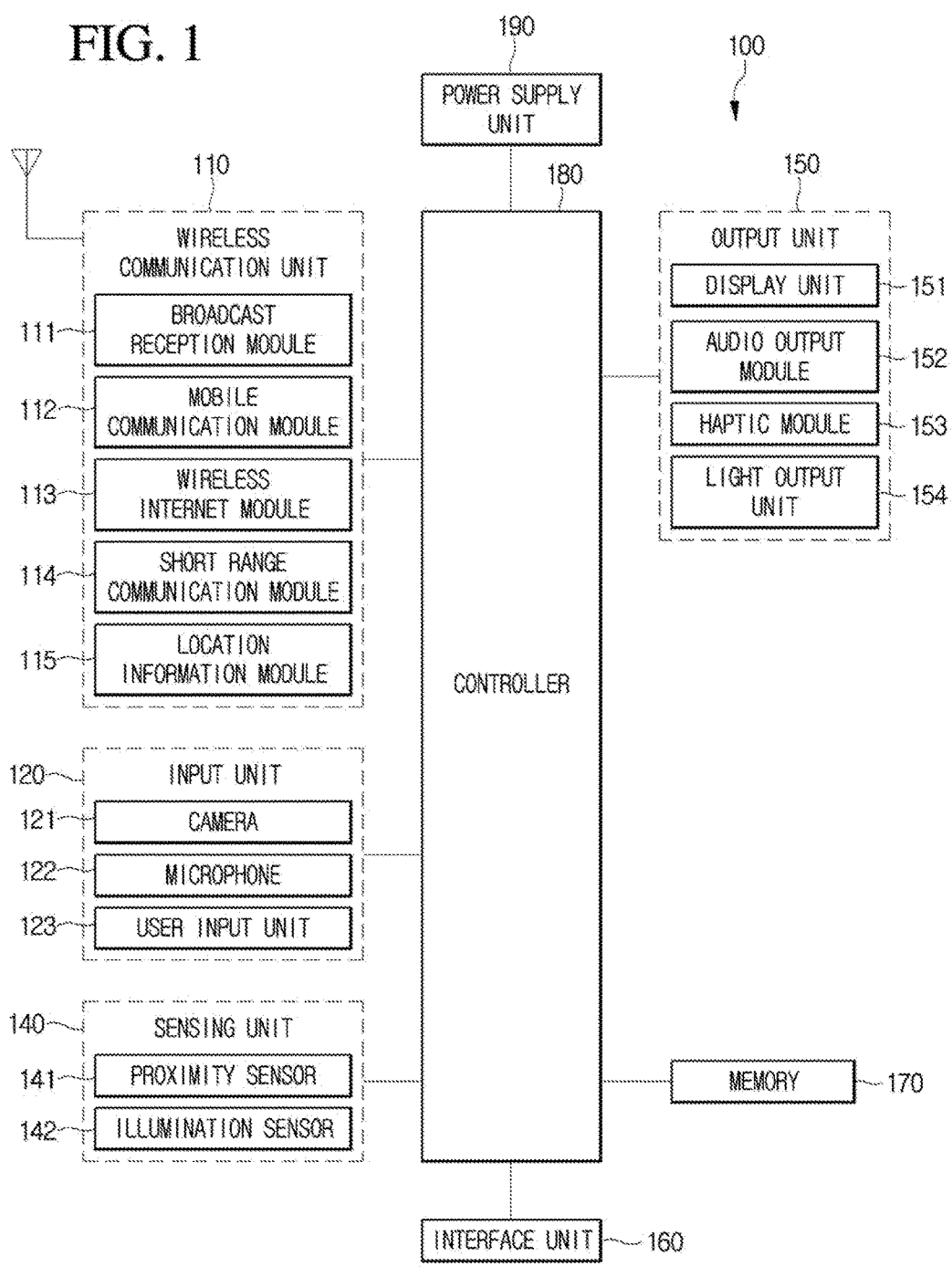
FIG. 1 is a block diagram for explaining a transparent display device related to an embodiment.

FIG. 1 is a block diagram for explaining a transparent display device related to an embodiment.

The transparent display device 100 may include a wireless communication unit 110, an input unit 120, a sensing unit 140, an output unit 150, an interface unit 160, a memory unit 170, a controller 180, and a power supply unit 190. Since the elements illustrated in FIG. 1 are not essential for realizing a transparent display device, a transparent display device to be described herein may include more or fewer elements than the above-described.

The wireless communication unit 110 may include one or more modules enabling wireless communication between the transparent display device 100 and a wireless communication system, between the transparent display device 100 and another transparent display device 100, or between the transparent display device 100 and an external server. In addition, the wireless communication 110 may include one or more modules connecting the transparent display device 100 to one or more networks.

The wireless communication unit 110 may include at least one of a broadcast reception module 111, a mobile communication module 112, a wireless Internet module 113, a short range communication module 114, and a location information module 115.

The input unit 130 may include a camera 121 or an image input unit for an image signal input, a microphone 122 or an audio input unit for inputting an audio signal, a user input unit 123 (e.g., a touch key, a mechanical key, etc.) for receiving information from a user. Voice data or image data collected by the input unit 120 may be analyzed and processed with user's control commands.

The sensing unit 140 may include at least one sensor for sensing at least one of surrounding environment information around the transparent display device and user information. For example, the sensing unit 140 may include at least one selected from a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera (see 121)), a microphone (see 122), a battery gauge, an environmental sensor (e.g., a barometer, a hygrometer, a thermometer, a radiation sensor, a thermal sensor, a gas detection sensor, etc.), a chemical sensor (e.g., an e-nose, a healthcare sensor, a biometric sensor, etc.). Furthermore, the transparent display device disclosed herein may combine and use information sensed by at least two sensors among those sensors.

The output unit 150 is for generating an output related to sense of sight, sense of hearing, or sense of touch, and may include at least one selected from a display unit 151, an audio output unit 152, a haptic module 153, and a light output unit 154. The display unit 151 may form a mutually layered structure with, or be formed into one with a touch sensor, and realize a touch screen. Such a touch screen may not only function as the user input unit 123 providing an input interface between the transparent display device 100 and the user, but also provide an output interface between the transparent display device 100 and the user.

The interface unit 160 plays a role of a passage with various kinds of external devices connected to the transparent display device 100. This interface unit 160 may include at least one selected from a wired/wireless headset port, an external charger port, a wired/wireless data port, a memory card port, a port connecting a device having an identification module prepared therein, an audio input/output (I/O) port, a video input/output (I/O) port, and an earphone port. In the transparent display device 100, a proper control may be performed on a connected external device in correspondence to connection between the external device and the interface unit 160.

In addition, the memory 170 stores data for supporting various functions of the transparent display device 100. The memory 170 may store a plurality of application programs or applications driven in the transparent display device 100, data for operations of the transparent display device 100, and instructions. At least a part of these application programs may be downloaded from an external server through wireless communication. In addition, at least a part of these application programs may exist in the transparent display device 100 at the time of release for basic functions (e.g., a call originating or receiving function, a message transmitting and receiving function). Moreover, the application programs are stored in the memory 170 and installed in the transparent display device 100, and then may be driven to conduct operations (or functions) of the transparent display device by the controller 180.

The controller 180 typically controls overall operations of the transparent display device 100 besides operations related to the application programs. The controller 180 may provide the user with, or process proper information or functions by processing a signal, data, or information input or output through the above-described elements, or driving the application programs stored in the memory 170.

In addition, the controller 180 may control at least a part of the elements illustrated in FIG. 1 so as to drive the application programs stored in the memory 170. Furthermore, the controller 180 may combine at least two elements among the elements included in the transparent display device 100 and operate the combined.

The power supply unit 190 receives internal or external power under a control of the controller 180 and supplies the power to each element included in the transparent display device 100. The power supply unit 190 includes a battery and the battery may be an embedded type battery or a replaceable battery.

At least a part of the elements may operate in cooperation with each other for realizing an operation, control, or control method of the transparent display device according to various embodiments. In addition, the operation, control, or control method of the transparent display device may be realized in the transparent display device by driving at least one application program stored in the memory 170.

Hereinafter, prior to describing various embodiments realized through the transparent display device 100, the above-described elements will be described in detail with reference to FIG. 1.

Firstly, in the wireless communication unit 110, the broadcast reception module 111 receives a broadcast signal and/or broadcast related information from an external broadcast management server through a broadcast channel. The broadcast channel may include a satellite channel or terrestrial channel. Two or more broadcast reception modules may be provided to the transparent display device 100 for simultaneous broadcast reception or broadcast channel switching for at least two broadcast channels.

The mobile communication module 112 may transmit and receive wireless signals to and from at least one selected from a base station, an external terminal, and a server on a mobile communication network constructed according to technical standards or communication schemes for the mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A) etc.).

The wireless signal may include data in various types according to transmission and reception of a voice call signal, video call signal, or character/multimedia message.

The wireless Internet module 113 refers to a module for a wireless Internet connection, and may be embedded in or prepared outside the transparent display device 100. The wireless Internet module 113 is configured to transmit and receive a wireless signal over a communication network conforming to wireless Internet technologies.

The wireless Internet technologies include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and LTE-Advanced (LTE-A), and the wireless Internet module 113 transmits and receives data according to at least one wireless Internet technology within the range of including Internet technology not described in the above.

From a viewpoint that an access to the wireless Internet through WiBro, HSDPA, HSUPA, GSM, CDMA, WCDMA, LTE, or LTE-A is conducted through a mobile communication network, the wireless Internet module 113 accessing the wireless Internet through the mobile communication network may be understood as a kind of the mobile communication module 112.

The short range communication module 114 is for short range communication and may support the short range communication by using at least one selected from Bluetooth™, Radio Frequency Identification (RFID), Infrared Data Association (IrDA), Ultra Wideband UWB), ZigBee™, Near Field Communication (NFC), Wi-Fi, Wi-Fi Direct, and Wireless Universal Serial Bus (Wireless USB) technologies. This short range communication module 114 may support, through a wireless area network, wireless communication between the transparent display device 100 and a wireless communication system, between the transparent display device 100 and another transparent display device 100, or between the transparent display device 100 and a network on which the other transparent display device 100 or an external server is located. The wireless area network may be a wireless personal area network.

Here, the other transparent display device 100 may be a wearable device (e.g., a smart watch, a smart glass, or an HMD) through which data is mutually exchangeable (or interlockable) with the transparent display device 100 according to an embodiment. The short range communication module 114 may detect (or recognize) a wearable device capable of communicating with the transparent display device 100. Furthermore, when the detected wearable device is authenticated to communicate with the transparent display device 100, the controller 180 may transmit at least a part of data processed in the transparent display device 100 to the wearable device through the short range communication module 114. Therefore, a user of the wearable device may use the data processed by the transparent display device 100 through the wearable device. For example, when a call is received by the transparent display device 100, the user may perform a phone call through the wearable device, or when a message is received by the transparent display device 100, the user may check the received message through the wearable device.

The positioning module 115 is a module for obtaining a position of the transparent display device, and as a representative example thereof, there is a global positioning system (GPS) module or Wi-Fi module. For example, when adopting the GPS module, the transparent display device may obtain a location of the transparent display device by using a signal transmitted from a GPS satellite. For another example, when adopting the Wi-Fi module, the transparent display device may obtain the location of the transparent display device on the basis of information on a wireless access point (AP) transmitting or receiving a wireless signal with the Wi-Fi module. If necessary, the location information module 115 may alternatively or additionally perform any function of other modules in the wireless communication unit 110 for obtaining data for the location of the transparent display device 100. The location information module 115 is a module used for obtaining the location (or current location) of the transparent display device, and is not limited to a module directly calculating or obtaining the location of the transparent display device.

Next, the input unit 120 is for receiving image information (or an image signal), audio information (or an audio signal), data, or information input from the user, and may include one or a plurality of cameras 121 for an input of image information. The camera 121 processes an image frame such as a still image or video obtained by an image sensor in a video call mode or capturing mode. The processed image frame may be displayed on the display unit 151 or stored in the memory 170. Furthermore, the plurality of cameras 121 prepared in the transparent display device 100 may be arranged to form a matrix structure, and, through the cameras 121 forming this matrix structure, information on images having different angles or different focuses may be input to the transparent display device 100. In addition, the plurality of cameras 121 may be arranged in a stereo structure to obtain left and right images for realizing a stereoscopic image.

The microphone 122 may process an external sound signal as electrical voice data. The processed voice data may be variously used according to a function (or an application program) being performed in the transparent display device 100. Furthermore, various noise removing algorithms may be implemented for removing noise occurring in a process for receiving the external sound signal.

The user input unit 123 is for receiving information from the user. When information is input through the user input unit 123, the controller 180 may control an operation of the transparent display device 100 in correspondence to the input information. This user input unit 123 may include a mechanical input unit (or mechanical key, for example, buttons positioned on the front and rear sides or on the side sides, a dome switch, a jog wheel, or a jog switch, etc.) and a touch type input unit. As an example, the touch type input unit may be configured with a virtual key displayed on a touch screen through a software processing, a soft key, or a visual key, or a touch key disposed on a portion other than the touch screen. In addition, the virtual key or the visual key may be displayed on the touch screen in various types and, for example, may be configured with graphics, texts, icons, videos, or a combination thereof.

Furthermore, the sensing unit 140 may sense at least one of environmental information surrounding the transparent display device 100 and user information, and generate a sensing signal corresponding to the sensed information. The controller 180 may control driving or operations of the transparent display device 100, or perform data processing, a function, or an operation related to an application program installed in the transparent display device 100, on the basis of the sensing signal. Hereinafter, representative sensors among various sensors that may be included in the sensing unit 140 will be described in detail.

Firstly, the proximity sensor 141 refers to a sensor detecting whether an object approaches or is in the proximity of a predetermined detecting surface by using a force of an electromagnetic field or an infrared ray without mechanical contact. This proximity sensor 141 may be disposed in an internal area of the transparent display device surrounded by the above-described touch screen or around the touch screen.

An example of the proximity sensor 141. There is a transmissive photoelectric sensor, directly reflective photoelectric sensor, mirror reflective optoelectronic sensor, high frequency oscillatory proximity sensor, capacitive proximity sensor, inductive proximity sensor, infrared proximity sensor, and the like. When the touch screen is a capacitive type, the proximity sensor 141 may be configured to detect an access of a conductive object with a change in electric field according to the access of the object. In this case, the touch screen (or touch sensor) itself may be classified as a proximity sensor.

Hereinafter for convenience of explanation, an action is called "proximity touch" that a pointer does not contact the touch screen but is recognized as positioned on the touch screen, and an action is called "contact touch" that the pointer actually contacts the touch screen. A position at which an object is subject to a proximity touch over the touch screen means a position at which the object vertically corresponds to the touch screen when the object is subject to the proximity touch. The proximity sensor senses a proximity touch and a proximity touch pattern (e.g., proximity distance, proximity touch direction, proximity touch speed, proximity touch time, proximity touch position, proximity movement state, and the like). Furthermore, the controller 180 may process data (or information) corresponding to a proximity touch action and the proximity touch pattern detected through the proximity sensor 141 and, in addition, may output visual information corresponding to the processed data on the touch screen. In addition, the controller 180 may perform a control on the transparent display device 100 so that different operations or different data (or information) are processed according to whether a touch for an identical point on the touch screen is a proximity touch or a contact touch.

The touch sensor senses a touch (or a touch input) applied to the touch screen (or the display unit 151) by using at least one of various touch types such as resistive-film, capacitive, infrared ray, ultrasonic, and magnetic field types.

As an example, the touch sensor may be configured to convert a change in pressure applied to a predetermined part or a change in capacitance generated at a predetermined part of the touch screen into an electrical input signal. The touch sensor may be configured to detect a position or an area that is touched by an object touching the touch screen, or pressure or capacitance at the time of the touch. Here, the object, for example, a finger, a touch pen, a stylus pen, or a pointer, may be an object applying a touch on the touch sensor.

In this way, when there is a touch input on the touch sensor, a signal (signals) corresponding thereto is (are) transmitted to a touch controller. The touch controller processes the signal(s) and then transmits data corresponding thereto to the controller 180. Accordingly the controller 180 may determine which area of the display unit 151 is touched. Here, the touch controller may be a separate element other than the controller 180, or be the controller itself.

Furthermore, the controller 180 may perform different controls or an identical control according to a kind of the touch object, which touches the touch screen (or a touch key prepared other than the touch screen). Whether to perform different controls or an identical control according to a kind of the touch object may be determined according to a current operation state of the transparent display device 100 or an application program being executed.

The above-described touch sensor and proximity sensor may sense independently or in a combined manner various types of touches on the touch screen, wherein the touches include a short (or a tap) touch, a long touch, a multi-touch, a drag touch, a flick touch, a pinch-in touch, a pinch-out, a swipe touch, and a hovering touch.

The ultrasonic sensor may recognize position information on a touch object by using an ultrasonic wave. The controller 180 may calculate a position of a wave generating source through information sensed by an optical sensor and a plurality of ultrasonic sensors. The position of the wave generating source may be calculated by using a property that a light is much faster than the ultrasonic wave, in other words, a time that a light arrives at an optical sensor is much shorter than a time that an ultrasound wave arrives at an ultrasonic sensor. In detail, with a light as a reference signal, the position of the wave generating source may be calculated by using a time difference with a time when an ultrasonic wave arrives.

Furthermore, as for a configuration of the input unit 120, the camera 121 includes at least one selected from a camera sensor (e.g., a CCD, or a CMOS sensor), a photo sensor (or an image sensor), and a laser sensor.

The camera 121 and the laser sensor may be combined together and sense a touch of the sensing target for a 3-dimensional stereoscopic image. The photo sensor may be stacked on a display element, and this photo sensor scans a movement of the sensing target close to the touch screen. In detail, the photo sensor includes photo diodes and transistors in rows/columns and scans a target mounted on the photo sensor by using an electrical signal changed according to an amount of light applied to the photo diodes. In other words, the photo sensor performs coordinate calculation on the sensing target according to a changed amount of the light and, through this, position information on the sensing target may be obtained.

The display unit 151 displays (outputs) information processed by the transparent display device 100. For example, the display unit 151 may display execution screen information on the application program driven in the transparent display device 100 or user interface (UI) information or graphic user interface (GUI) information according to the execution screen information.

In addition, the display unit 151 may be configured as a stereoscopic display unit displaying a stereoscopic image.

A 3-dimensional display scheme such as a stereoscopic scheme (glasses type), an auto-stereoscopic scheme (glassless type), or a projection scheme (a holographic scheme) may be applied to the stereoscopic display unit.

The audio output unit 152 may output audio data received from the wireless communication unit 110 in a call signal reception mode, call mode or recording mode, voice recognition mode, broadcast reception mode, or the like, or audio data stored in the memory 170. The audio output unit 152 also outputs a sound signal relating to a function (e.g., call signal reception sound, message reception sound, or the like) performed by the transparent display device 100. The audio output unit 152 may include a receiver, speaker, or buzzer.

The haptic module 153 generates various tactile effects that the user may feel. A representative example of the tactile effect generated by the haptic module 153 may be vibration. Strength and a pattern of the vibration generated by the haptic module 153 may be controlled by user selection or setting by the controller. For example, the haptic module 153 may output different vibrations sequentially or by synthesizing them.

Besides the vibration, the haptic module 153 may generate various tactile effects including an effect by a stimulus such as a pin array moving vertically to contact a skin surface, air jetting force or air absorptive force through an outlet or an inlet, brush against a skin surface, contact to an electrode, or static electricity, and an effect by reproducing a cold and warmth sense by using a device capable of absorbing or generating heat.

The haptic module 153 may be realized in order for the user to feel the tactile effect through a muscle sense of a finger or arm, as well as to deliver a tactile effect through a direct contact. The haptic module 153 may be provided two or more in number according to a configuration aspect of the transparent display device 100.

The light output unit 154 may output a signal for notifying an event occurrence by using a light from an optical source of the transparent display device 100. The event occurred in the transparent display device 100 may be exemplified with message reception, call signal reception, missed calls, alarm, schedule notification, email reception, or information reception through an application.

The signal output by the light output unit 154 is implemented according to that the transparent display device emits a monochromatic light or a multi-chromatic light towards the front or rear surface. The signal output may be completed when the transparent display device detects that the user checks the event.

The interface unit 160 plays a role as a channel with all external devices connected to the transparent display device 100. The interface unit 160 may receive data from the external device, receive power and deliver the power to each element inside the transparent display device 100, or allow internal data of the transparent display device 100 to be transmitted to the external device. For example, the interface unit 160 may include a wired/wireless headset port, external charger port, wired/wireless data port, memory card port, a port for connecting a device to which an identification module is provided, video input/output (I/O) port, earphone port, or the like.

Furthermore, the identification module is a chip storing various pieces of information for authenticating user's authority for the transparent display device 100, and may include a user identify module (UIM), a subscriber identity module (SIM), or a universal subscriber identity module (USIM). A device (hereinafter 'identification device') including an identification module may be manufactured in a smart card type. Accordingly, the identification device may be connected to the transparent display device 100 through the interface unit 160.

In addition, when the transparent display device 100 is connected to an external cradle, the interface unit 160 may be a channel through which power is supplied from the cradle to the transparent display device 100 or a channel through which various command signals input from the cradle by the user are delivered. The various command signals or the power input from the cradle may operate as signals for perceiving that the transparent display device 100 is accurately mounted in the cradle.

The memory 170 may store a program for operations of the controller 180 and temporarily store input/output data (e.g., a phone book, messages, still images, videos, etc.). The memory 170 may store data about various patterned vibrations and data about sound output at the time of touch input on the touch screen.

The memory 170 may be a storage medium including at least one of a flash memory, hard disk, Solid State Disk (SSD), Silicon Disk Drive (SDD), multimedia card micro type memory, card type memory (e.g., SD or XD memory, etc.), random access memory (RAM), static random access memory (SRAM), read-only memory (ROM), electrically erasable programmable read-only memory (EEPROM), programmable read-only memory (PROM), magnetic memory, magnetic disk, and optical disc. The transparent display device 100 may operate in relation to a web storage performing a storage function of the memory 170 over the Internet.

Furthermore, as described above, the controller 180 normally controls the overall operation and an operation related to an application program of the transparent display device 100. For example, when a state of the transparent display device satisfies a set condition, the controller 180 executes or releases a lock state that limits an input of a user's control command to applications.

In addition, the controller 180 may perform a control or a process related to a voice call, data communication, or a video call, etc., or may perform a pattern recognition processing for recognizing a written input and a drawing input performed on the touch screen as a character and an image, respectively. Furthermore, the control 180 may combine and control any one of or a plurality of the above-described elements in order to implement various embodiments to be described below in the transparent display device 100.

The power supply unit 190 receives external or internal power under a control of the controller 180 and supplies power necessary for operating each element. The power supply unit 190 includes a battery. The battery may be an embedded battery that is rechargeable and may be detachably coupled for charging.

The power supply unit 190 may include a connection port, and the connection port may be configured as an example of the interface 160 to which an external charger providing power is electrically connected for charging the battery.

As another example, the power supply unit 190 may be configured to charge the battery in a wireless manner without using the connection port. In this case, the power supply unit 190 may receive, from an external wireless power transmitting device, power by using one or more of an inductive coupling manner on the basis of a magnetic induction phenomenon and a magnetic resonance coupling manner on the basis of an electromagnetic resonance phenomenon.

Hereinafter, various embodiments may be implemented in a recording medium that is readable with a computer or a similar device by using software, hardware, or a combination thereof.

Next, description is made about a communication system realizable through the transparent display device 100 according to an embodiment.

Firstly, the communication system may use different wireless interfaces and/or a physical layer. For example, the wireless interface available by the communication system may include Frequency Division Multiple Access (FDMA), Time Division Multiple Access (TDMA), Code Division Multiple Access (CDMA), Universal Mobile Telecommunications Systems (UMTS) (in particular, Long Term Evolution (LTE), or Long Term Evolution-Advanced (LTE-A)), Global System for Mobile Communications (GSM), or etc.

Hereinafter, for convenience of explanation, description will be provided limitedly to CDMA. However, it is obvious that the embodiments may be applied to all communication systems including an Orthogonal Frequency Division Multiplexing (OFDM) wireless communication system as well as a CDMA wireless communication system.

The CDMA wireless communication system may include at least one terminal 100, at least one base station (BS, also may be referred to as Node B or Evolved Node B), at least one BS controller (BSC) and a mobile switching center (MSC). The MSC may be configured to be connected to the Public Switched Telephone Network (PSTN) and BSCs. The BSCs may be connected to the BS in pair through a backhaul line. The backhaul line may be prepared according to at least one selected from E1/T1, ATM, IP, PPP, Frame Relay, HDSL, ADSL, and xDSL. Accordingly, the plurality of BSCs may be included in a CDMA wireless communication system.

Each of a plurality of BSs may include at least one sector, and each sector may include an omni-directional antenna or an antenna indicating a predetermined radial direction from the BS. In addition, each sector may include two or more antennas having various types. Each BS may be configured to support a plurality of frequency allocations and each of the plurality of allocated frequencies may have predetermined spectrum (e.g., 1.25 MHz, or 5 MHz).

An intersection between the sector and the frequency allocation may be called as a CDMA channel. The BS may be called as a base station transceiver subsystem (BTSs). In this case, one BSC and at least one BS are called together as a "base station". The base station may also represent a "cell site". In addition, each of a plurality of sectors for a predetermined BS may also be called as a plurality of cell sites.

A broadcasting transmitter (BT) transmits a broadcast signal to the transparent display device 100 operated in a system. The broadcast reception module 111 illustrated in FIG. 1 is provided in the terminal 100 for receiving the broadcast signal transmitted by the BT.

Furthermore, in the CDMA wireless communication system, a global positioning system (GPS) may be linked for checking a location of the transparent display device 100. A satellite assists in obtaining the location of the transparent display device 100. Useful location information may be obtained by less than two or at least two satellites. Here, the location of the transparent display device 100 may be tracked by using all techniques, which are capable of tracking the location, as well as a GPS tracking technique. In addition, at least one of GPS satellites may be selectively or additionally responsible for transmitting satellite digital multimedia broadcasting (DMB).

The location information module 115 prepared in the transparent display device 100 is for detecting, operating or identifying the location of the transparent display device 100, and may representatively include a GPS module and a WiFi module. If necessary, the location information module 115 may alternatively or additionally perform any function of other modules in the wireless communication unit 110 for obtaining data for the location of the transparent display device 100.

The GPS module 115 may precisely calculate 3D current location information according to latitude, longitude, and altitude by calculating distance information from three or more satellites and precise time information, and by applying a trigonometry to the calculated information. A method is currently widely used that calculates location and time information using three satellites, and corrects an error in the calculated location and time information using another satellite. The GPS module 115 may calculate speed information by continuously calculating a current location in real time. However, it is difficult to precisely measure the location of the transparent display device 100 by using the GPS module in a dead zone, such as an indoor area, of the satellite signal.

Accordingly, in order to compensate for location measurement in the GPS manner, a WiFi positioning system (WPS) may be used.

The WPS is a technique for tracking the location of the transparent display device 100 using a WiFi module prepared in the transparent display device 100 and a wireless access point (AP) transmitting or receiving a wireless signal to or from the WiFi module, and may mean a location measurement technique based on a wireless local area network (WLAN) using WiFi.

The WPS may include a WiFi positioning server, the transparent display device 100, a wireless AP connected to the transparent display device 100, and a database storing arbitrary wireless AP information.

The transparent display device 100 connected to the wireless AP may transmit a location information request message to the WiFi positioning server.

The WiFi positioning server extracts information on the wireless AP connected to the transparent display device 100 on the basis of the location information request message (or a signal) of the transparent display device 100. The information on the wireless AP connected to the transparent display device 100 may be transmitted to the WiFi positioning server through the transparent display device 100 or transmitted to the WiFi positioning server from the wireless AP.

The information on the wireless AP, which is extracted on the basis of the location information request message of the transparent display device 100, may be at least one selected from a MAC address, Service Set Identification (SSID), a Received Signal Strength Indicator (RSSI), Reference Signal Received Power (RSRP), Reference Signal Received Quality (RSRQ), channel information, Privacy, a Network Type, Signal Strength, and Noise Strength.

As described above, the WiFi positioning server may receive information on the wireless AP connected to the transparent display device 100, and extract wireless AP information corresponding to the wireless AP to which the transparent display device is being connected from the pre-constructed database. At this point, information on arbitrary wireless APs, which is stored in the database, may be information on a MAC Address, SSID, channel information, Privacy, Network Type, latitudinal and longitudinal coordinates of a wireless AP, a building name and floor on which the wireless AP is located, indoor detailed location information (GPS coordinates available), an address of an owner of the wireless AP, a phone number, and etc. At this point, in order to remove a wireless AP provided by using a mobile AP or an illegal MAC address in the location measurement process, the WiFi positioning server may extract a predetermined number of pieces of wireless AP information in the descending order of an RSSI.

Thereafter, the WiFi positioning server may extract (or analyze) location information on the transparent display device 100 by using at least one wireless AP information extracted from the database. The location information of the transparent display device 100 is extracted (or analyzed) by comparing the stored and the received wireless AP information.

As a method for extracting (or analyzing) location information on the transparent display device 100, a cell-ID method, a fingerprint method, a trigonometry, and a landmark method may be used.

The cell-ID method is a method for determining a location of a wireless AP having strongest strength from among surrounding wireless AP information collected by a transparent display device. This method is advantageous in that implementation is simple, an additional cost is not necessary, and location information may be rapidly obtained. However, when installation intensity of a wireless AP is lower, positioning precision becomes lowered.

The fingerprint method is a method for selecting a reference location in a service area, collecting signal strength information, and estimating a location through signal strength information transmitted from a transparent display device on the basis of the collected information. In order to use the fingerprint method, it is necessary to construct a database for propagation characteristics in advance.

Trigonometry is a method for operating a location of a transparent display device on the basis of a distance between coordinates of at least three wireless APs and the transparent display device. For estimating the distances between the transparent display device and the wireless APs, signal strength is converted into distance information, or a time of arrival (ToA) of a wireless signal, a time difference of arrival (TDoA) of a wireless signal, an angle of arrival (AoA) of a wireless signal may be used.

The landmark method is a method of measuring a location of a transparent display device by using a landmark transmitter.

Besides the above-described methods, various algorithms may be used for extracting (or analyzing) location information on a transparent display device.

The location information on the transparent display device 100 extracted in this way may be transmitted to the transparent display device 100 through the WiFi positioning server and the transparent display device 100 may obtain the location information.

The transparent display device 100 may obtain location information by being connected to at least one wireless AP. At this point, the number of wireless APs requested for obtaining the location information on the transparent display device 100 may be variously varied according to a wireless communication environment in which the transparent display device 100 is located.

Hereinafter an operation method of a transparent display device according to an embodiment will be described.

Figure 2A:
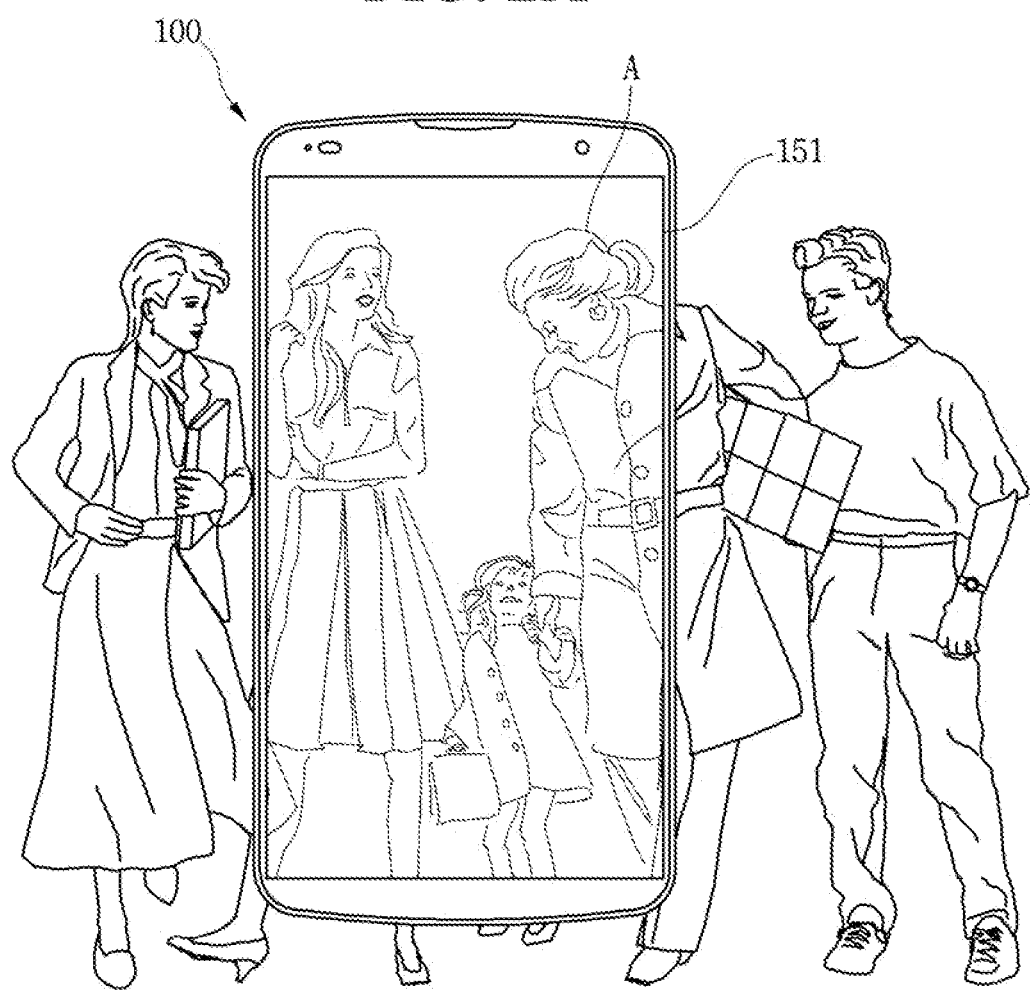
FIGS. 2A and 2B illustrate actual views of a transparent display device according to an embodiment.
Figure 2B:
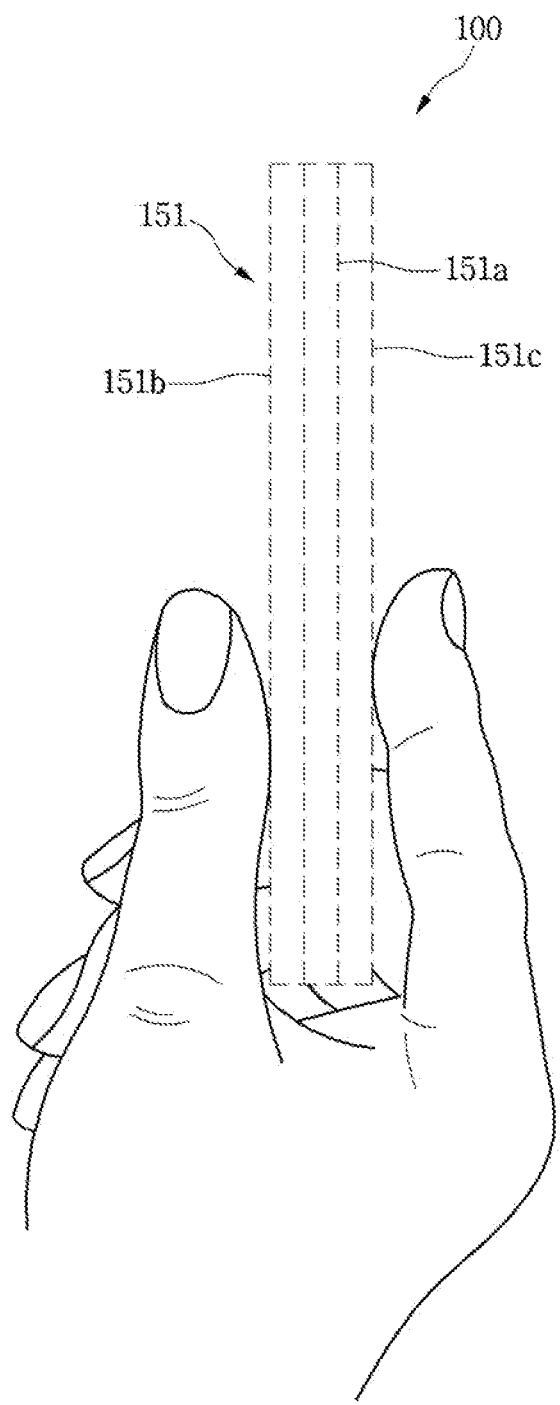

FIGS. 2A and 2B illustrate actual figures of a transparent display device according to an embodiment.

Referring FIG. 2A, a display unit 151 allows light incident from the rear side of the display unit 151 to be transmitted to the front side thereof. An object A seen may radiate, to the periphery, the natural light or scattered light such as indoor light. The scattered light radiated from the object A may be incident to the rear side of the display unit 151. The display unit 151 may transmit the light incident from the rear side to the front side. Accordingly, a user may perceive the object A through the display unit 151. Even in a case where an image is not displayed, the display unit 151 may transmit the light from the rear side to the front side to allow the user to perceive the object A. The display unit 151 may be realized with a projection display or direct-view display. The projection display may be driven in a projection way and the direct-view display may be driven in a way that the display itself such as a TFT-LCD (Thin Film Transistor-Liquid Crystal Display) or AMOLED (Active Matrix Organic Light Emitting Diode) is transparent. The display unit 151 may be named "transparent display unit".

FIG. 2B is a side view of the transparent display device 100. The display unit 151 may include a display panel 151a displaying an image, a front touch screen panel 151b disposed on a front side of the display panel 151a and a rear touch screen panel 151c disposed on a rear side of the display panel 151a. The controller 180 can receive a front touch input through the front touch screen panel 151b and receive a rear touch input the rear touch screen panel 151c. Therefore, the controller 180 can recognize a both sides touch input.

Hereinafter, a touch input received by the front touch screen panel 151b is named "front touch input", and a touch input received by the rear touch screen panel 151c is named "rear touch input". When the front touch input and rear touch input are simultaneously received, it may be considered that a two side grip input (or a both sides touch input) is received. The controller 180 may perform a first function in response to the front touch input and a second function different from the first function in response to the rear touch input. A description about this will be described later.

Figure 3:
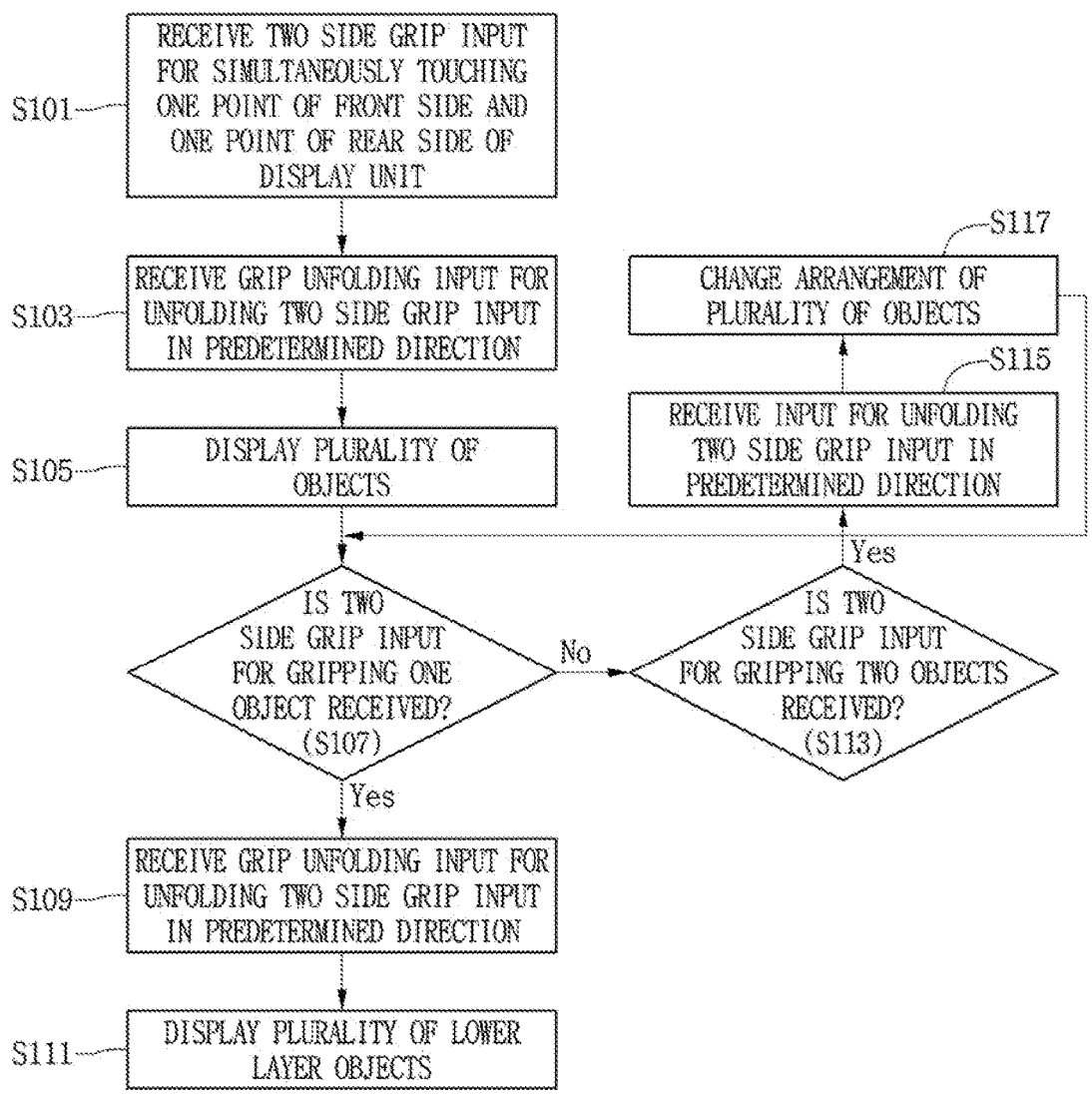
FIG. 3 is a flowchart for explaining an operation method of a transparent display device according to an embodiment.

FIG. 3 is a flowchart for explaining an operation method of a transparent display device according to an embodiment.

The controller 180 of the transparent display device 100 receives a two side grip input for simultaneously touching one point of the front display unit 151a and one point of the rear display unit 151b (operation S101), and receives a grip unfolding input for unfolding the two side grip input in a predetermined direction (operation S103). A description about the two side grip input and grip unfolding input will be provided with reference to FIGS. 4 and 5.

Figure 4:
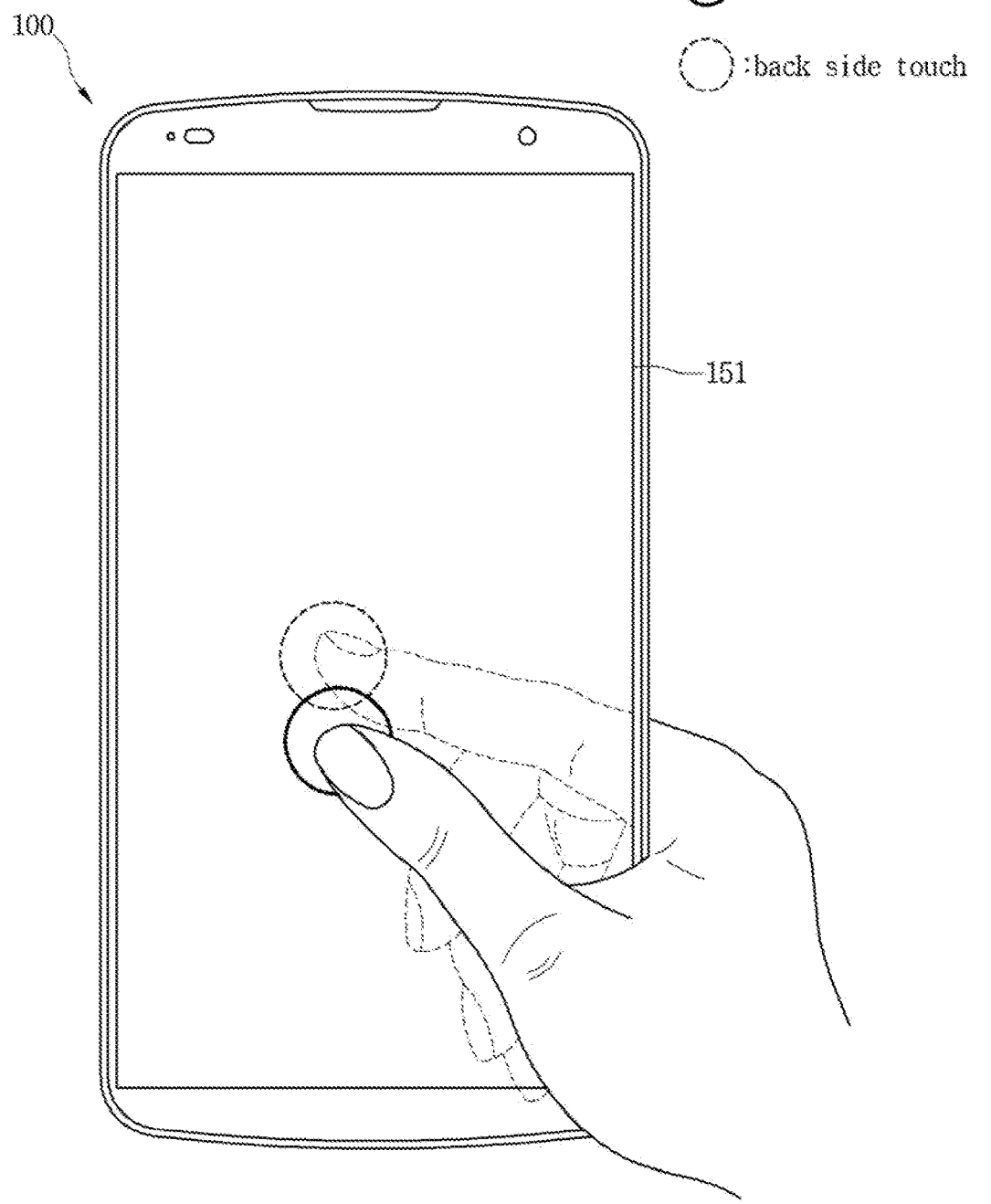
FIG. 4 is a view for explaining an example for receiving a two side grip input for gripping two sides of a screen of a display unit according to an embodiment.
Figure 5:
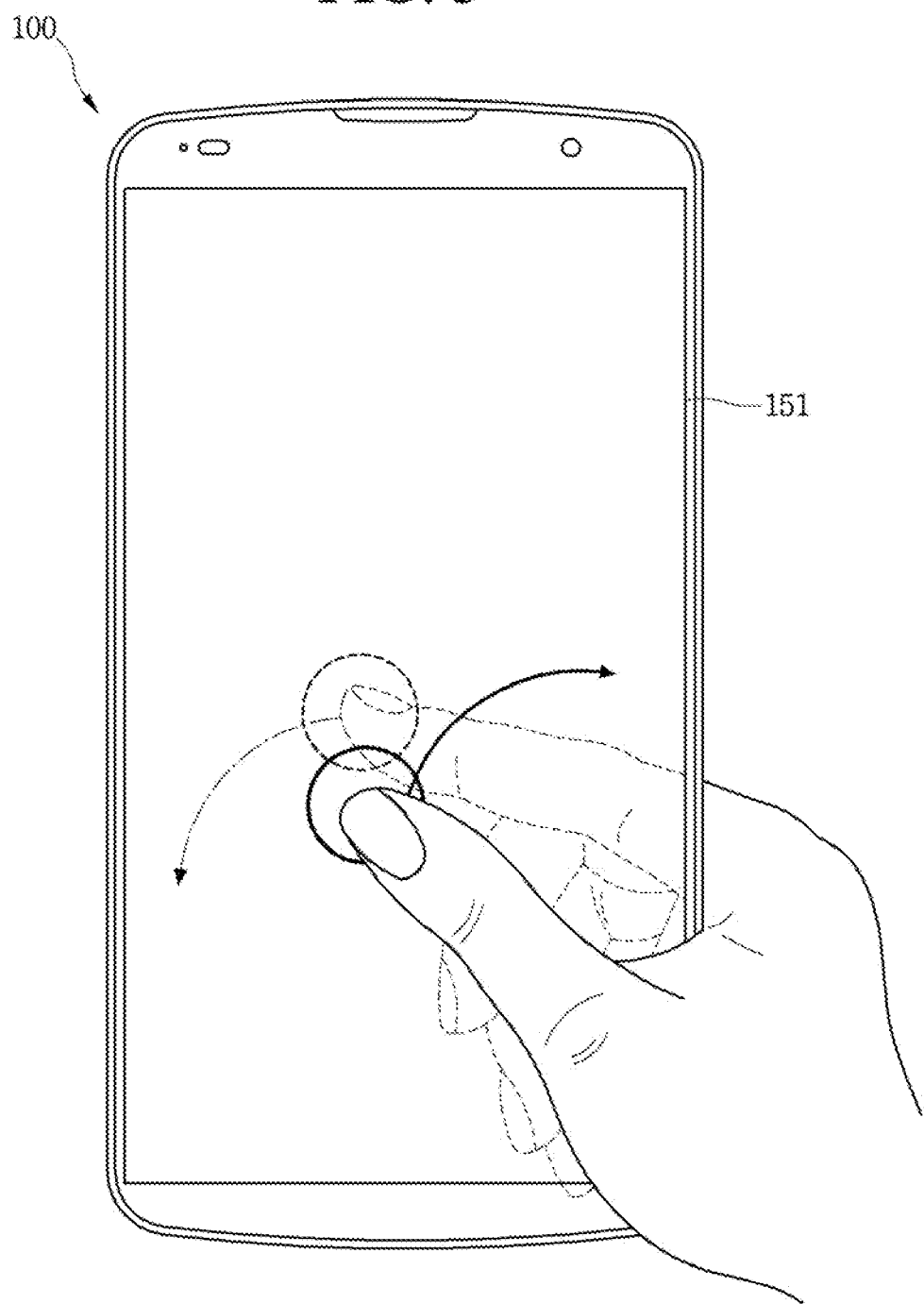
FIG. 5 is a view for explaining an example for receiving a grip unfolding input for unfolding the two side grip input in a predetermined direction according to an embodiment.

FIG. 4 is a view for explaining an example that a two side grip input for gripping two sides of a screen of a display unit is received according to an embodiment, and FIG. 5 is a view for explaining an example for receiving a grip unfolding input for unfolding the two side grip input in a predetermined direction according to an embodiment.

Referring to FIG. 4, the controller 180 may simultaneously receive the front touch input for touching one point on the front display unit (not illustrated) and the rear touch input for touching one point of the rear display unit (not illustrated). When the front and rear touch inputs are simultaneously received, it is called two side grip input. In other words, the user may grip the front and rear sides of the display unit 151 with his/her two fingers. For convenience, in drawings of FIG. 4 and thereafter, the front and rear touch inputs are represented in different shapes in order to be distinguished from each other. In other words, the front touch input is represented with a solid line circle and the rear touch input is represented with a dotted line circle and the front and rear touch inputs are shown to different points of the front and rear display units such that they may be easily illustrated. In FIG. 4, a view that the user grips the transparent display device 100 with his/her right hand is illustrated.

Referring to FIG. 5, the controller 180 may receive a grip unfolding input for moving the front touch input in one direction and the rear touch input in another direction. The grip unfolding input for moving the front touch input in the one direction and the rear touch input in the other direction may be named as a grip unfolding input for unfolding in a first direction. On the other hand, the grip unfolding input for moving the rear touch input in the one direction and the front touch input in the other direction may be named as a grip unfolding input for unfolding in a second direction. Here, the one and other directions may be opposite directions. For example, the one direction may be the clockwise direction and the other direction may be the counterclockwise direction.

A description is provided with reference to FIG. 3 again.

The controller 180 displays a plurality of objects through the display unit 151 in response to a grip unfolding input for unfolding the two side grip input in a predetermined direction (operation S105).

In an embodiment, the plurality of objects may respectively represent execution screens of applications that have been previously executed.

In another embodiment, the plurality of objects may respectively represent execution screens of applications that have been registered as favorites by the user.

In another embodiment, each of the plurality of objects may be a web site screen representing each web site that the user has previously accessed.

In another embodiment, each of the plurality of objects may represent information on content that has been previously played.

In an embodiment, the grip unfolding input for unfolding the two side grip input in a predetermined direction may be an input for moving the front touch input in the clockwise direction and the rear touch input in the counterclockwise direction. In another embodiment, the grip unfolding input for unfolding the two side grip input in a predetermined direction may be an input for moving the front touch input in the counterclockwise direction and the rear touch input in the clockwise direction.

The controller 180 receives a two side grip input for any one object among the plurality of objects (operation S107), and receives a grip unfolding input for unfolding the received two side grip input in a predetermined direction (operation S109).

The controller 180 displays the plurality of objects related to a corresponding object in response to the grip unfolding input for unfolding a grip input for the object in a predetermined direction (operation S111).

In an embodiment, when the object is an access screen of a recently accessed web site, a plurality of lower layer objects may respectively represent access screens that have been previously accessed in the corresponding web site.

In an embodiment, when the object is an execution screen of a music application, each of the plurality of lower layer objects may include information on another song composed by a composer who has composed a song that is being played on the execution screen of the music application or information on another song sung by a singer who has sung a song that is being played on the execution screen of the music application.

Furthermore, the controller 180 receives a two side grip input for two objects among the plurality of objects (operation S113), and receives a grip unfolding input for unfolding the received two side grip input in a predetermined direction (operation S115).

The controller 180 changes an arrangement of the plurality of objects in response to the received grip unfolding input (operation S117).

In an embodiment, the controller 180 may adjust an interval between two objects and an object located between the two objects according to reception of a two side grip input for the two card objects.

In another embodiment, the controller 180 may display, on the card objects, execution screens of applications respectively corresponding to the two objects according to reception of a two side grip input for the two card objects.

Hereinafter, operations S105 to S117 will be described.

Figure 6C:
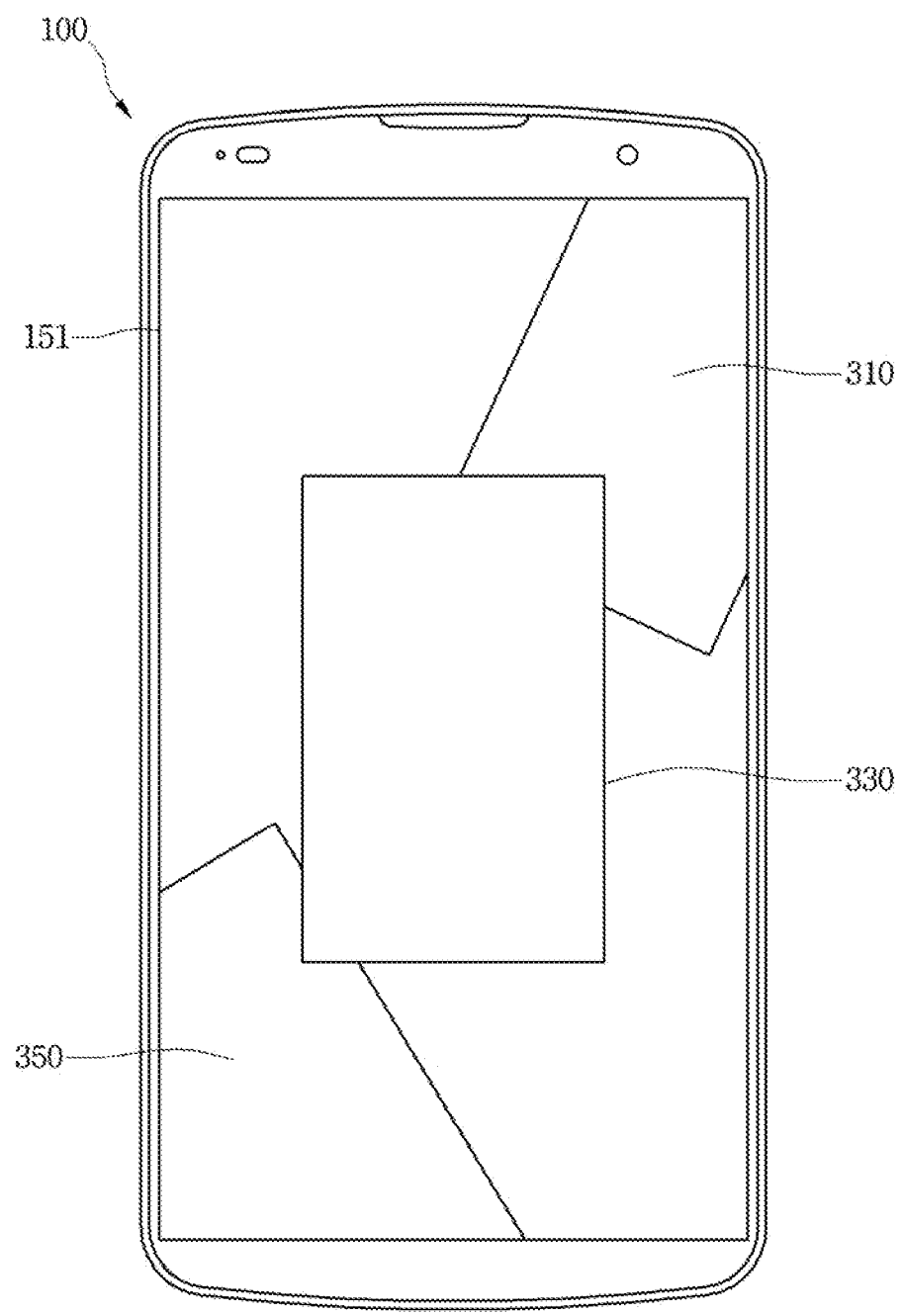

FIGS. 6A to 6C are views for explaining an example that a plurality of objects are displayed in response to a grip unfolding input according to an embodiment.

Referring to FIG. 6A, the controller 180 may control the display unit 151 so as to display the plurality of objects 310, 330, and 350 in response to the grip unfolding input for unfolding the two side grip input. In other words, the grip unfolding input may be a trigger for displaying the plurality of objects 310, 330, and 350. The plurality of objects 310, 330, and 350 may be displayed as if multiple cards are superimposed.

When a grip unfolding input is received again in a state illustrated in FIG. 6A, the controller 180 may display the plurality of objects 310, 330, and 350 by deploying them in order to display more information provided by the plurality of objects 310, 330, and 350, as illustrated in FIG. 6B. Accordingly, the interval between the plurality of objects 310, 330, and 350 may be increased.

Similarly, when a grip unfolding input is received again in a state as illustrated in FIG. 6B, the controller 180 may display the plurality of objects 310, 330, and 350 by deploying them in order to display more information than that in FIG. 6B, which is provided by the plurality of objects 310, 330, and 350, as illustrated in FIG. 6C. Accordingly, the interval between the plurality of objects 310, 330, and 350 may be further increased than in FIG. 6B.

In other words, according to an embodiment, as a distance between a touch point corresponding to the front touch input and a touch point corresponding to the rear touch input becomes longer, the interval between the objects is increased.

In an embodiment, before receiving the grip unfolding input, the controller 180 may display the plurality of objects 310, 330, and 350 related to information displayed on the display unit 151. For example, before receiving the grip unfolding input, when displaying a home screen on the display unit 151, the controller 180 may control the display unit 151 to display execution screens of applications corresponding to applications having been previously executed according to reception of the grip unfolding input. For another example, before receiving the grip unfolding input, when displaying a web site screen on the display unit 151, the controller 180 may control the display unit 151 to display screens of web sites having previously accessed according to reception of the grip unfolding input. A description thereabout will be provided with the drawings.

Figure 7A:
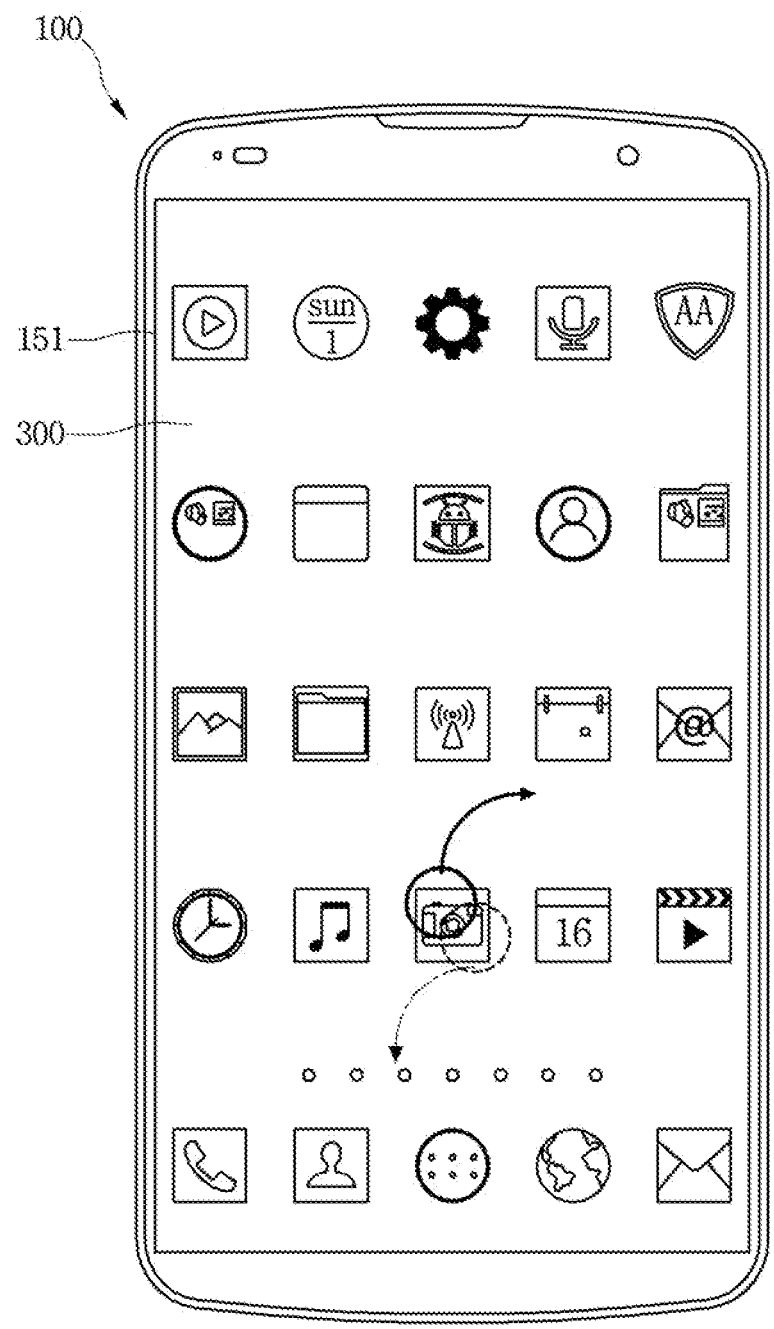
FIGS. 7A, 7B and 7C are views for explaining an embodiment for receiving a plurality of objects related to information, which is displayed on the display unit, according to reception of the grip unfolding input.
Figure 7B:
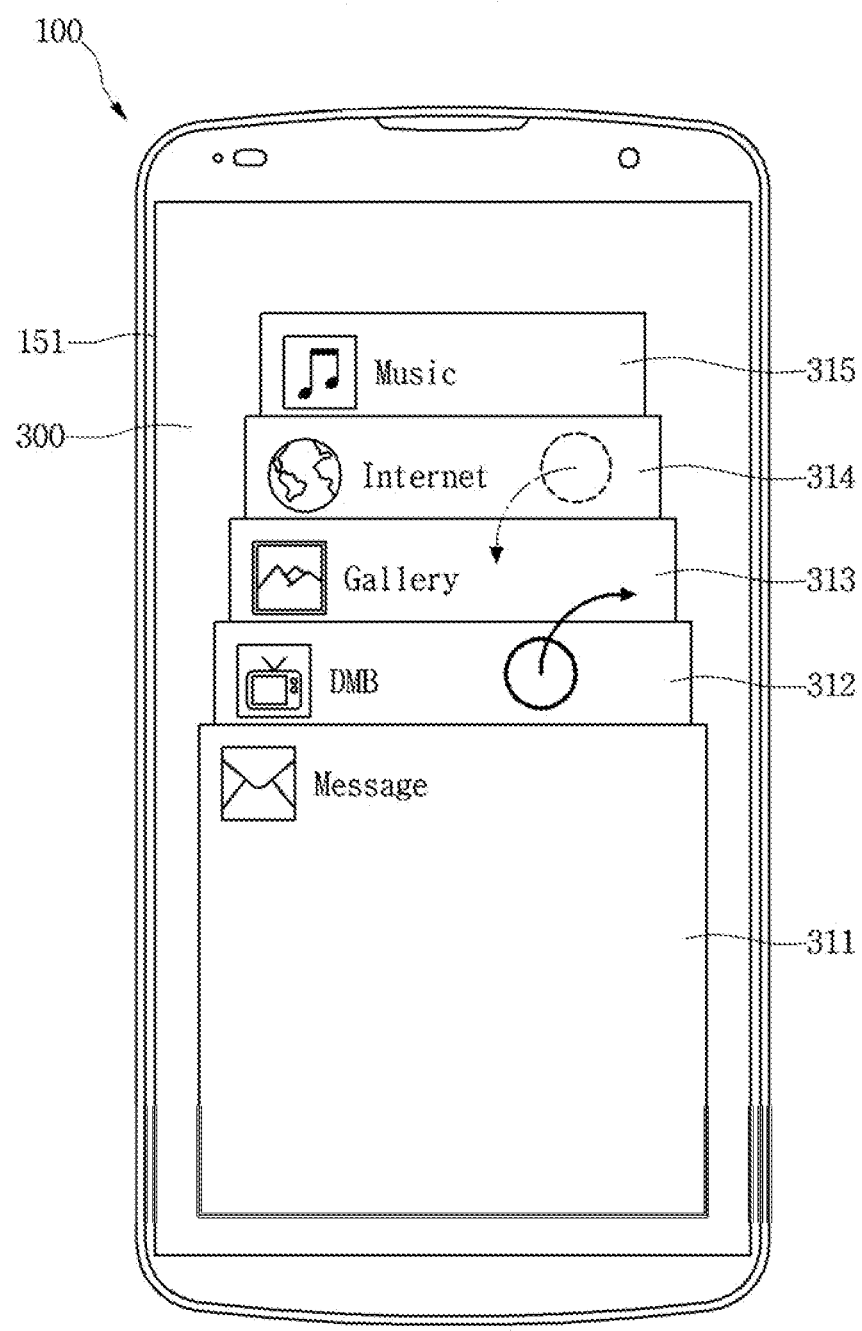
Figure 7C:
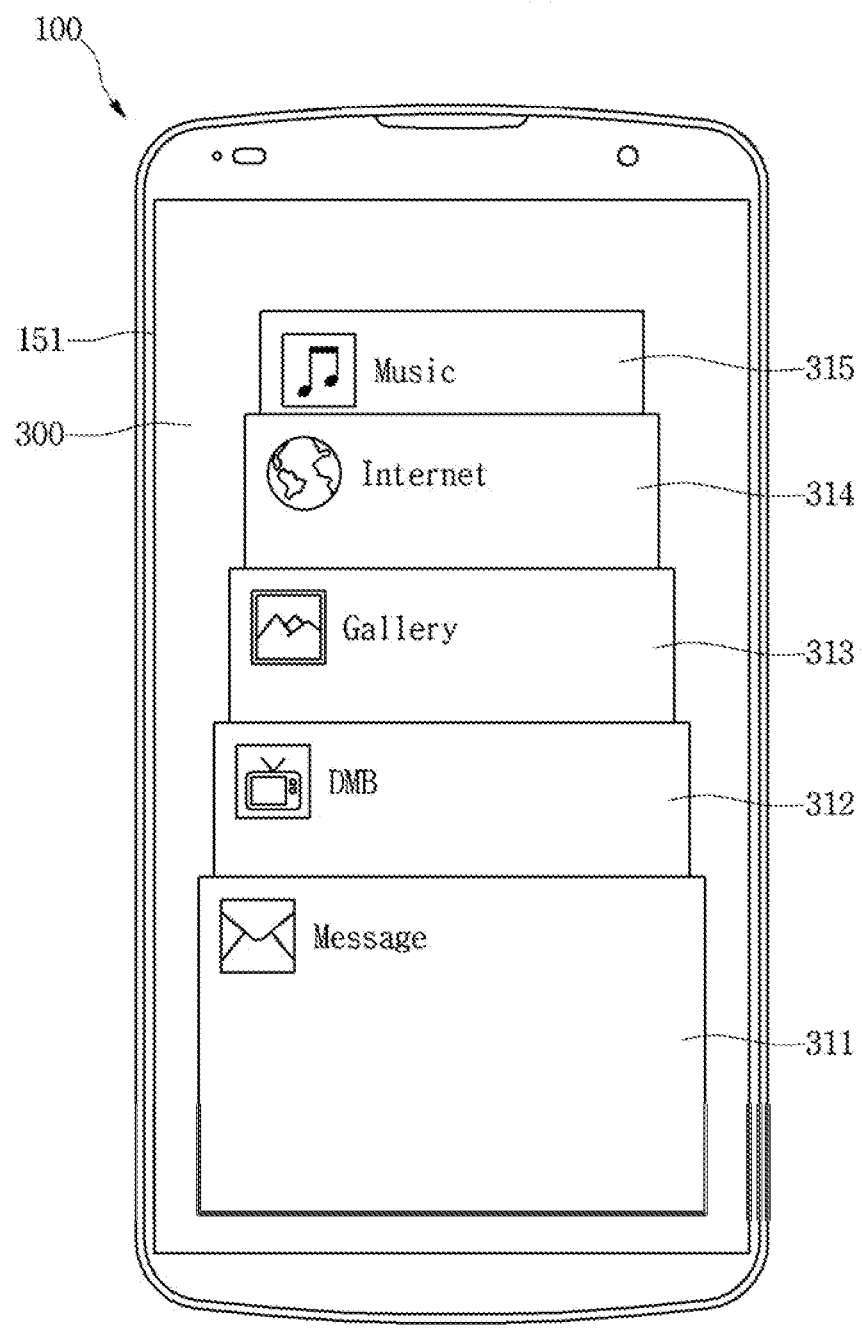

FIGS. 7A to 7C are view for explaining an embodiment for displaying a plurality of objects related to information, which is displayed on the display unit, according to reception of a grip unfolding input.

Referring to FIG. 7A, the display unit 151 of the transparent display device 100 may display a plurality of app icons respectively corresponding to a plurality of applications on the screen 300. The screen 300 illustrated in FIG. 7A may be a home screen of the transparent display device 100. When a two side grip input and a grip unfolding input for unfolding the two side grip input in a first direction is received on the screen 300, as illustrated in FIG. 7B, the controller 180 may control the display unit 151 to display the plurality of objects 311 to 315 on the screen 300. The plurality of objects 311 to 315 may be execution screens of applications respectively corresponding to applications recently executed on the home screen. A first object 311 may represent an execution screen of a message application. A second object 312 may represent an execution screen of a DMB application for providing DMB (Digital Multimedia Broadcasting) service. A third object 313 may represent an execution screen of a gallery application. A fourth object 314 may represent an execution screen of an Internet application. A fifth object 315 may represent an execution screen of a music application. Here, the first object 311 may be an execution screen of a most recently executed application, the second to fifth objects 312 to 315 may be followed. On each card object, information on a corresponding application may be displayed.

In an embodiment, an interval between the objects 311 to 315 may be changed based on an unfolded length according to the grip unfolding input. In other words, as an unfold length of the grip unfolding input is increased, the interval between the plurality of objects 311 to 315 may be farther away.

In FIG. 7B, when a front touch input is received on the second object 312 and a rear touch input is received on the fourth object 314, namely, a two side grip input is received and a grip unfolding input for moving the two side grip input in a first direction is received, as illustrated in FIG. 7C, the controller 180 may control the display unit 151 to increase the interval between the second to fourth objects 312, 313, and 314. Accordingly, information shown by each of the second to fourth objects may be increased.

The user may conduct actions of gripping and unfolding two objects to adjust the interval between the objects and may view more information displayed on each object more rapidly.

FIGS. 8A to 8D are views for explaining another embodiment for receiving a plurality of objects related to information, which is displayed on the display unit, according to reception of the grip unfolding input.

Figure 8A:
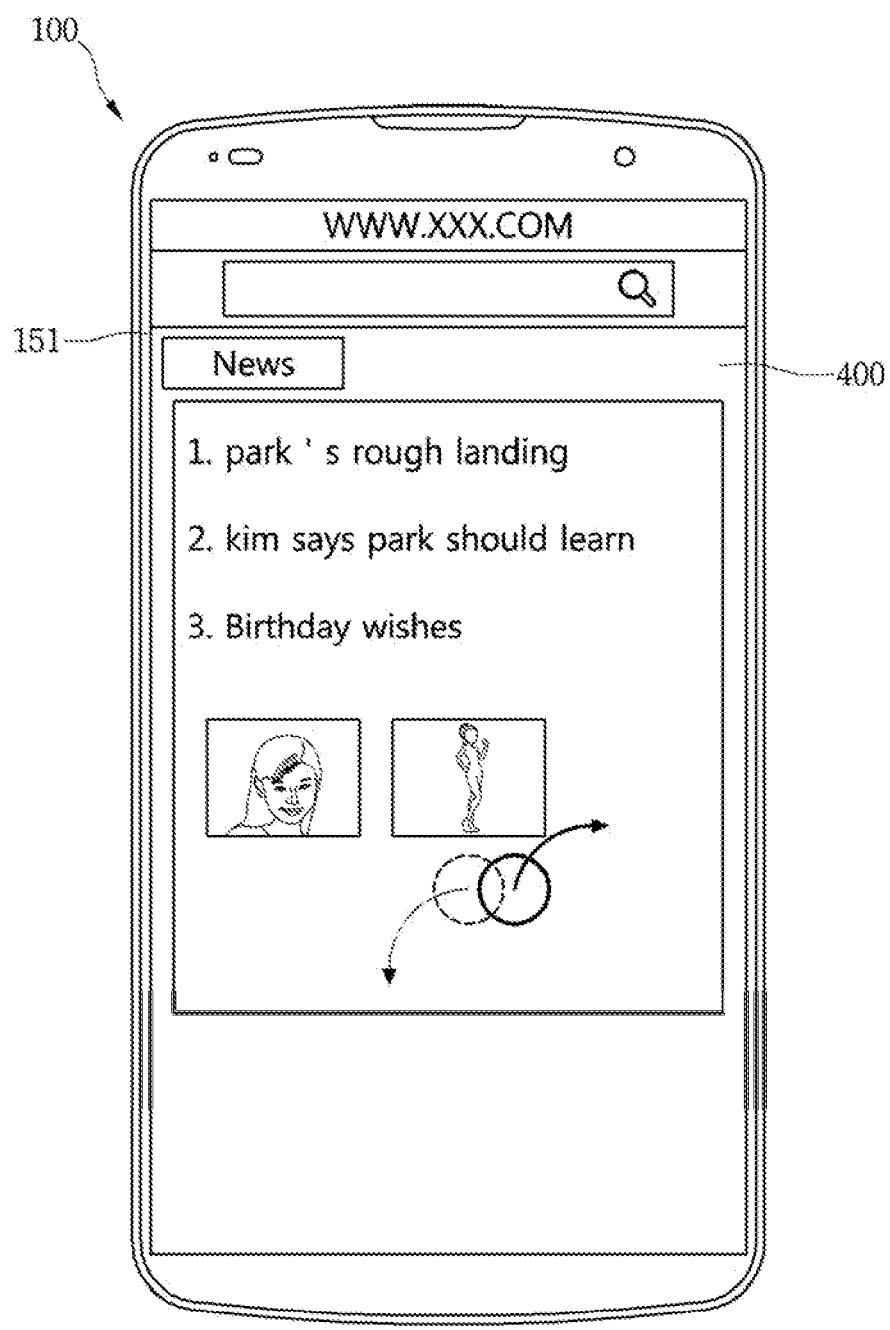
FIGS. 8A, 8B, 8C and 8D are views for explaining another embodiment for displaying a plurality of objects related to information, which is displayed on the display unit, according to reception of the grip unfolding input.
Figure 8B:
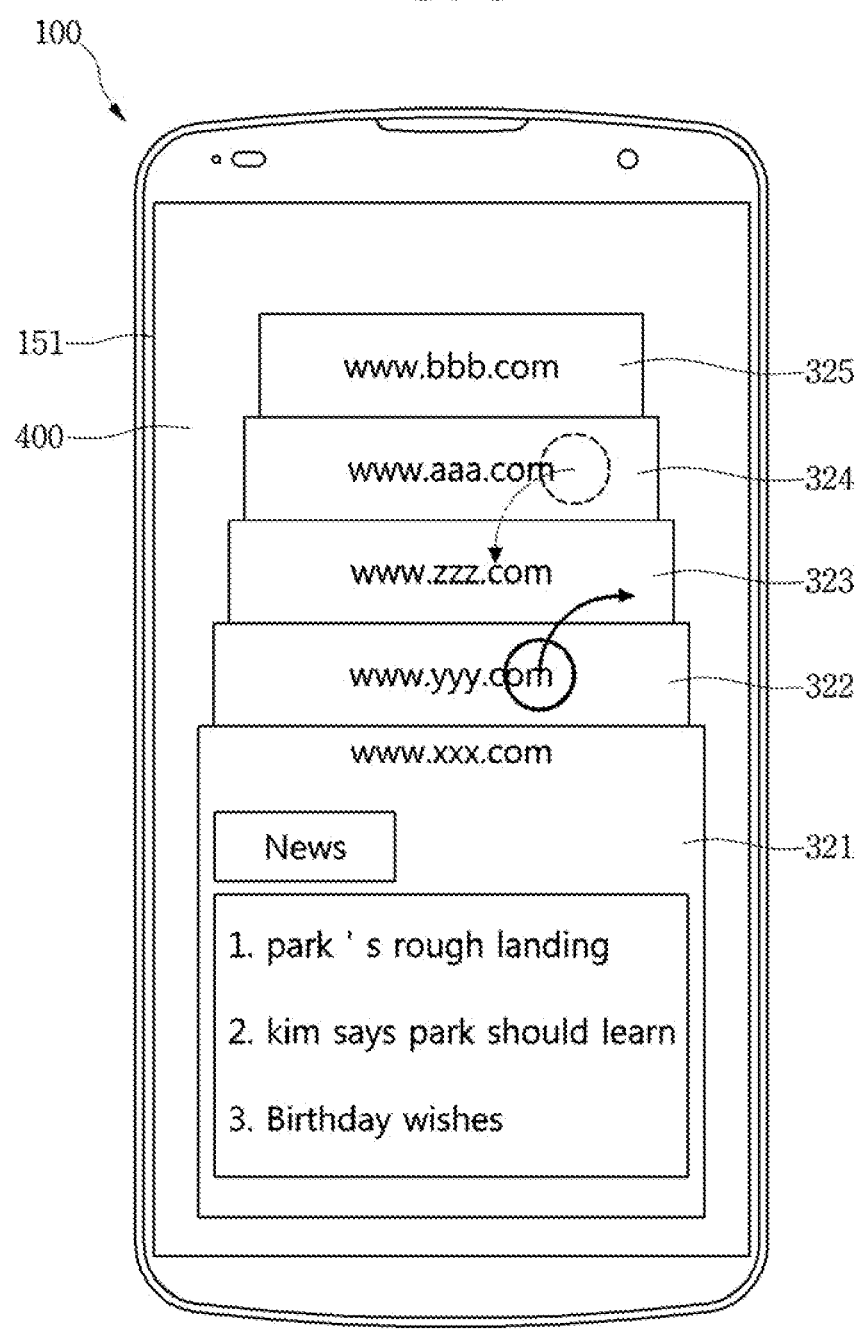

Referring to FIG. 8A, the display unit 151 of the transparent display device 100 may display an access screen of a predetermined web site on the screen 400. When a two side grip input and a grip unfolding input for unfolding the two side grip input in a first direction is received on the screen 400, as illustrated in FIG. 8B, the controller 180 may control the display unit 151 to display the plurality of objects 321 to 325 on the screen 400. Here, the first direction may be a direction for moving the front touch input in the clockwise direction and moving the rear touch input in the counter-clockwise direction.

The plurality of objects 31 to 325 may be web site access screens respectively corresponding to recently accessed web sites. The first object 321 may be an access screen (i.e. access screen of a web site that is being currently displayed on the display unit) of a web site that is most recently accessed, and the second to fifth objects 322 to 325 may be followed. Before the grip unfolding input is received, the first object 321 may show that the access screen of the web site displayed on the screen 400 is contracted. On each card object, information on content provided by a corresponding web site may be displayed.

In an embodiment, an interval between the objects 321 to 325 may be changed based on an unfold length according to the grip unfolding input. In other words, as the unfold length according to the grip unfolding input is increased, the interval between the objects 321 to 325 may be increased. On the other hand, as the unfold length according to the grip unfolding input is shorter, the interval between the objects 321 to 325 may be decreased.

Figure 8C:
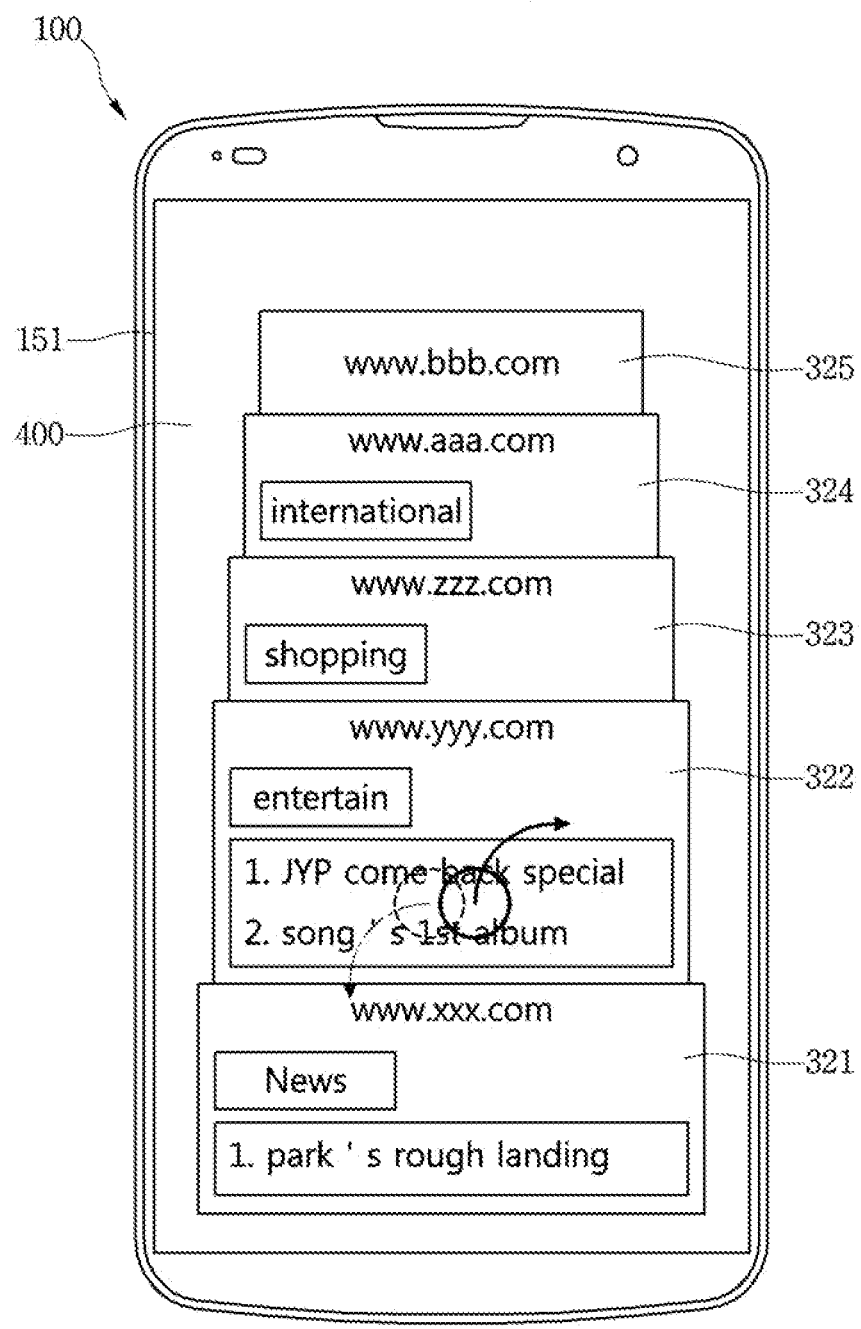

In FIG. 8B, when a front touch input is received on the second object 322 and a rear touch input is received on the fourth object 324, namely, a two side grip input is received and a grip unfolding input for moving the two side grip input in a first direction is received, as illustrated in FIG. 8C, the controller 180 may control the display unit 151 to increase the interval between the second to fourth objects 322, 323, and 324. Accordingly, content information shown by each of the second to fourth objects may be increased.

The user may conduct actions of gripping and unfolding two objects to adjust the interval of the objects and may view more information displayed on each object more rapidly.

Furthermore, according to an embodiment, when a two side grip input for one object is received and an input for unfolding the received two side grip input is received, a plurality of lower layer objects related to a corresponding object may be displayed. Regarding this, detailed description is provided with reference to FIG. 8D.

Figure 8D:
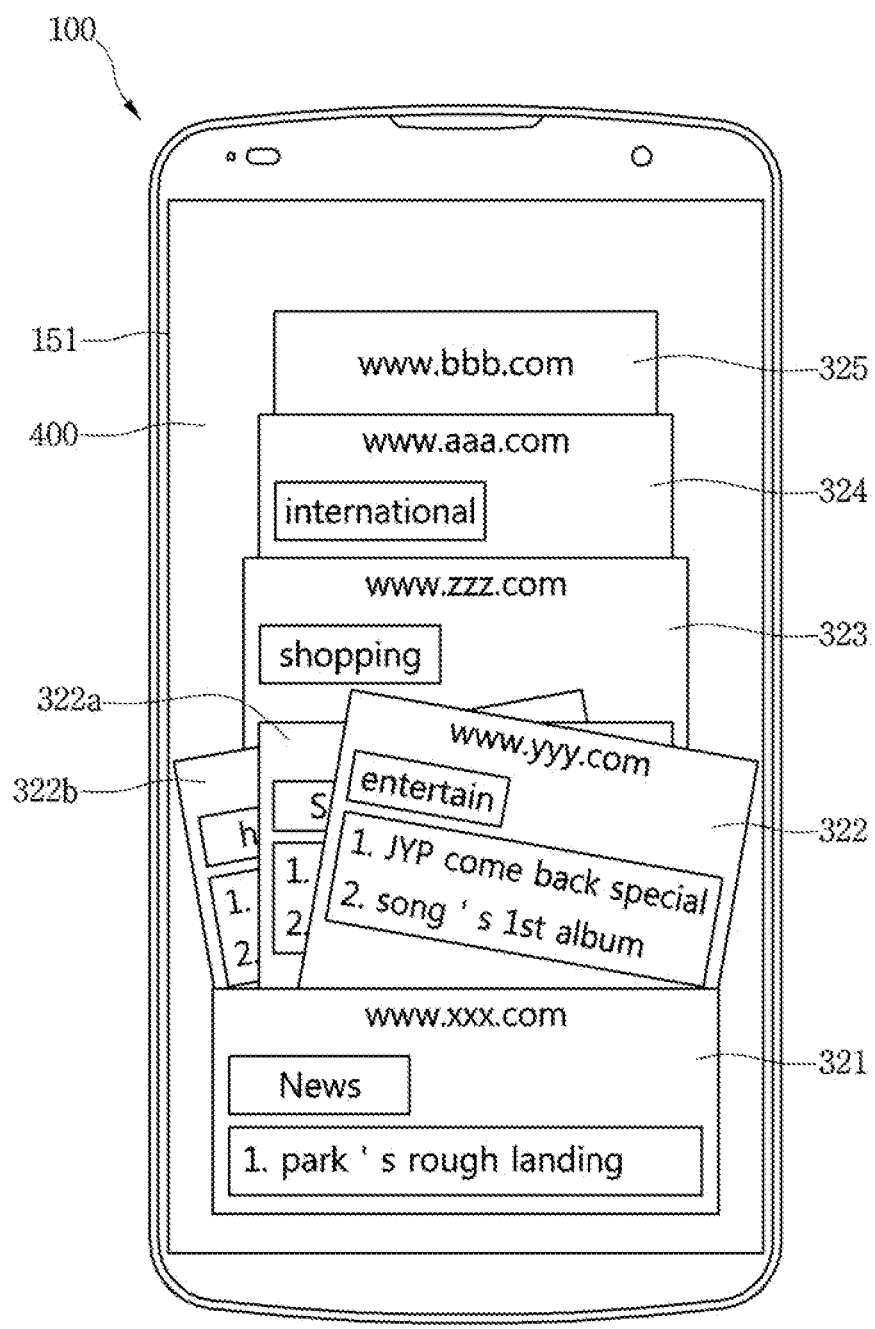

In FIG. 8C, when receiving a two side grip input for the second object 322, the controller 180 may control the display unit 151 to display the plurality of lower layer objects corresponding to the second object 322. In detail, when the second object 322 represents an access screen of a web site <www.yyy.com>, according to reception of the two side grip input for the second object 322, the controller 180 may display, on one side of the second object 322 as illustrated in FIG. 8D, a first lower layer object 322a and second lower layer object 322b respectively representing previously accessed screens at the corresponding web site. At time same, the size of the second object 322 may be reduced.

The user may easily check web site screens that the user have previously viewed at the corresponding web site only with a two side grip action and an unfolding action for the two side grip action.

Furthermore, in an embodiment, different kinds of objects may be provided according to a direction in which the two side grip input is unfolded.

Figure 9A:
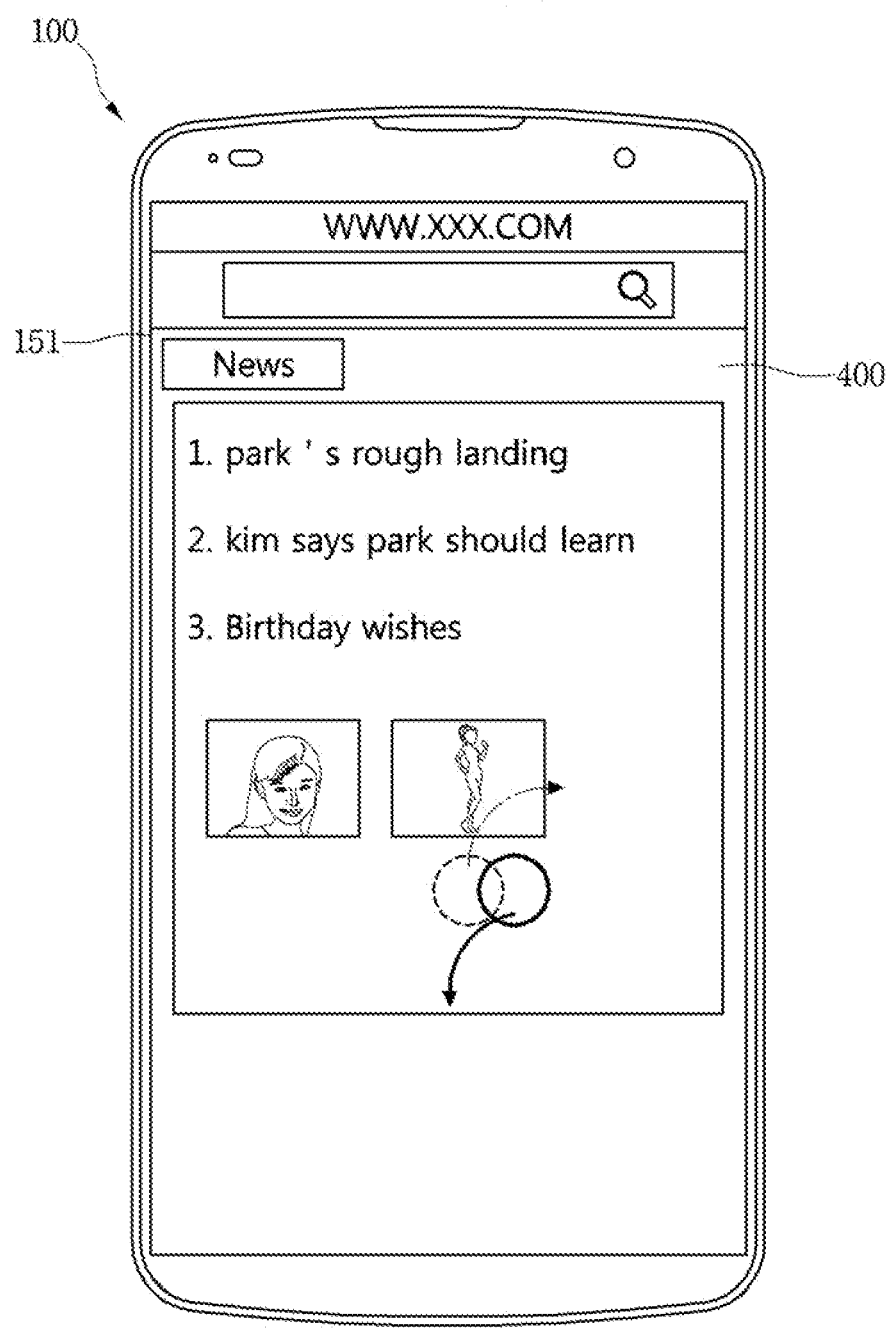

FIGS. 9A and 9B are views for explaining an embodiment for providing other kinds of objects on the basis of a direction in which the two side grip input is unfolded.

Description will be provided by comparing FIGS. 9A and 9B with FIGS. 8A and 8B.

Referring to FIG. 9A, the display unit 151 of the transparent display device 100 may display an access screen of a predetermined web site on the screen 400. When a two side grip input and a grip unfolding input for unfolding the two side grip input in a second direction are received on the screen 400, as illustrated in FIG. 9B, the controller 180 may control the display unit 151 to display the plurality of bookmarked objects 331 to 335 on the screen 400. Here, the second direction may be a direction for moving the front touch input in the counterclockwise direction and moving the rear touch input in the clockwise direction. The plurality of objects 331 to 335 may be access screens of web sites bookmarked as favorites, respectively. In other words, in FIG. 9B, unlike the access screens respectively corresponding to recently accessed web sites in FIG. 8B, the access screens of the bookmarked web sites may be displayed. In other words, according to a direction that the two side grip input is unfolded, different kinds of objects may be provided.

Next, a description will be provided about an embodiment that when the two side grip input is unfolded in a predetermined direction on an execution screen of a music application, a plurality of card objected related to the music application is displayed.

Figure 10A:
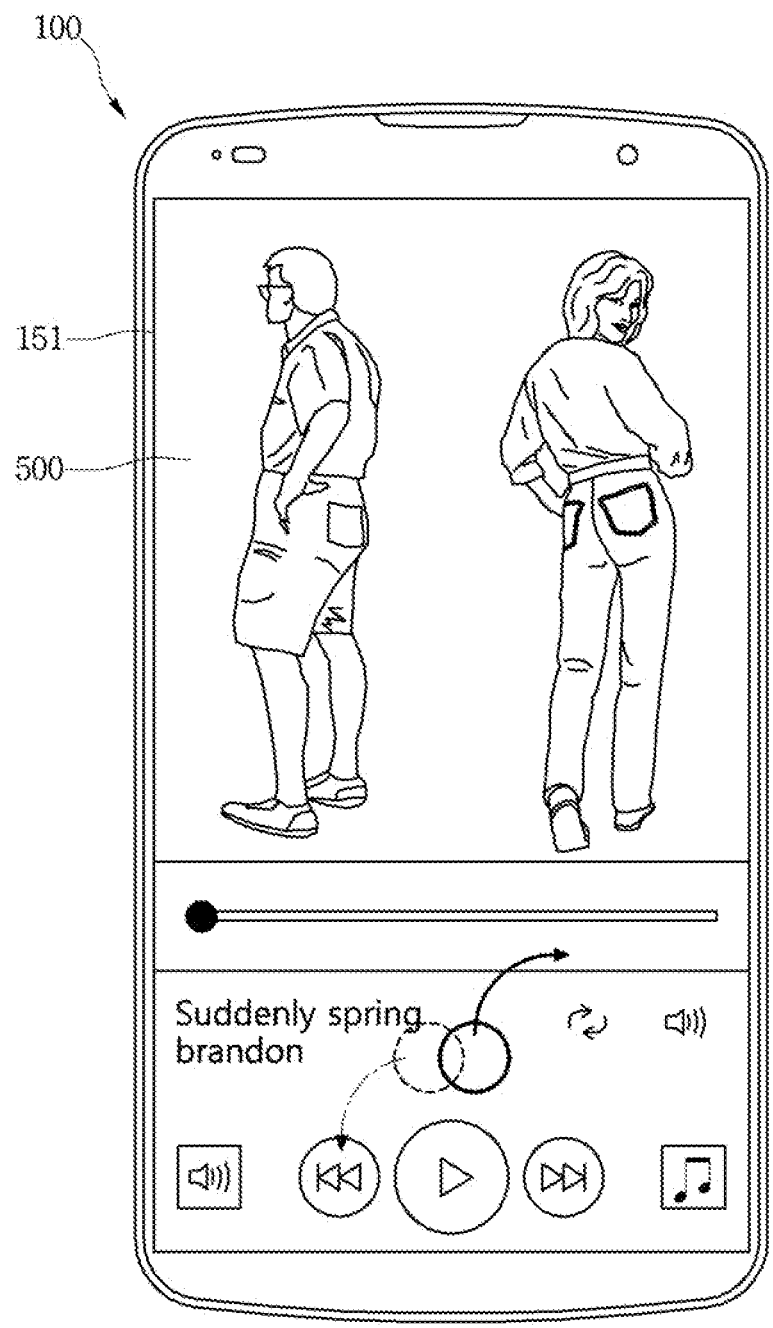
Figure 10B:
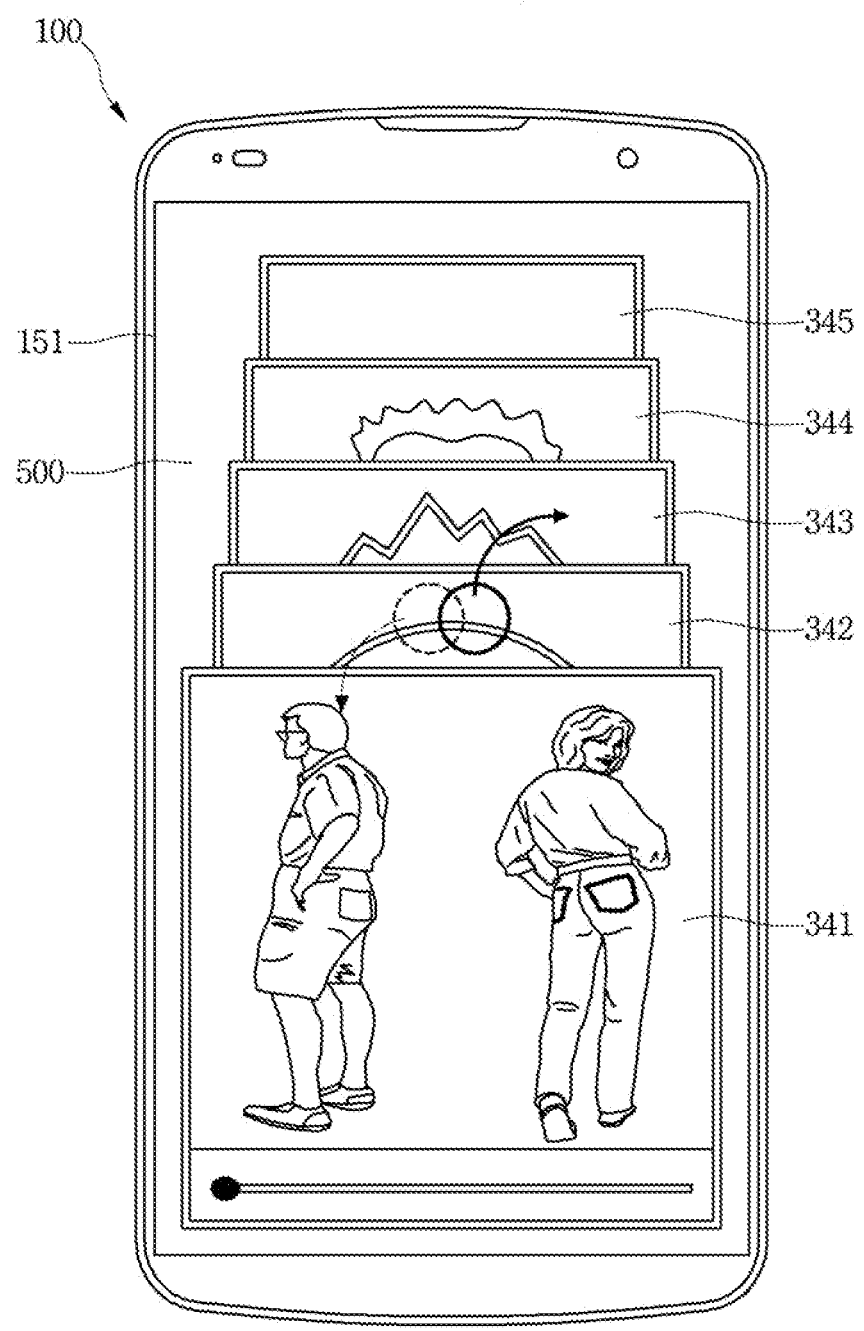

FIGS. 10A to 10C are views for explaining another embodiment for displaying a plurality of objects related to information, which is displayed on the display unit, according to reception of the grip unfolding input.

Referring to FIG. 10A, the display unit 151 of the transparent display device 100 may display an execution screen of a music application on the screen 500. On the execution screen 500 of the music application, information on a song that is being played, a playback control window for controlling playback of the song, or the like may be displayed. When a two side grip input and a grip unfolding input for unfolding the two side grip input in a first direction are received on the screen 500, as illustrated in FIG. 10B, the controller 180 may control the display unit 151 to display the plurality of objects 341 to 345 on the screen 500. Here, the first direction may be a direction for moving the front touch input in the clockwise direction and moving the rear touch input in the counterclockwise direction. The plurality of objects 341 to 345 may respectively represent information on songs included in a play list. The information on a song may include one or more of an image of an album including the song, detailed information on the album, a lyric of the song, and a composer and songwriter of the song. On the first object 341, information on a currently played song may be displayed.

In FIG. 10, when a two side grip input for the second object 342 is received and a grip unfolding input for moving the two side grip input in a first direction are received on the screen 500, as illustrated in FIG. 10C, the controller 180 may control the display unit 151 to display the plurality of lower layer objects 342a to 342b related to the second object 342. As an example, the first lower layer object 342a and second lower layer object 342b may include information on other songs composed by a composer who has composed a song corresponding to the second object 342. As another example, the first lower layer object 342a and second lower layer object 342b may include information on other songs sung by a singer who has sung a song corresponding to the second object 342.

Next, an embodiment for displaying a plurality of objects related to a file management application will be described, when a two side grip input is unfolded in a predetermined direction on an execution screen of a file management application for managing content stored in the transparent display device 100.

Figure 11B:
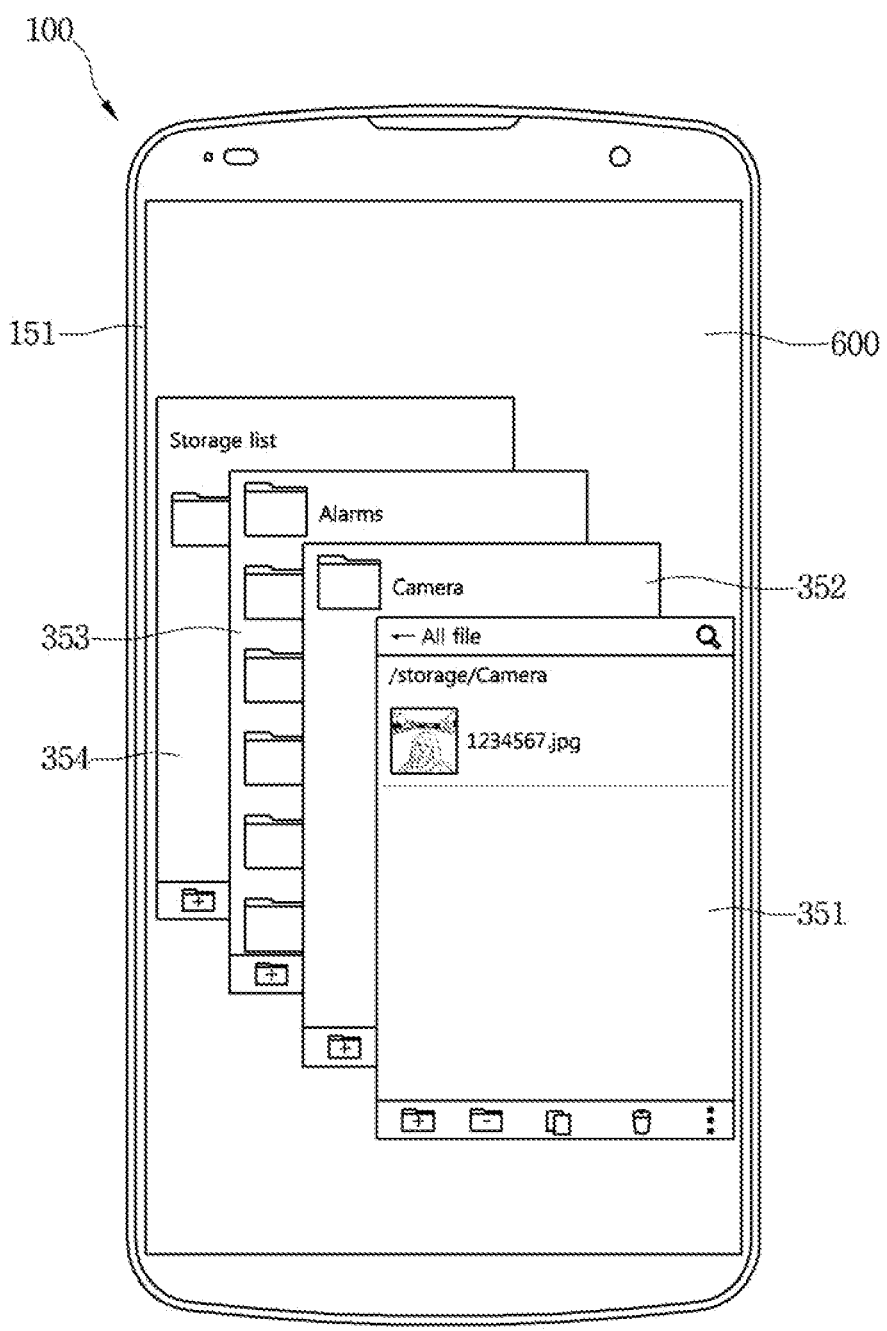

FIGS. 11A and 11B are views for explaining another embodiment for displaying a plurality of objects related to information, which is displayed on the display unit, according to input of the grip unfolding input.

Referring to FIG. 11A, the display unit 151 of the transparent display device 100 may display an execution screen 600 of a file management application. On the execution screen 600, information on content stored in the transparent display device 100 may be displayed. When a two side grip input and a grip unfolding input for unfolding the two side grip input in a first direction are received on the executed screen 600 of the file management application, as illustrated in FIG. 11B, the controller 180 may control the display unit 151 to display the plurality of objects 351 to 354 on the screen 600. Here, the first direction may be a direction for moving the front touch input in the clockwise direction and moving the rear touch input in the counterclockwise direction. The plurality of objects 351 to 354 may respectively represent storage paths of content displayed on the execution screen 600. In other words, the second object 352 may include information on an upper layer folder where content displayed on the first object 351 is stored, the third object 353 may include information on a further upper layer folder than the upper layer folder represented by the second object 352, and the fourth object 354 may include information on a further upper layer folder than the upper layer folder represented by the third object 353. The user may easily check a storage path of content only with a two side grip action and an action for unfolding the two side grip action.

According to another embodiment, a description will be provided about an embodiment where an arrangement of a plurality of objects is changed according to reception of a grip unfolding input in a state where a plurality of objects overlap.

FIGS. 12A to 12D are views for explaining an embodiment for changing disposition of a plurality of objects in response to the two side grip input and grip unfolding input.

Figure 12A:
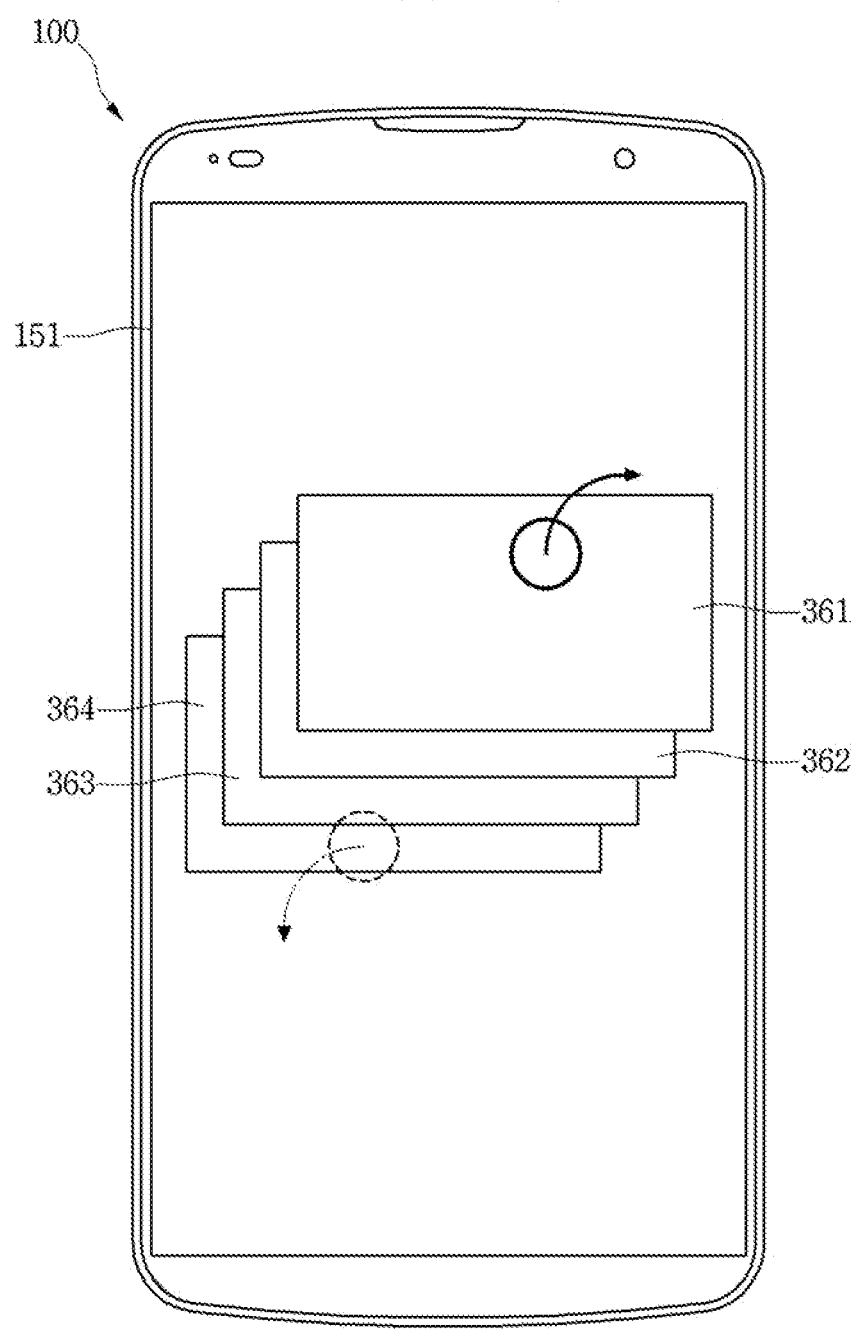
FIGS. 12A, 12B, 12C and 12D are views for explaining an embodiment for changing disposition of a plurality of objects in response to the two side grip input and grip unfolding input.
Figure 12B:
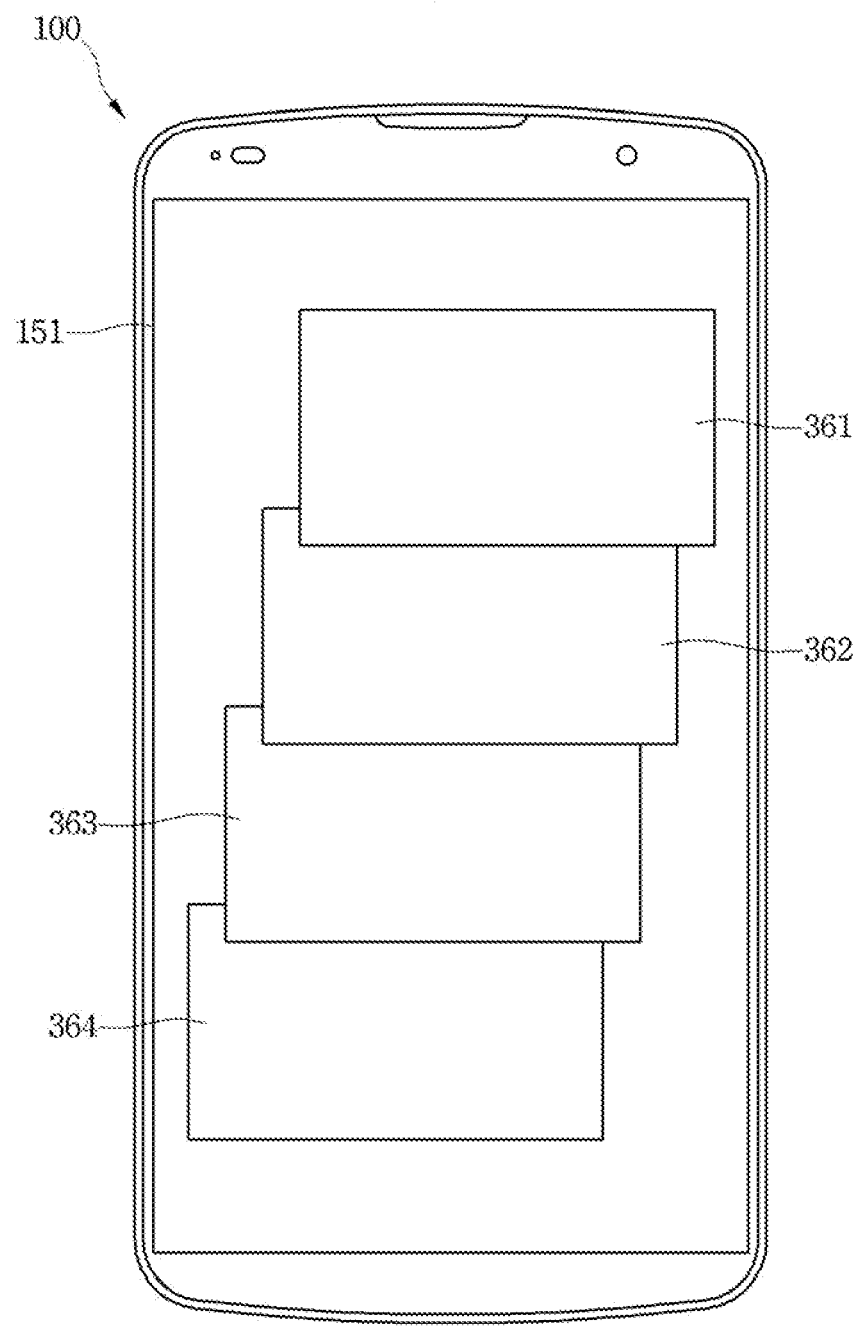

Referring to FIG. 12A, the display unit 151 of the transparent display device 100 may display a plurality of objects 361 to 364. The plurality of objects 361 to 364 may overlap each other. In this state, when a two side grip input including a front touch input for the first object 361 and a rear touch input for the fourth object 364 is received and a grip unfolding input for moving the received two side grip input in a predetermined direction is received, as illustrated in FIG. 12B, the controller 180 may control the display unit 151 to allow the plurality of objects 361 to 364 to be unfolded and displayed. In other words, as the interval between objects is increased, information displayed on the object may be increased.

Figure 12C:
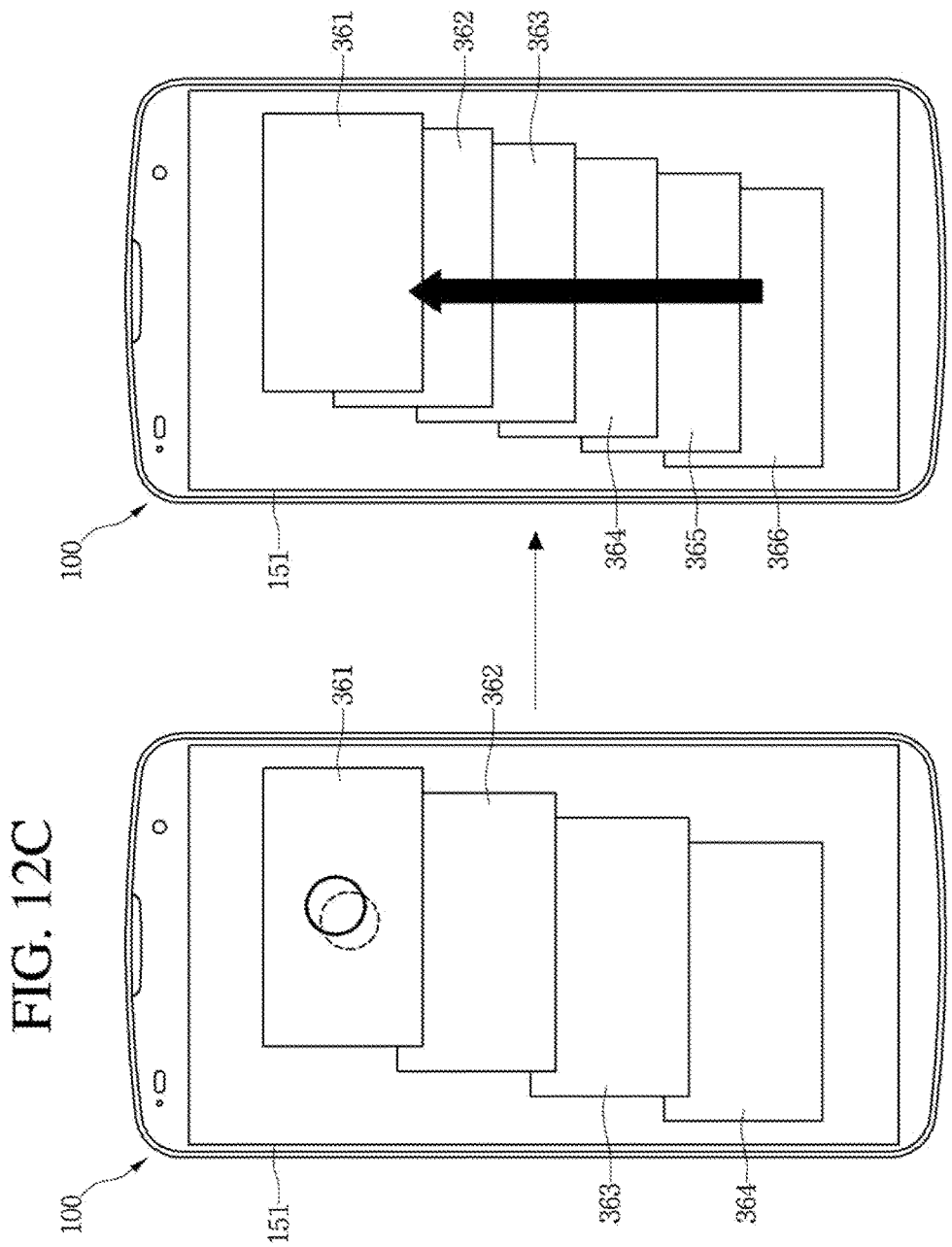

In this state, as illustrated in FIG. 12C, when a two side grip input for the first object 361 located at the foremost side is received for a predetermined time, the controller 180 may superpose remaining objects 362, 363, and 364 behind the first object 361 with the first object 361 and sequentially dispose them. At the same time, the controller 180 may newly display objects 365 and 366, which have not been displayed, to be disposed behind the remaining objects 362, 363, and 364.

Figure 12D:
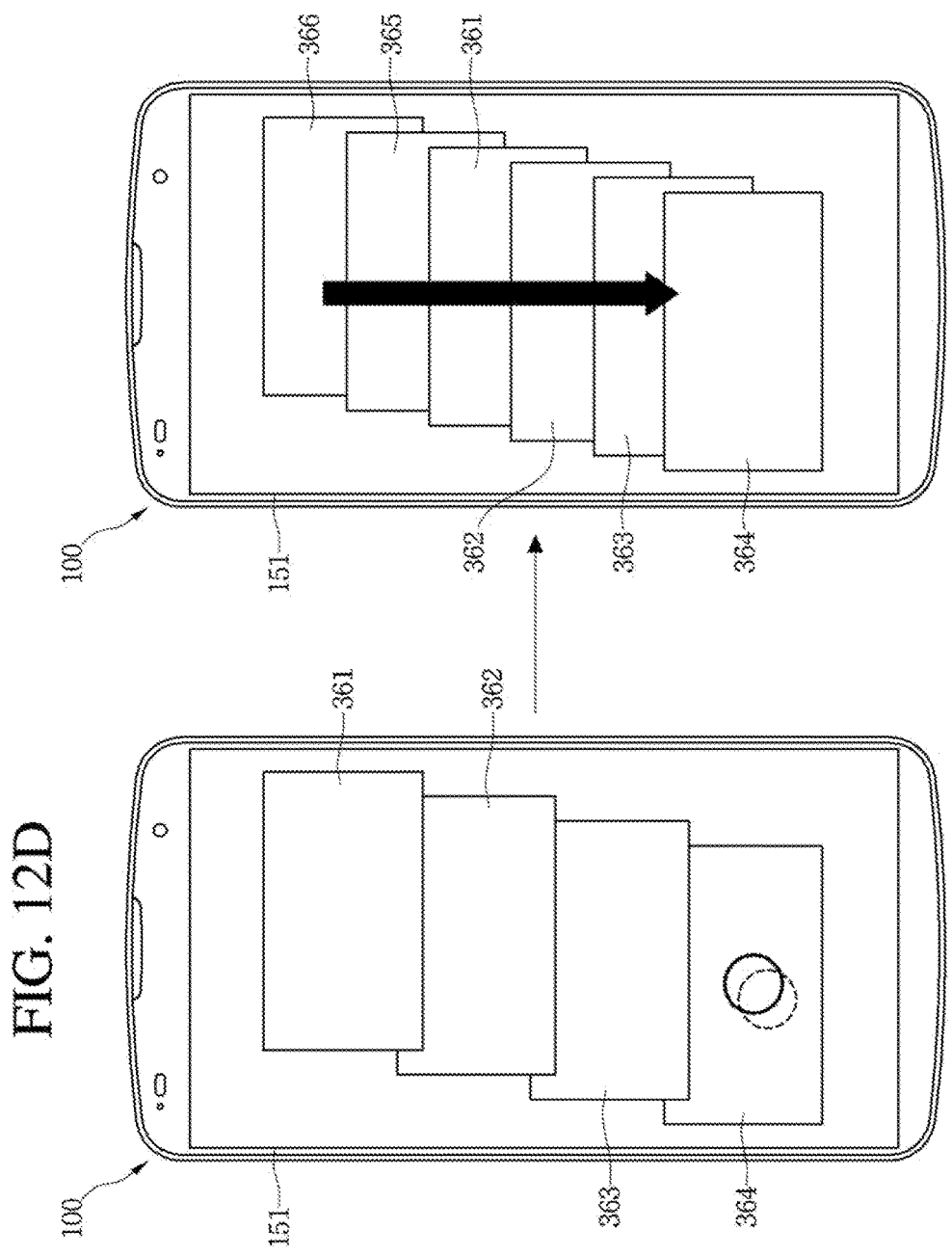

On the other hand, as illustrated in FIG. 12D, when a two side grip input for the fourth object 364 located at the most backward side is received for a predetermined time, the controller 180 may superimposed remaining objects 361, 362, and 363 behind the fourth object 364 with the fourth object 364 and sequentially dispose them. At the same time, the controller 180 may newly display objects 365 and 366, which have not been displayed, to be disposed to be behind the remaining objects 362, 363, and 364.

In an embodiment, when the objects is separated by a predetermined distance or longer, an execution screen of an application corresponding to an object may be displayed on the object that is a target of the two side grip input.

FIGS. 13A to 13E are views for explaining an example that an execution screen of an application corresponding to an object is displayed on the object that is a target of the two side grip input, when the objects are separated by a predetermined distance or longer.

Figure 13A:
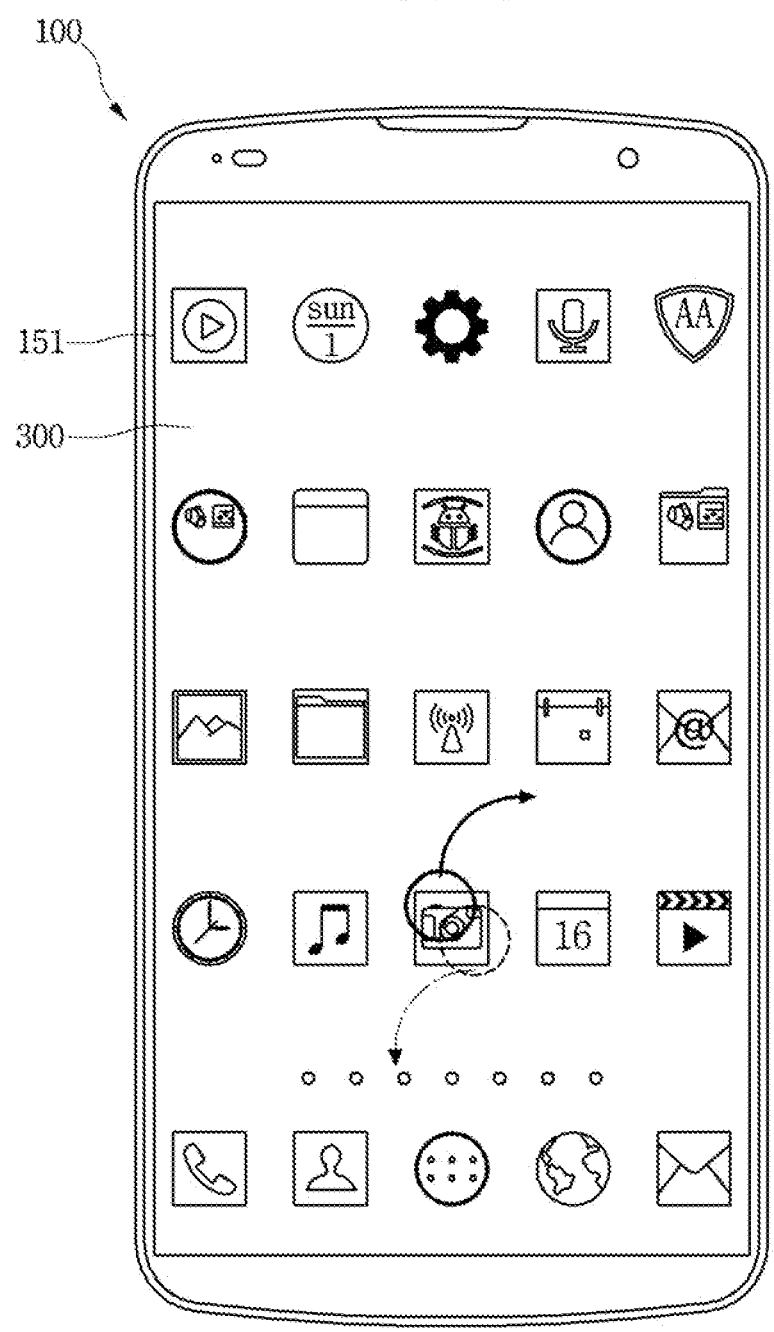
Figure 13B:
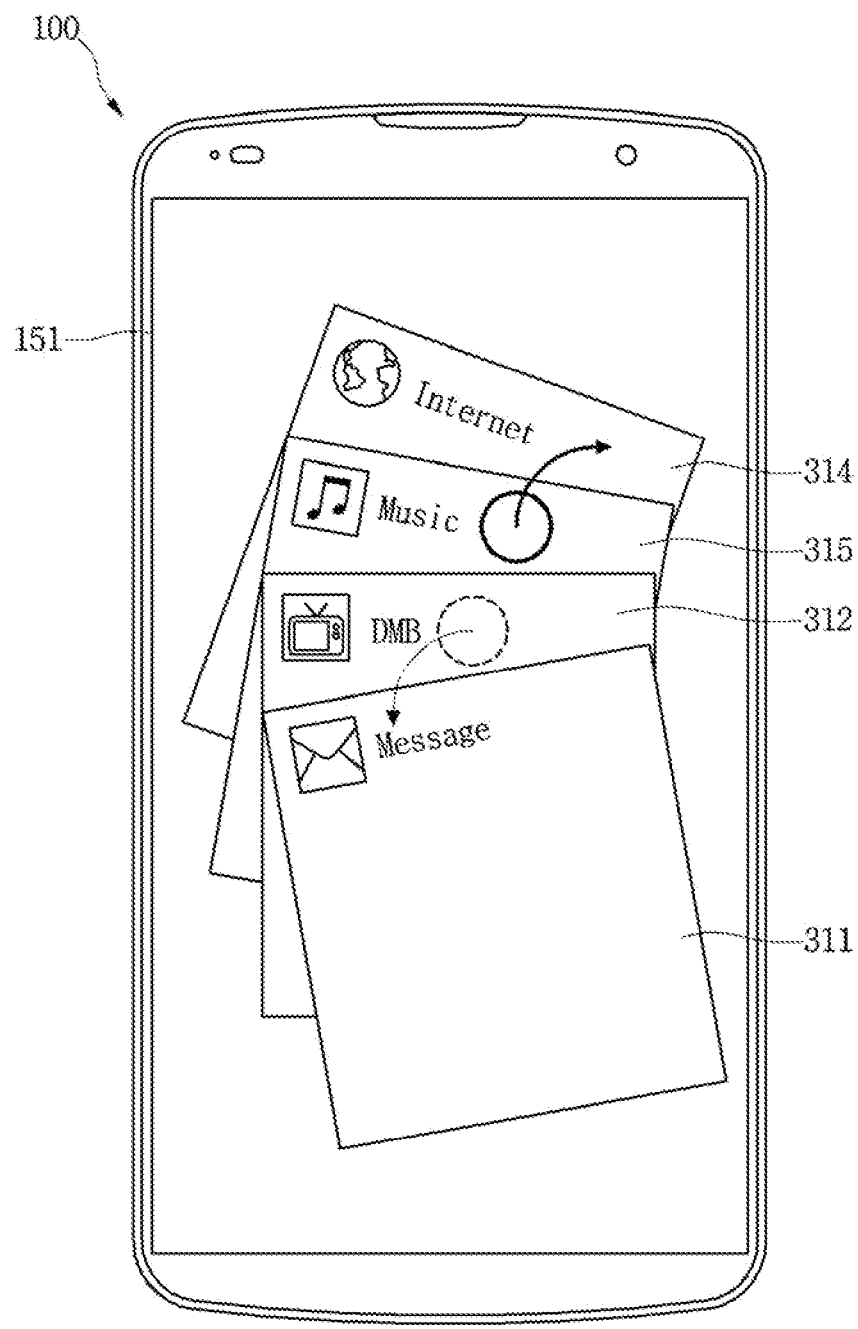

Referring to FIG. 13A, the display unit 151 of the transparent display device 100 may display, on the screen, a plurality of app icons respectively corresponding to a plurality of applications. The screen illustrated in FIG. 13A may be a home screen of the transparent display device. When a two side grip input and a grip unfolding input for unfolding the two side grip input in a first direction are received on the screen, as illustrated in FIG. 13B, the controller 180 may control the display unit 151 to display the plurality of objects 311 to 314 on the screen. The plurality of objects 311 to 314 may be execution screens of applications respectively corresponding to recently executed applications.

Figure 13C:
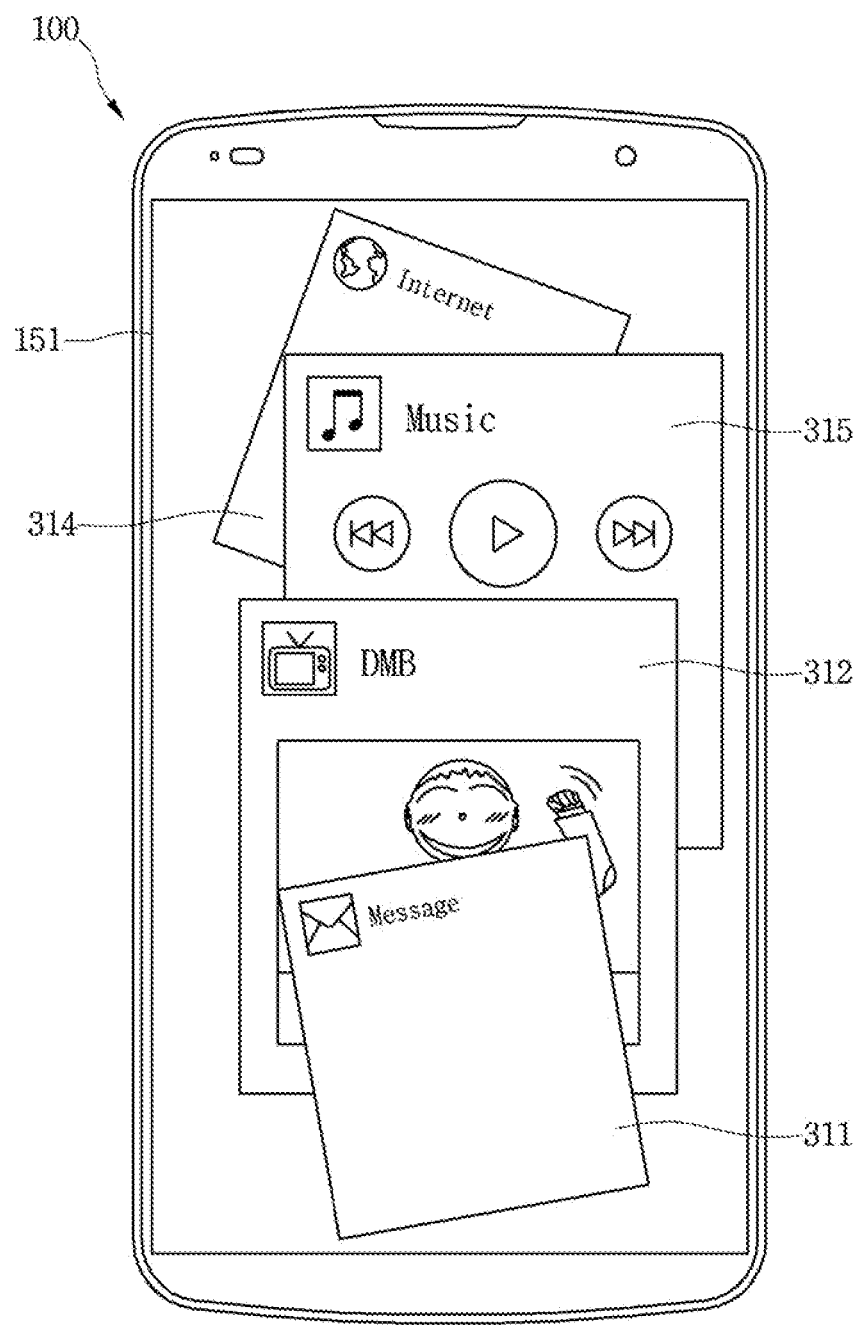

In FIG. 13B, when a rear touch input is received on the second object 312 and a front touch input is received on the fifth object 315 (i.e. a two side grip input is input on two card objects), and a grip unfolding input for unfolding the two side grip input is received, as illustrated in FIG. 13C, the controller 180 may control the display unit 151 to display an execution of a DMB application on the second object 312 that is a target of the two side grip input and an execution screen of a music application on the fifth object 315. When an interval between the second and fifth objects 312 and 315 is a predetermined distance or longer, the controller 180 may control the display unit 151 to display the execution screen of the DMB application on the second object 312 and the execution screen of the music application on the fifth object 315. The interval between the second and fifth objects 312 and 315 may be a distance between center points of the card objects.

A broadcast screen for a most recently viewed channel may be provided through the execution screen of the DMB application, and information on and a playback control window for a most recently played song may be provided through the execution screen of the music application.

The user may easily check the execution screen of a predetermined application without selecting to execute the predetermined application through actions for gripping and unfolding the display unit on two sides.

Figure 13E:
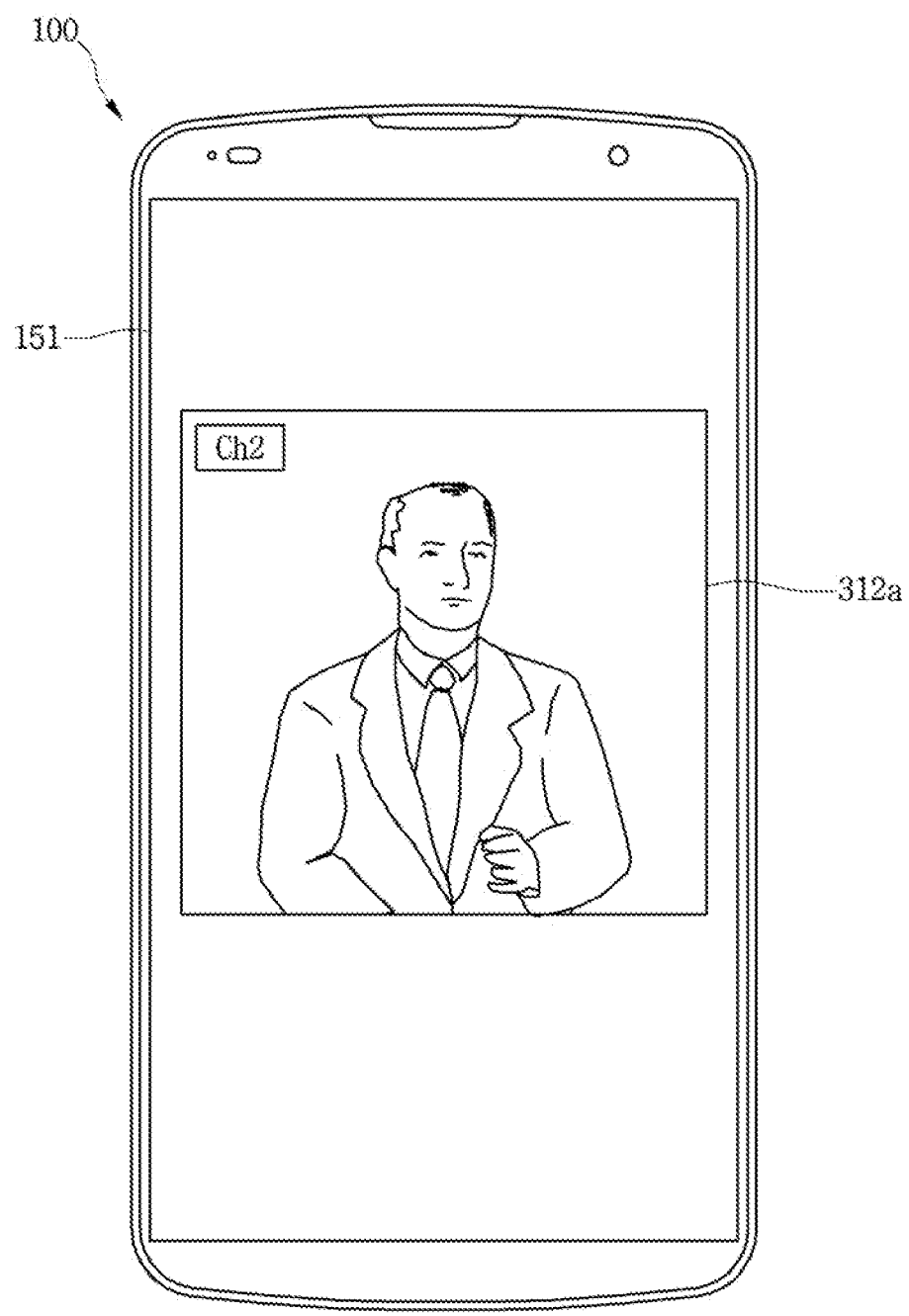

In FIG. 13B, when a rear touch input is received on the second object 312 and a front touch input is received on the fifth object 315 (i.e. a two side grip input is input on two card objects), and a grip unfolding input for unfolding the two side grip input is received, as illustrated in FIG. 13D, the controller 180 may control the display unit 151 to display execution of a DMB application on the second object 312 that is a target of the two side grip input and to display an execution screen of a music application on the fifth object 315. At the same time, the controller 180 may control the display unit 151 to display broadcast screens 312a and 312b, which have been previously viewed through the DMB application corresponding to the second object 312, and to display the information 315a and 315b on songs, which have been previously played through the music application corresponding to the fifth object 315. Each of the broadcast screens may be a thumbnail image of a broadcast program provided through each channel. When a front touch input is applied on a predetermined broadcast screen 312a, the controller 180 may display a broadcast screen 312a of currently being broadcast as illustrated in FIG. 13E.

In another embodiment, in a state where a plurality of objects are displayed, an object selected by a rear touch on a predetermined object may be rapidly executed.

FIGS. 14A to 14D are views for explaining an example for rapidly executing a predetermined object selected by the rear touch in a state where a plurality of objects are displayed according to various embodiments.

Figure 14A:
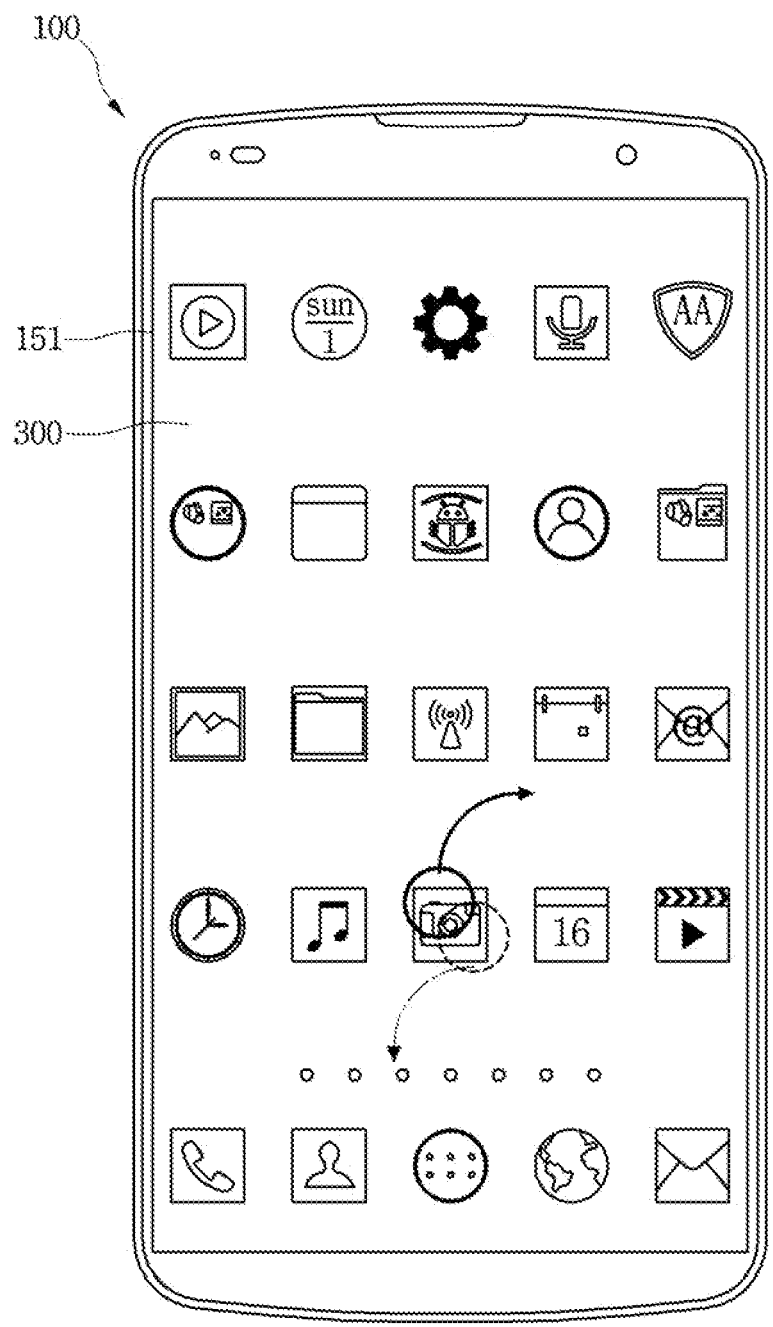
FIGS. 14A, 14B, 14C and 14D are views for explaining an example for rapidly executing a predetermined object selected by a rear touch in a state where a plurality of objects are displayed according to various embodiments.

Since the example illustrated in FIG. 14A is similar to that in FIG. 7A, a detailed description thereof will be omitted.

Figure 14B:
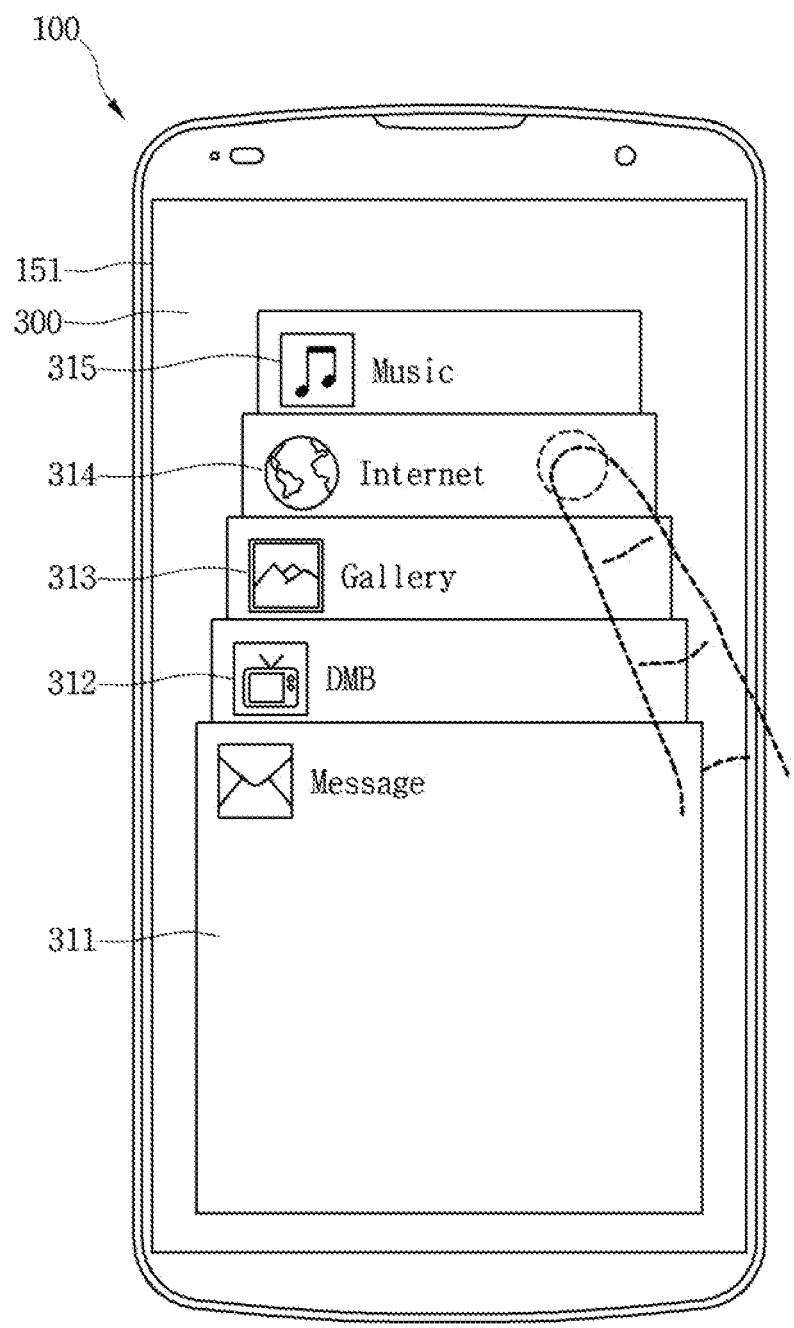
Figure 14C:
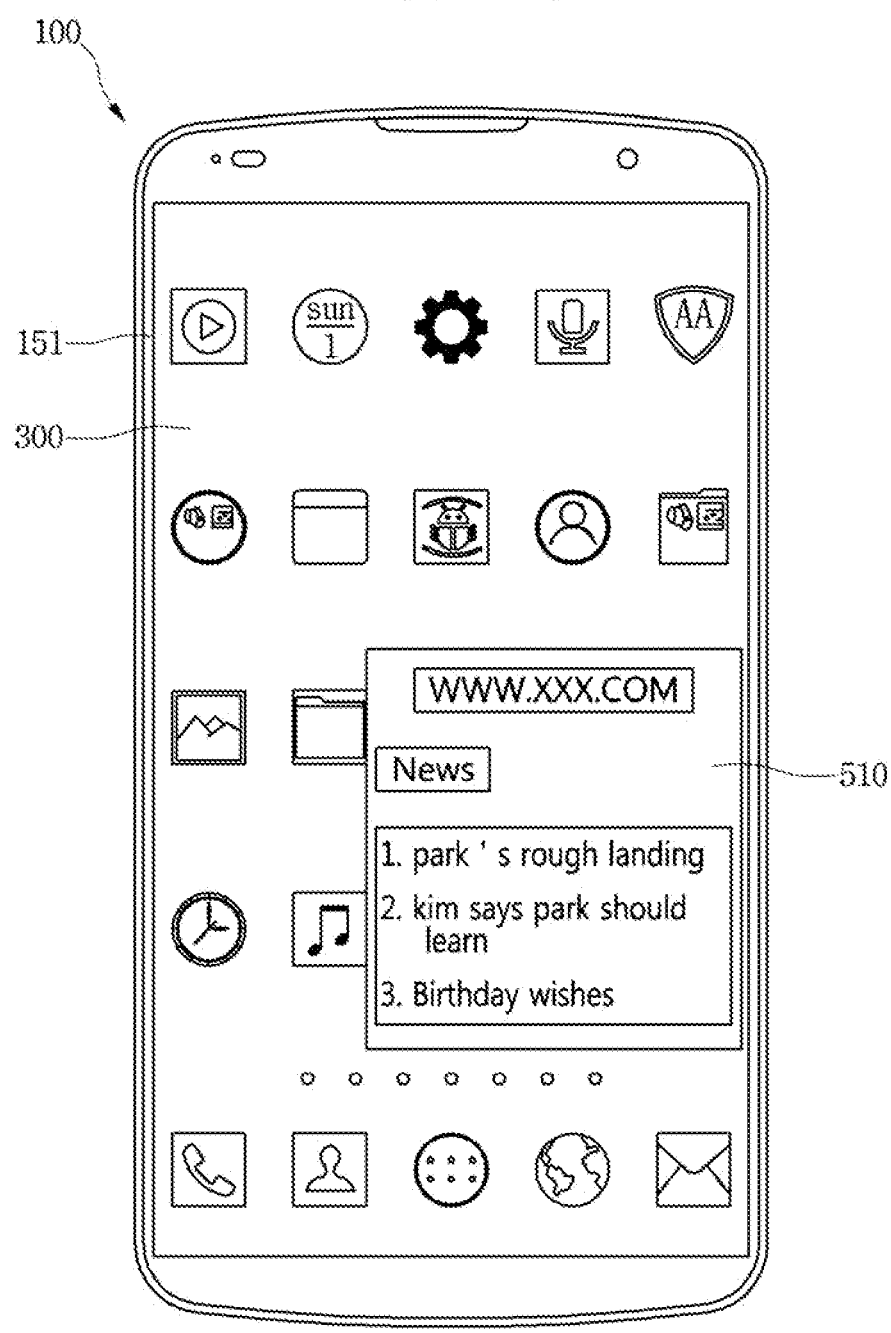
Figure 14D:
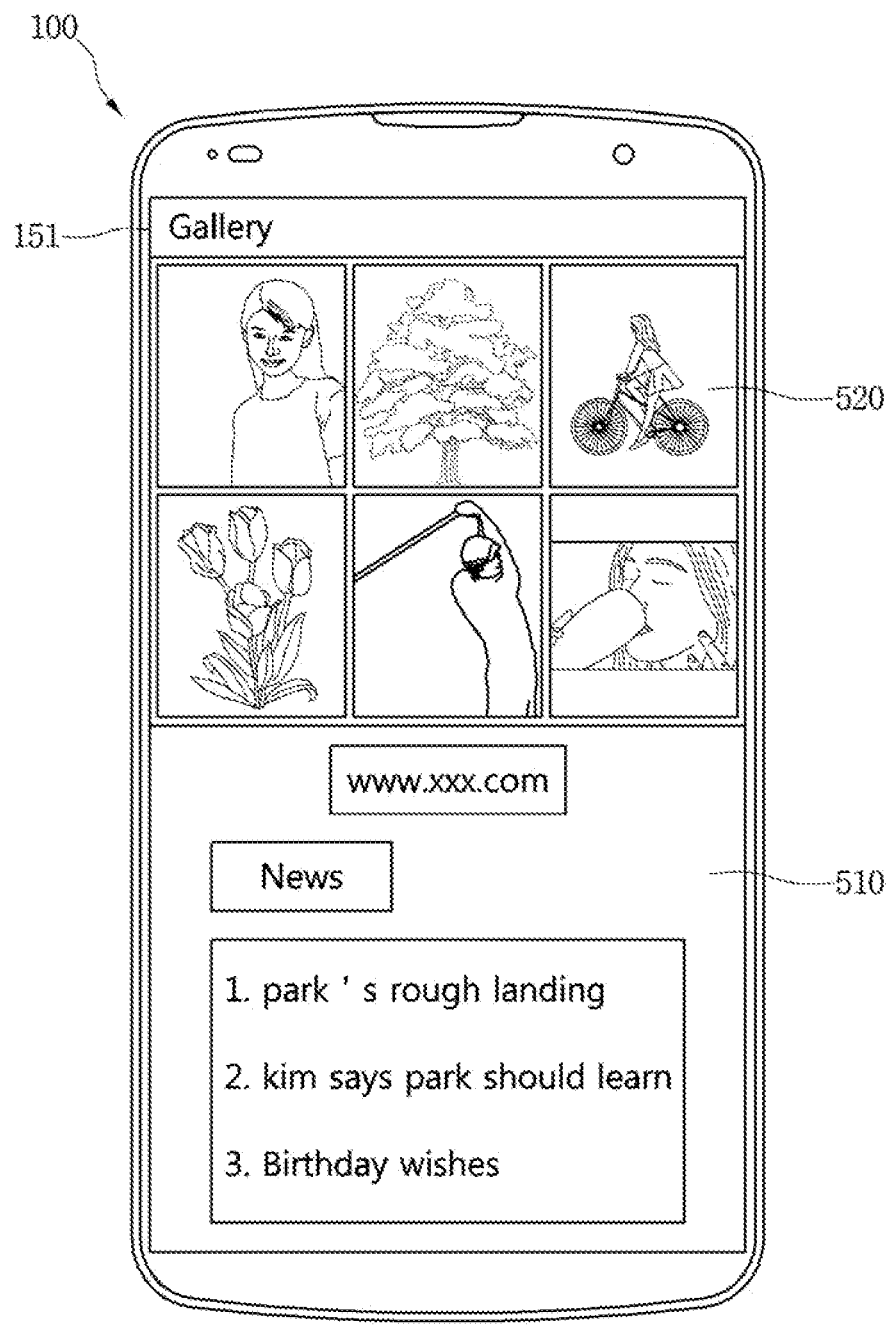

In FIG. 14B, when a rear touch input to the fourth object 314 among the plurality of objects 311 to 315 is received, the controller 180 may display an execution screen 510 of an Internet application corresponding to the fourth object 314 that the rear touch input is received on the screen 300 as illustrated in FIG. 14C. If, in FIG. 14B, rear touch inputs are respectively received for the third and fourth objects 313 and 314, the controller 180 may control the display unit 151 to simultaneously display an execution screen 520 of a gallery application corresponding to the third object 313 and the execution screen 510 of the Internet application corresponding to the fourth object 314 as illustrated in FIG. 14D.

The user may perform multi-tasking by easily executing desired applications only with a rear touch.

Figure 15B:
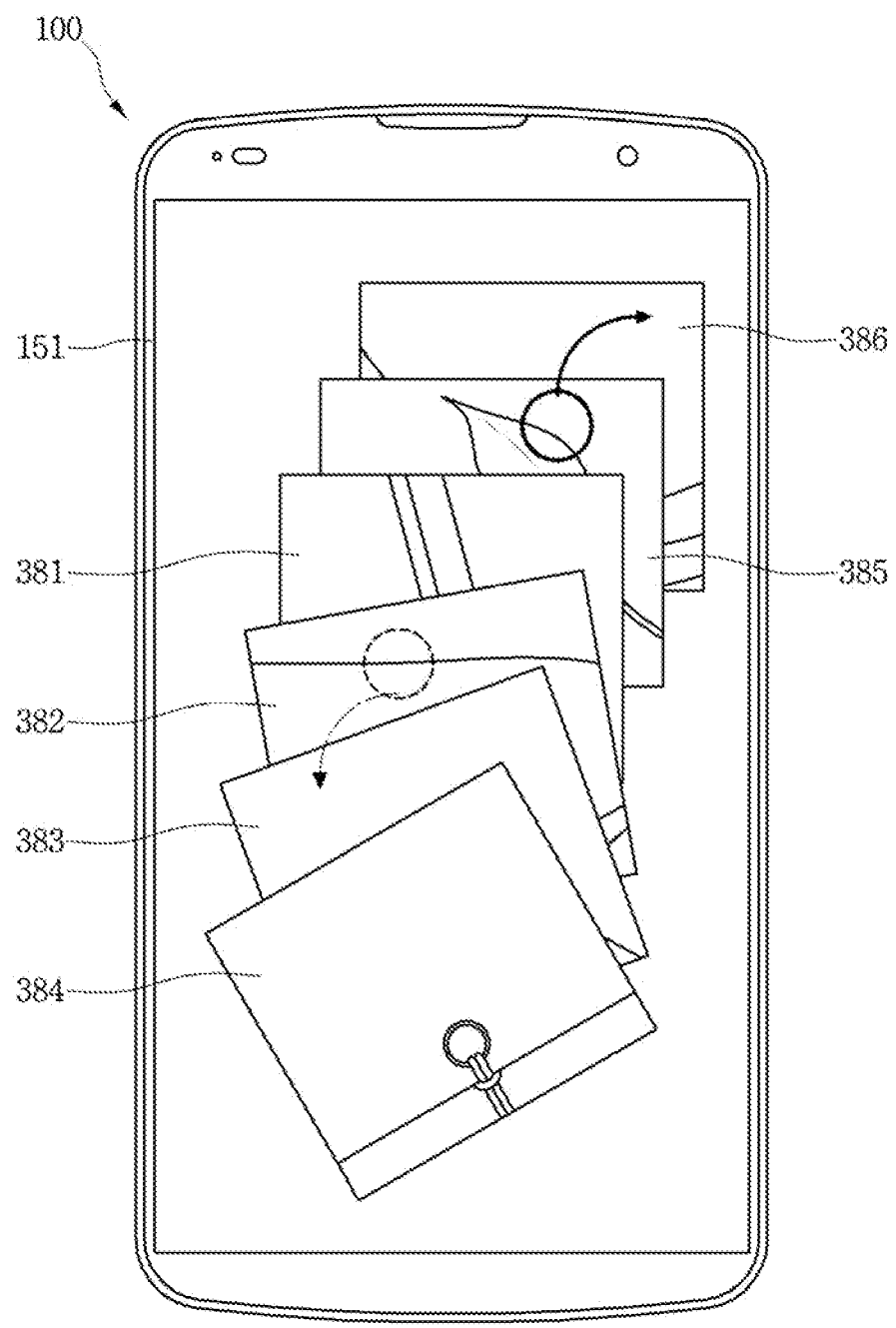
Figure 15C:
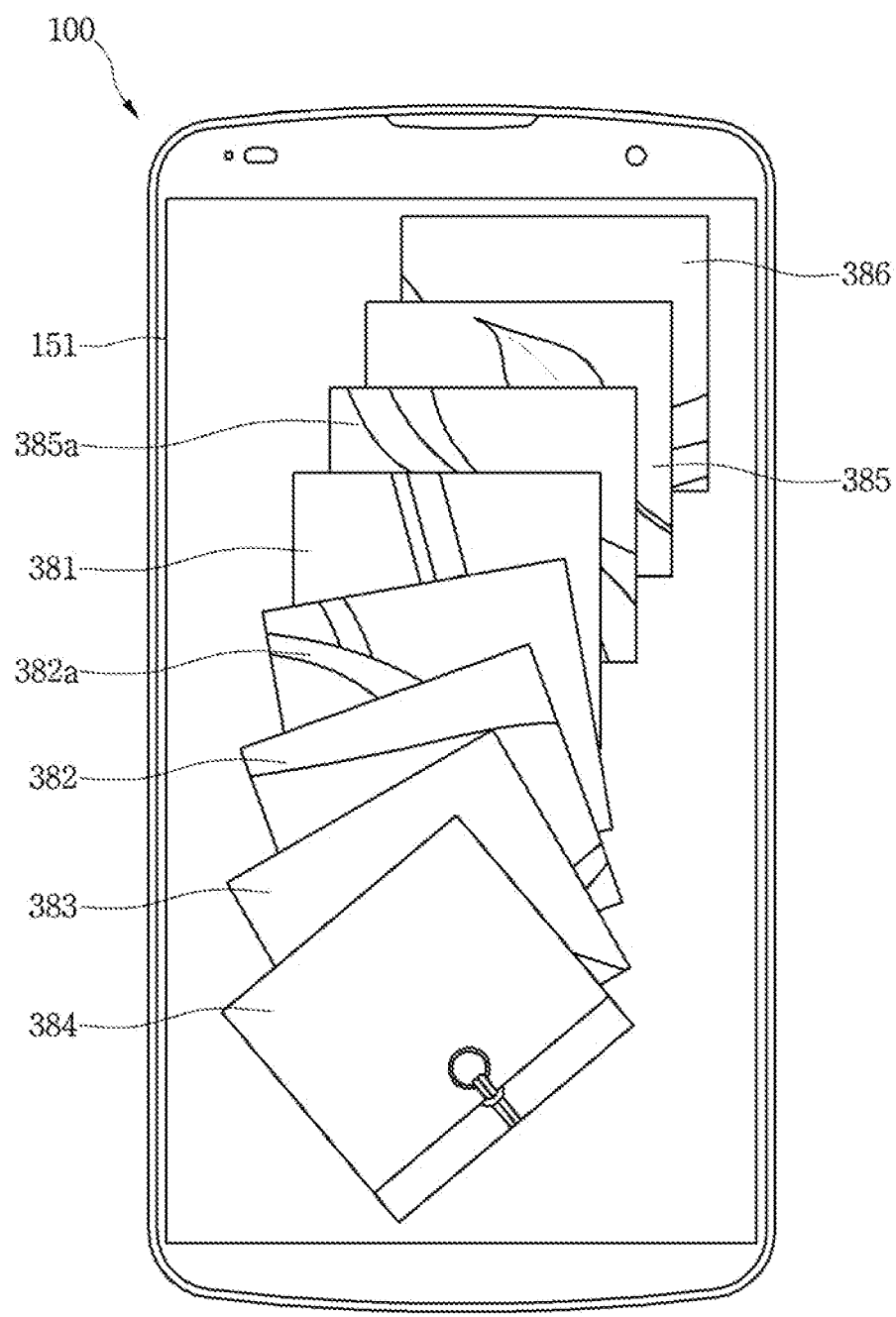

FIGS. 15A to 15C are views for explaining another embodiment for receiving a plurality of objects related to information, which is displayed on the display unit, according to reception of a grip unfolding input.

A description will be provided under assumption that in FIGS. 15A to 15C, the object is an image.

Referring to FIG. 15A, the display unit 151 of the transparent display device 100 displays a first image 381. In this state, when a grip unfolding input is received which moves the two side grip input in a predetermined direction on a screen of the display unit 151, the controller 180 may control the display unit 151 to display a plurality of images 382 to 386 related to the first image 381 as illustrated in FIG. 15B. As an example, the controller 180 may control the display unit 151 to display, in front of the first image 381, the images 382 to 384 having a color similar to that of the first image 381 among images stored in the memory 170, and to display the images 385 and 386 having a form similar to that of the first image 381.

In FIG. 15B, when a front touch input for the fifth image 385 and a rear touch input for the second image 382 are received (i.e. a two side grip input is received), the controller 180 may control the display unit 151 to display, between the images, an image 382a of which a color or form is similar to that of the second image 382 and an image 385a of which a color or form is similar to that of the fifth image 385 as illustrated in FIG. 15C.

According to an embodiment, various operations may be performed through the rear touch input.

Figure 16A:
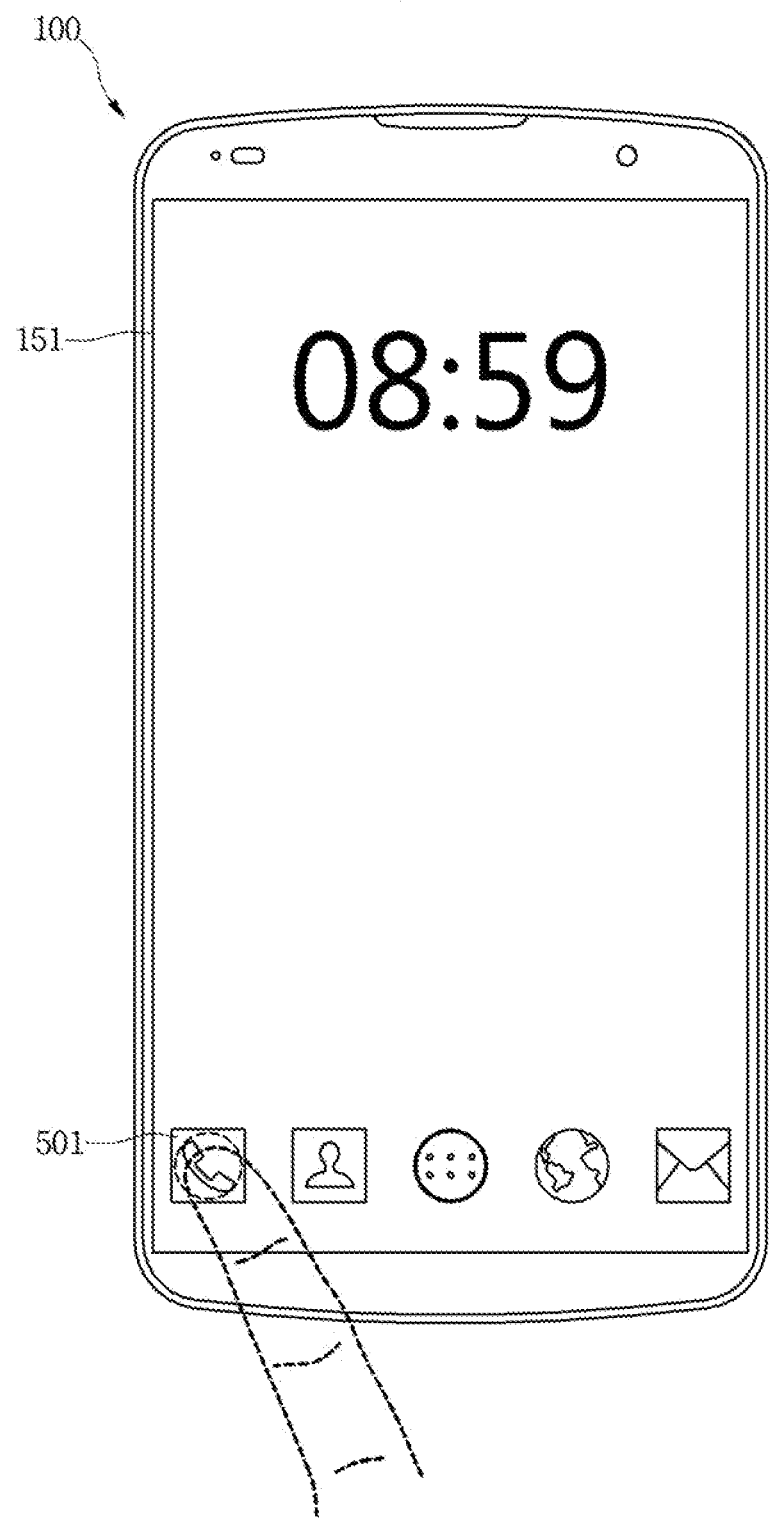
FIGS. 16A, 16B and 16C are views for explaining a function providable in response to a rear touch input to an app icon according to an embodiment.
Figure 16B:
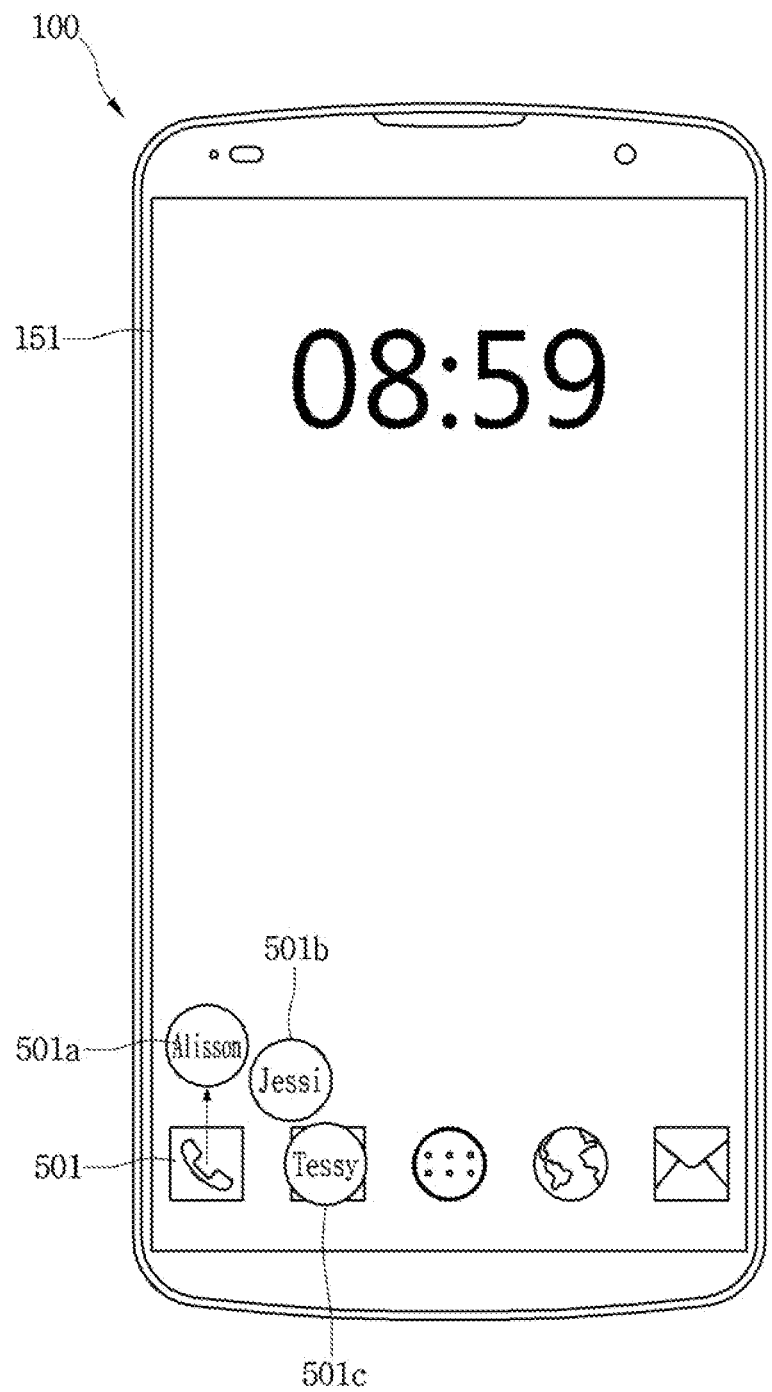
Figure 16C:
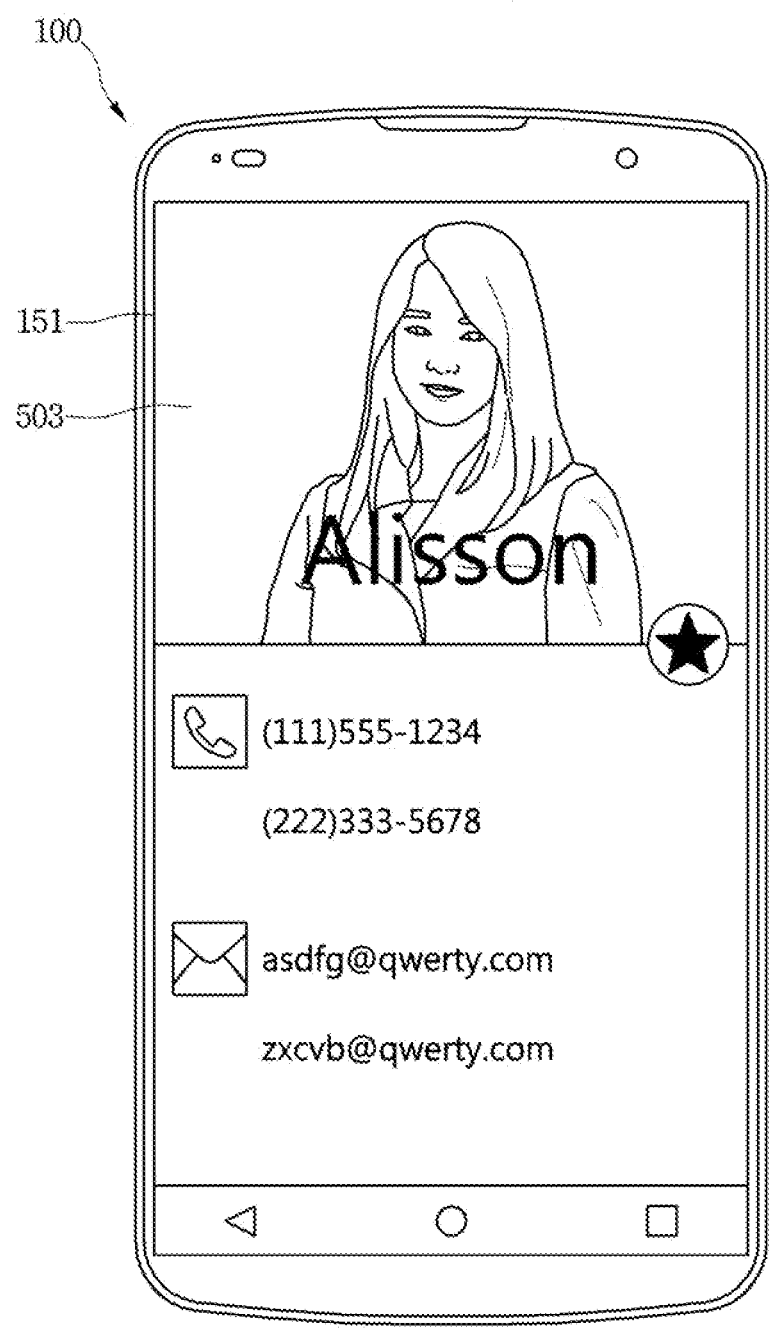

FIGS. 16A to 16C are views for explaining a function providable in response to a rear touch input to an app icon according to an embodiment.

Referring to FIG. 16A, the display unit 151 displays a call app icon 501 corresponding to a call application. When a rear touch input for touching the call app icon 501 on the rear side of the display unit 151 is received, the controller 180 may control the display unit 151 to display a plurality of contact icons 501a to 501c corresponding to recently contacted contacts on one side of the call app icon 501 as illustrated in FIG. 16B. The plurality of icons 501a to 501c may be displayed to be adjacent to the call app icon 501 in a bubble type. When an input is received for touching the call app icon 501 on the rear side thereof and dragging to drop it to a predetermined contact icon 501a, the controller 180 may transmit a call signal to an opponent's terminal corresponding to the contact icon 501. In other words, the controller 180 may display a call signal transmission screen 503 for transmitting the call signal to a terminal of "Alisson", as illustrated in FIG. 16C.

The call app icon is just an example. When a rear touch input is received on a gallery app icon corresponding to a gallery application, the controller 180 may display a recently stored or recently captured image in an icon type. As another example, when a rear touch input is received on a camera app icon corresponding to a camera application, the controller 180 may display an icon for controlling a front side camera, an icon for controlling a rear side camera, and an icon for capturing a video.

The user may perform multi-tasking through the rear touch input while viewing a current screen.

FIGS. 17A to 17D are views for explaining a function providable in response to a rear touch input to an app icon according to another embodiment.

Figure 17A:
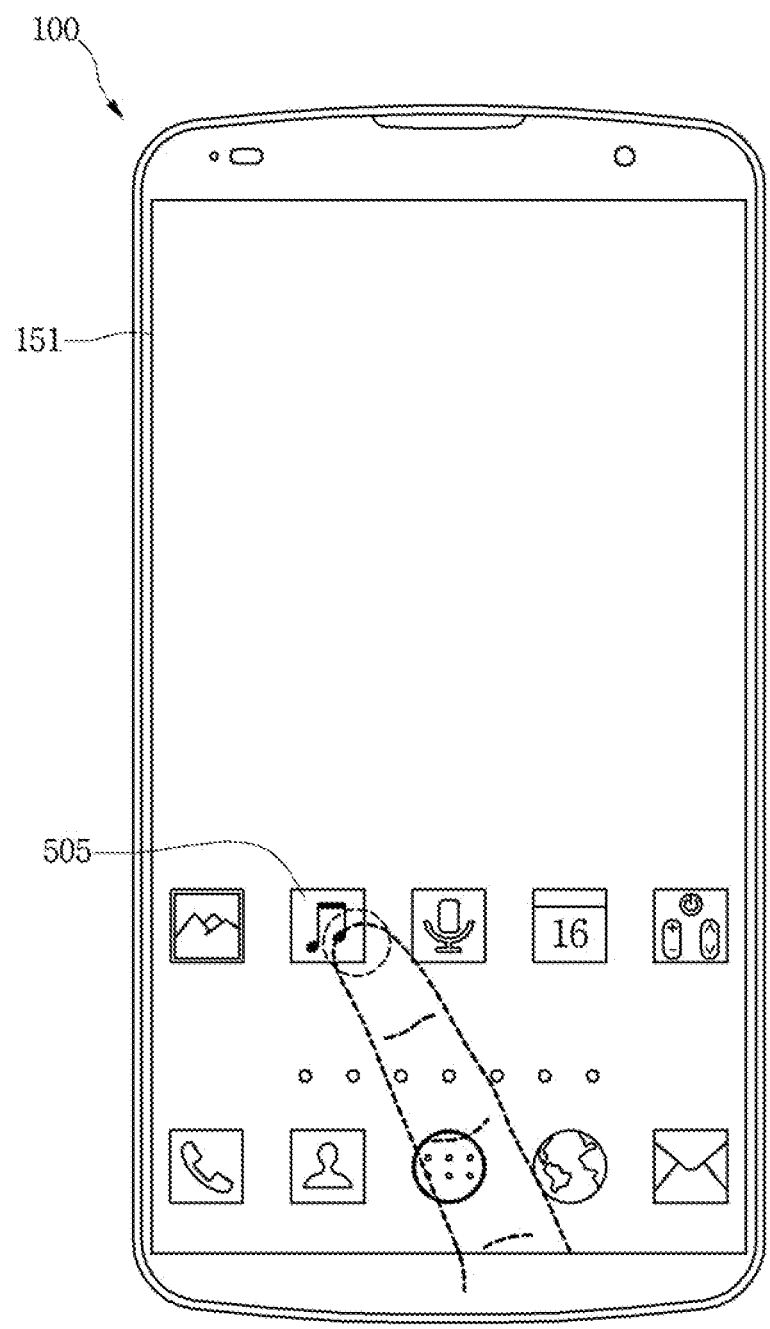

Referring to FIG. 17A, the controller 180 may control the display unit 151 to display a playback control window 506 of a music application as illustrated in FIG. 17B according to reception of a rear touch input for touching, on the rear side thereof, a music icon 505 corresponding to the music application. The playback control window 506 may include only brief information such as a song list, playing a song, forward winding, or backward winding. The user may control playing of music through the rear touch input on the playback control window 506.

Figure 17C:
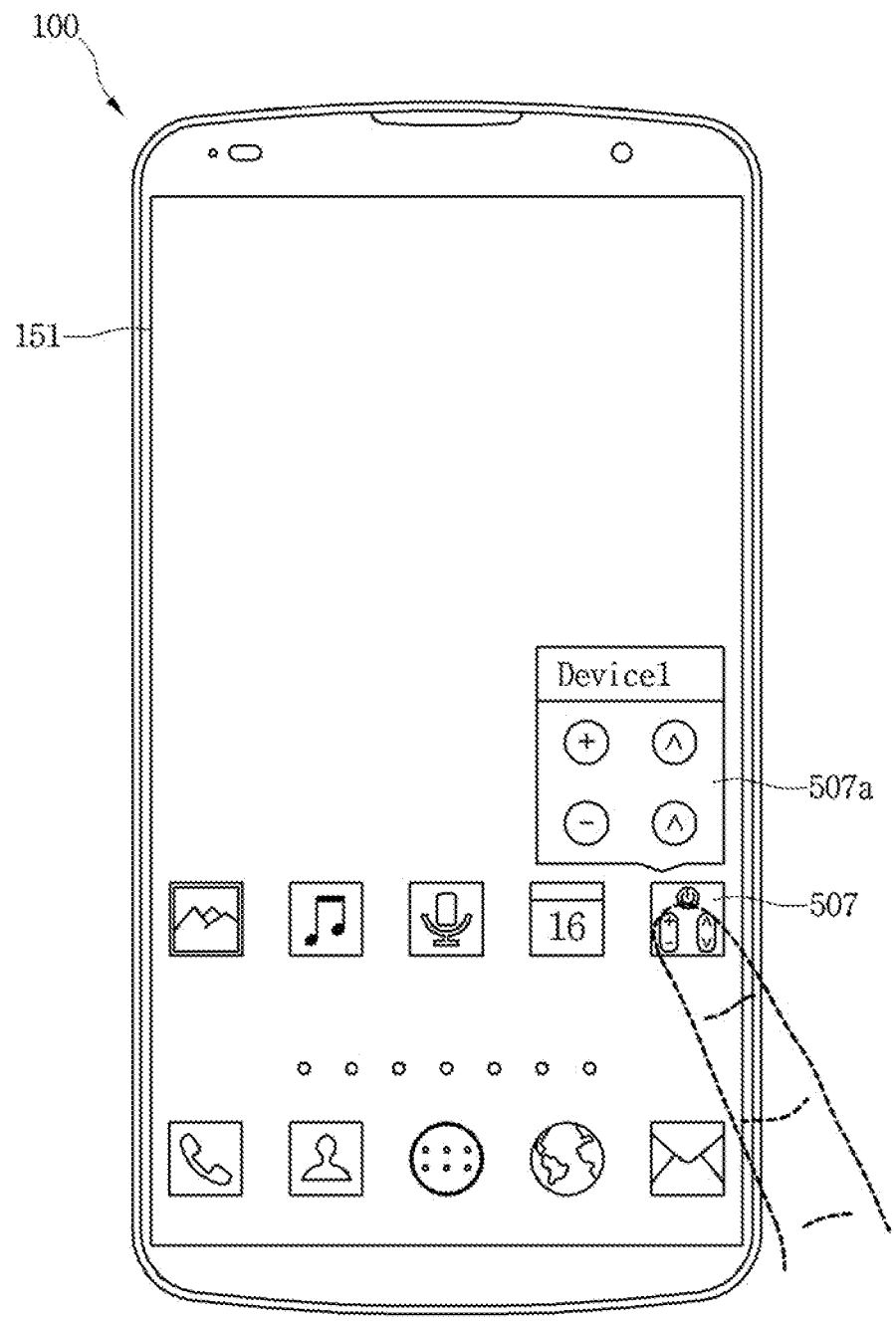

Referring to FIG. 17C, the controller 180 may display an external device control window 507a for controlling an external device connected to the transparent display device 100 according to reception of the rear touch input for touching, on the rear side thereof, a remote control app icon 507 corresponding to a remote control application. The external device control window 507a may include information on an external device having been recently connected or currently connected to the transparent display device 100. The user may remotely control the external device by applying the rear touch input on the external device control window 507a.

Figure 17D:
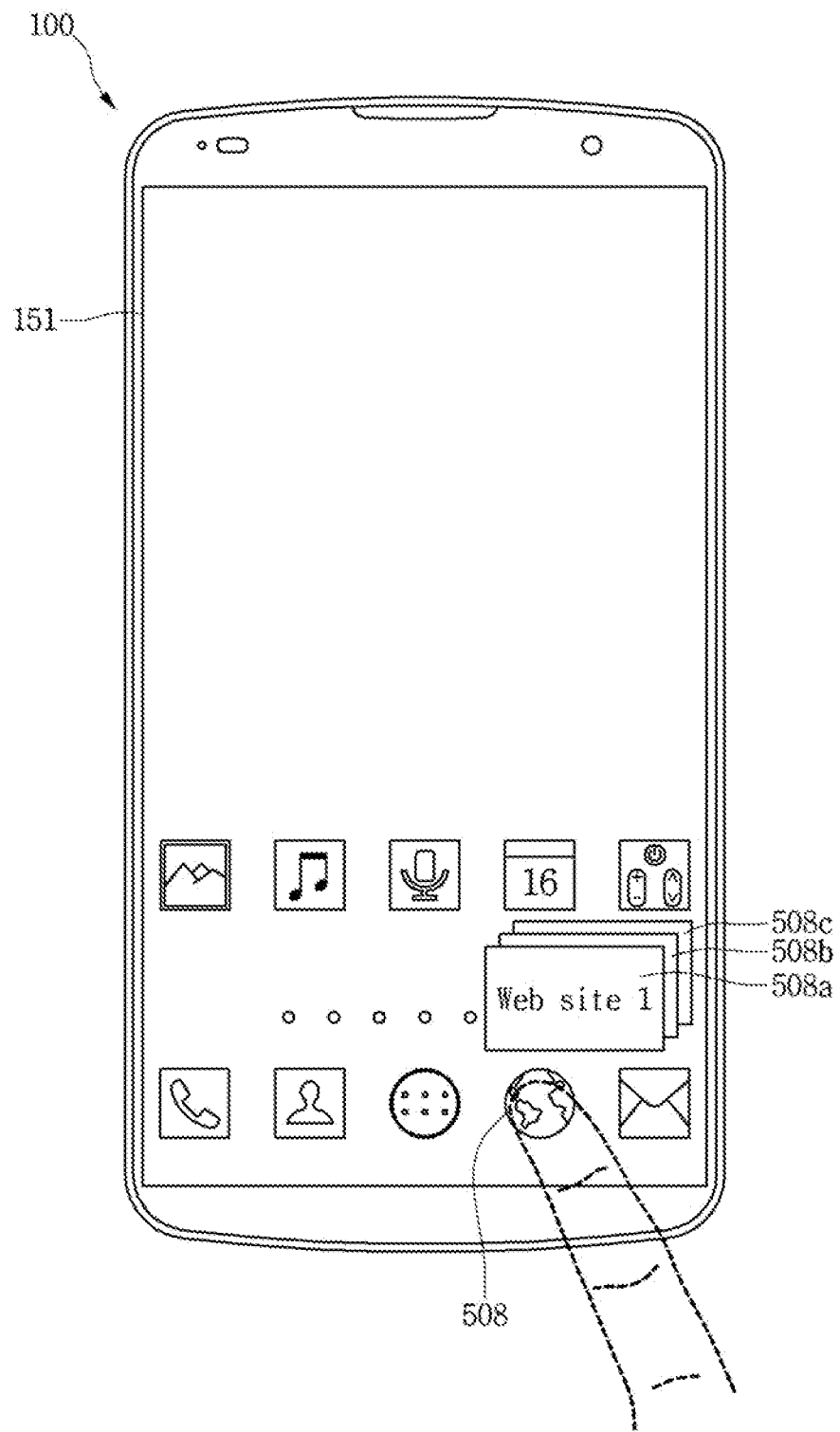

Referring FIG. 17D, the controller 180 may receive a rear touch input for touching, on the rear side thereof, an Internet app icon 508 corresponding to an Internet application and display information on one or more recently connected web sites according to the received rear touch input. In other words, the controller 180 may control the display unit 151 to display contracted screens 508a to 508c of recently connected web sites on one side of the Internet app icon 508.

Figure 18B:
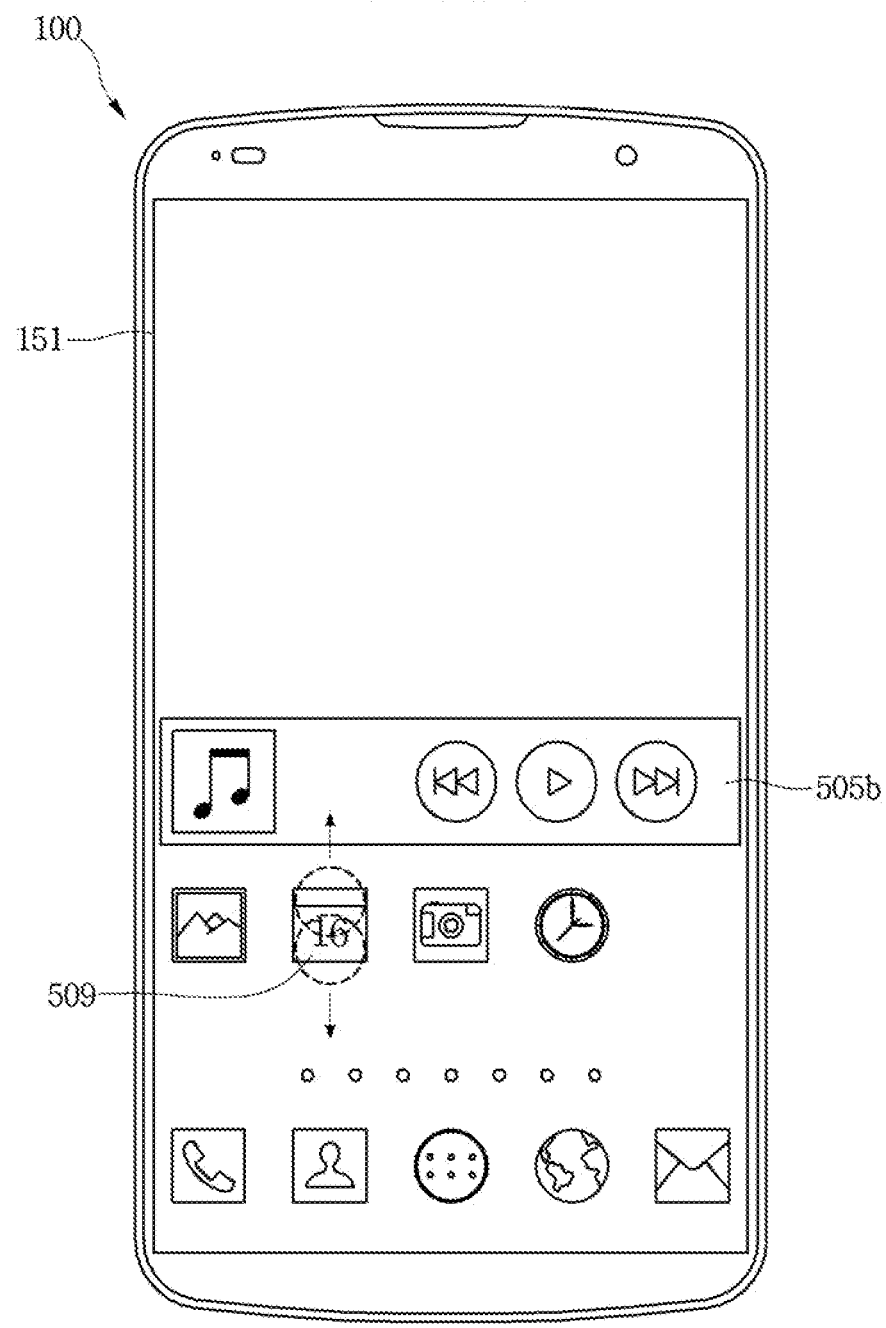
Figure 18C:
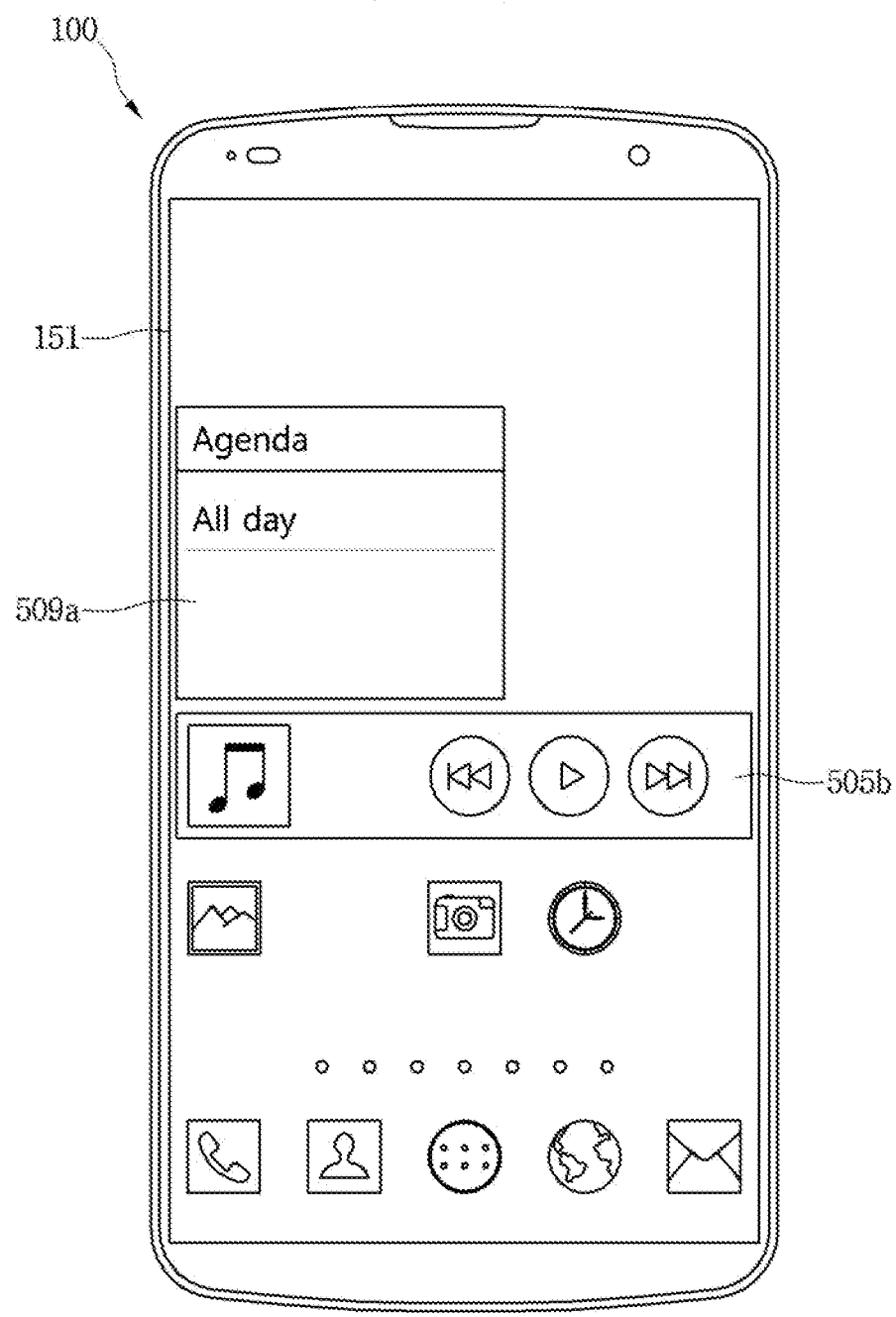

FIGS. 18A to 18C are views for explaining a function providable in response to a pinch-in or pinch-out input for an app icon on the rear side of the display unit according to an embodiment.

The pinch-out input may be an input for moving two touch points toward the outside of the display unit and the pinch-in input may be an input for moving the two touch points toward the inside thereof. Referring to FIG. 18A, the display unit 151 displays a music app icon 505. When an input for pinching out the music app icon 505 on the rear side of the display unit 151, the controller 180 may control the display unit 151 to display a music widget 505b corresponding to the music application as illustrated in FIG. 18B. At the same time, the controller 180 may allow the music app icon 505 to disappear from the screen. In other words, the controller 180 may change the music app icon 505 to the music widget 505b. On the other hand, when an input for pinching in the music widget 505b on the rear side on the display unit 151, the controller 180 may change the music widget 505b to the music app icon 505.

Similarly, when an input for pinching out a calendar app icon 509 corresponding to a calendar application on the rear side of the display unit 151, the controller 180 may control the display unit 151 to display a calendar widget 509a corresponding to the calendar application as illustrated in FIG. 18C. At the same time, the controller 180 may allow the calendar app icon 509 to disappear from the screen. In other words, the controller 180 may change the calendar app icon 509 to the calendar widget 509a. On the other hand, when an input for pinching in the calendar widget 509a on the rear side on the display unit 151, the controller 180 may change the calendar widget 509a to the calendar app icon 509.

The user may rapidly set a home screen by inputting a simple action on the rear side of the display unit.

Figure 19A:
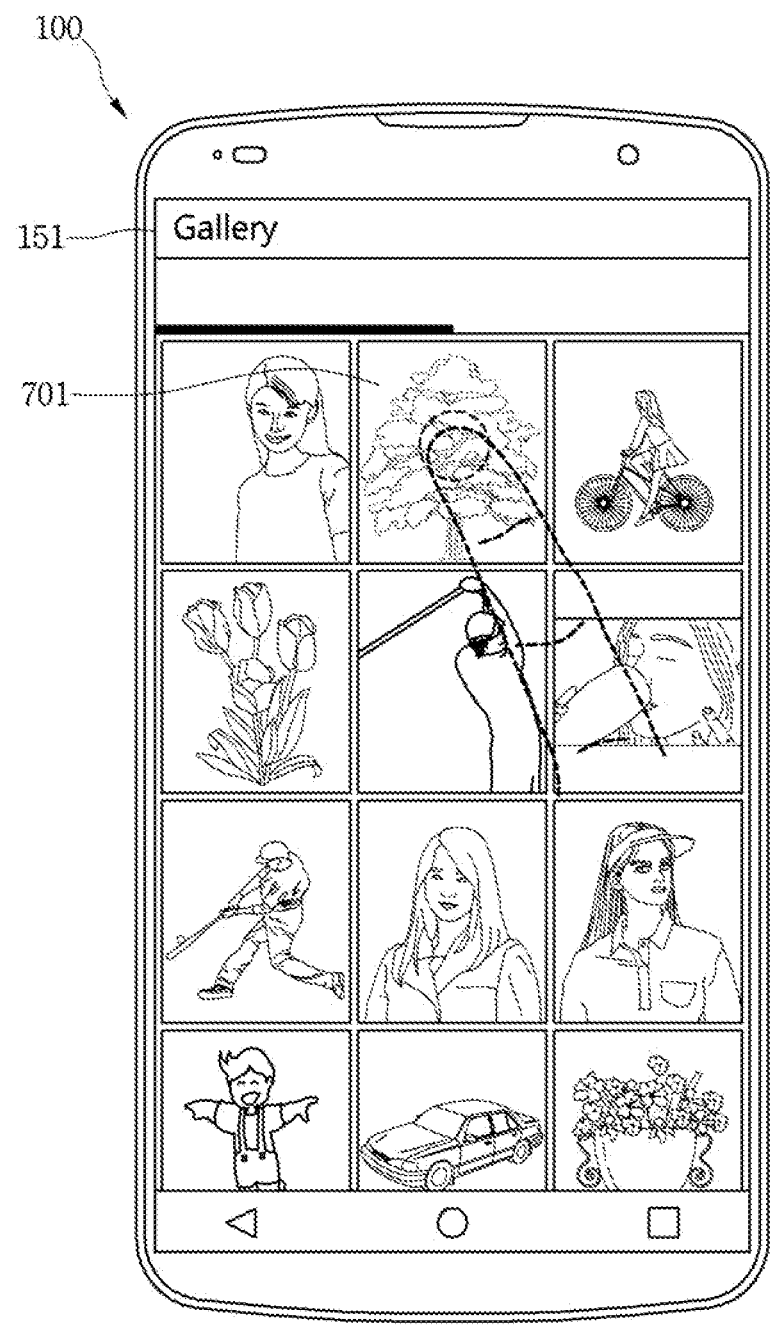
FIGS. 19A and 19B are views for explaining a function provided in response to a rear touch input to content according to an embodiment.
Figure 19B:
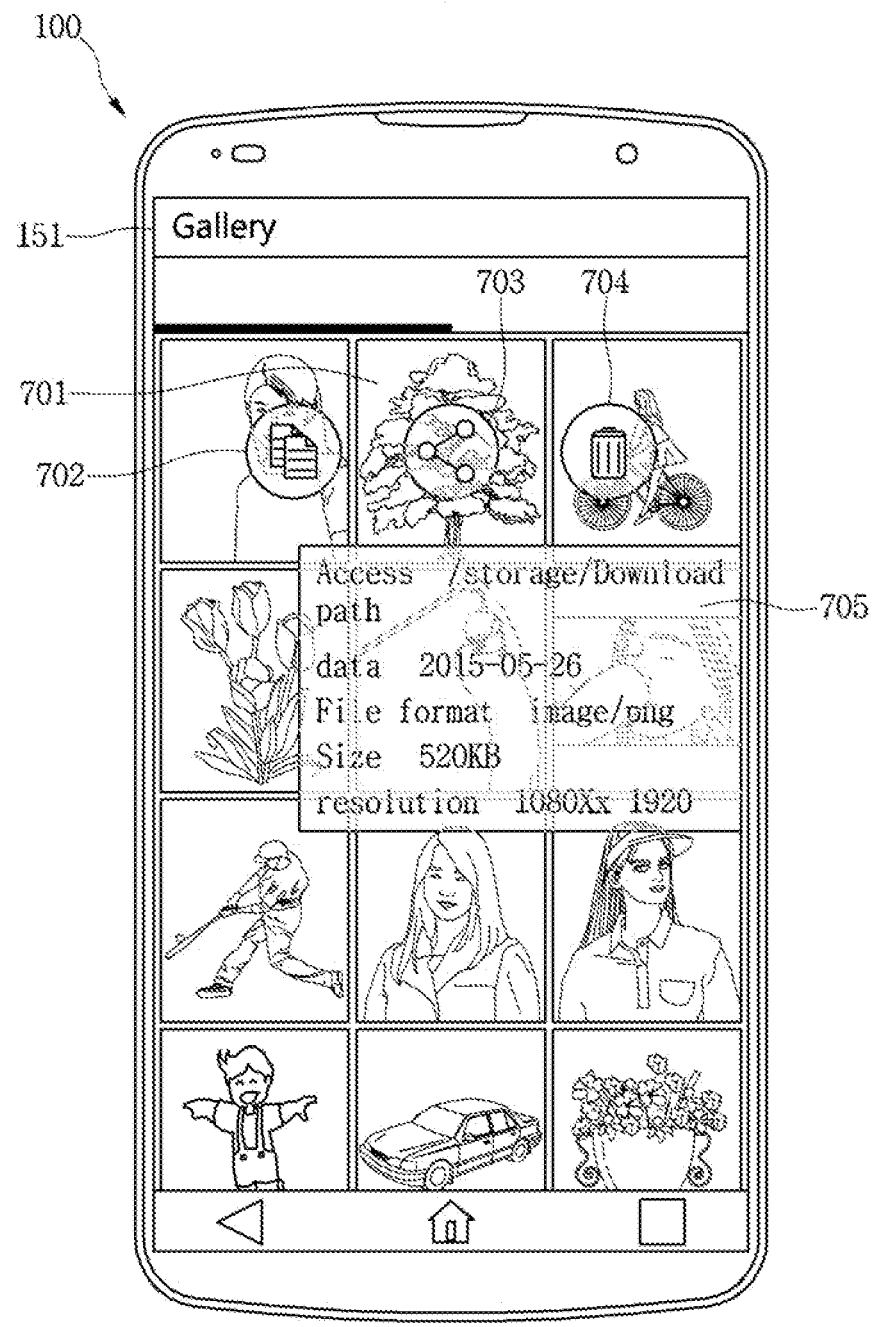

FIGS. 19A and 19B are views for explaining a function provided in response to a rear touch input to content according to an embodiment.

Referring FIG. 19A, the display unit 151 displays an execution screen of a gallery application, which includes a plurality of photos. When a rear touch input is received to a predetermined photo 701 of the plurality of photos, as illustrated in FIG. 19A, the controller 180 may display the display unit 151 to display one or more of a copy icon 702 for copying the photo 701 on the execution screen of the gallery application, a share icon 703 for sharing the photo 701, a delete icon 704 for deleting the photo 701, and a detailed information providing window 705 for providing detailed information on the photo 701.

The user may easily manage content through the rear touch input, while viewing the content.

FIGS. 20A to 20E are views for explaining a function provided in response to the two side grip input for touching two sides of content according to an embodiment.

Figure 20A:
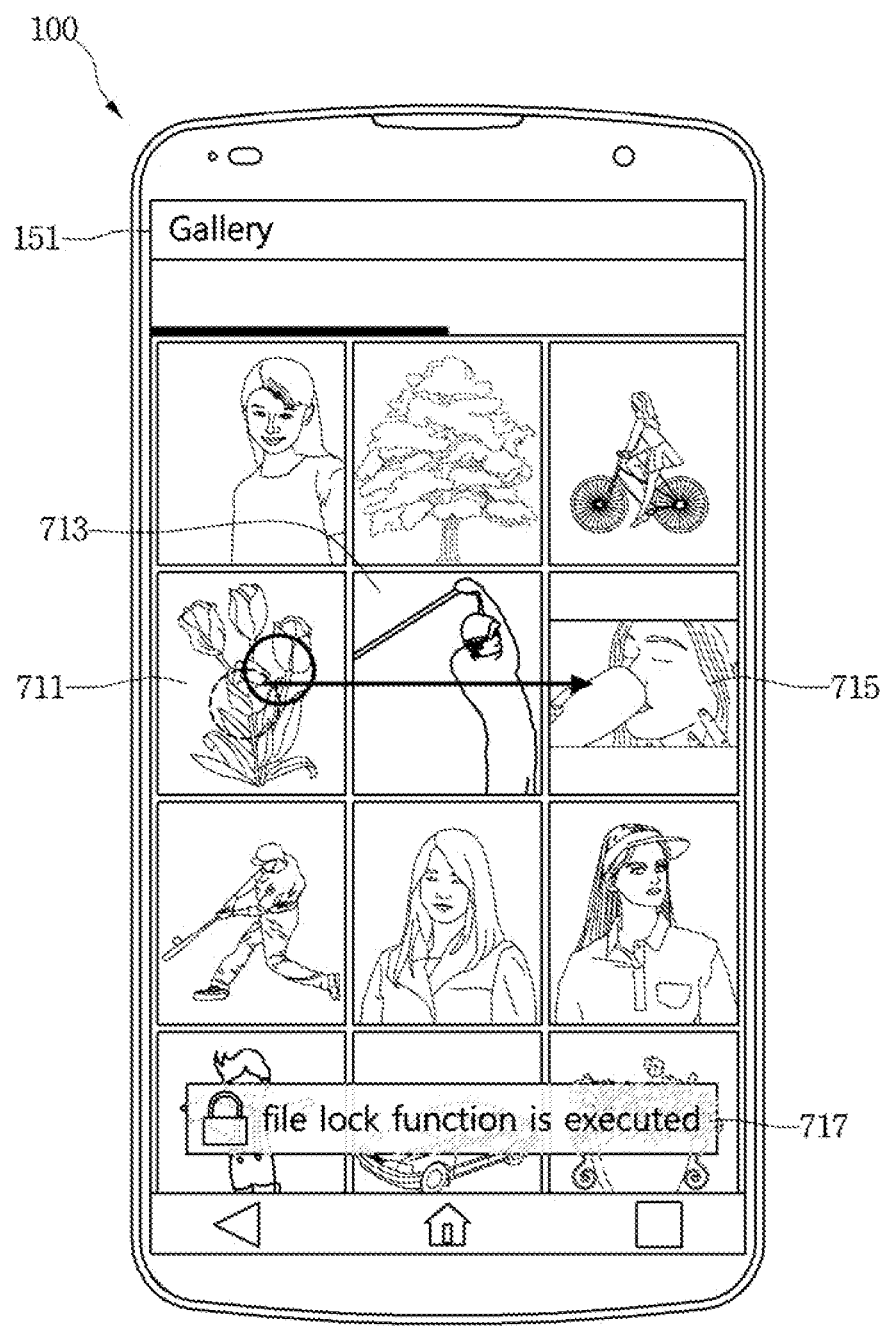

Referring FIG. 20A, the display unit 151 displays an execution screen of a gallery application, which includes a plurality of photos. When front and rear touch inputs for the photo 711 are simultaneously maintained for a predetermined time or longer, the controller 180 may execute a file lock function. The file lock function may be a function for opening a predetermined file only by inputting information such as a password. While executing the file lock function, the controller 180 may display a message window 717 for notifying execution of the file lock function on an execution screen of the gallery application.

When an input is received which moves a two side grip input for the first photo 711 toward second and third photos 713 and 715, the controller 180 may lock the first to third photos 711, 713, and 715, as illustrated in FIG. 20B. The controller 180 may allow the first to third photos 711, 713, and 715 to disappear from the execution screen of the gallery application and may display the message window 719 representing that three files are locked. FIGS. 20A and 20B illustrate, but are not limited to, photos, and the function may also be applied to content, folder, app icon, or the like besides the photos.

Figure 20C:
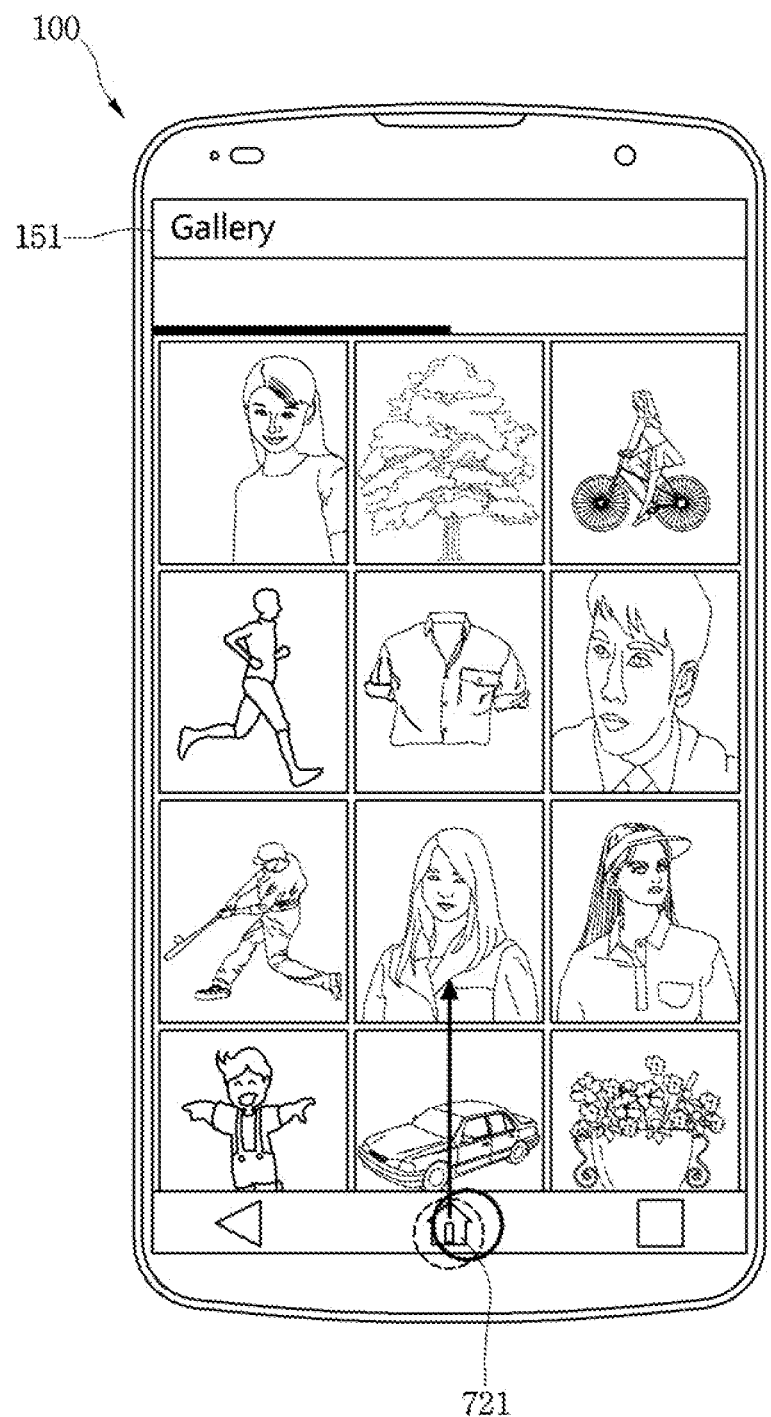
Figure 20D:
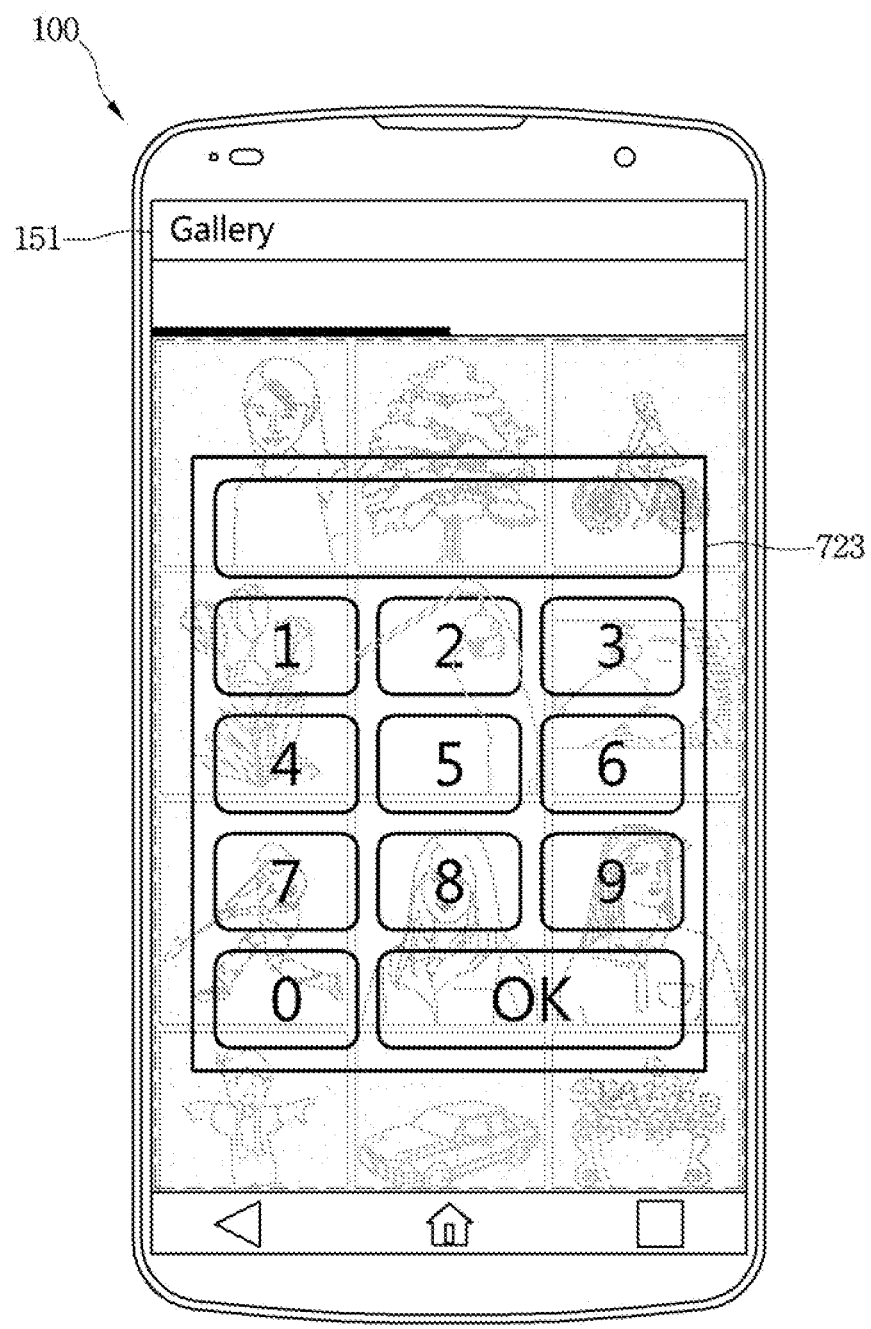
Figure 20E:
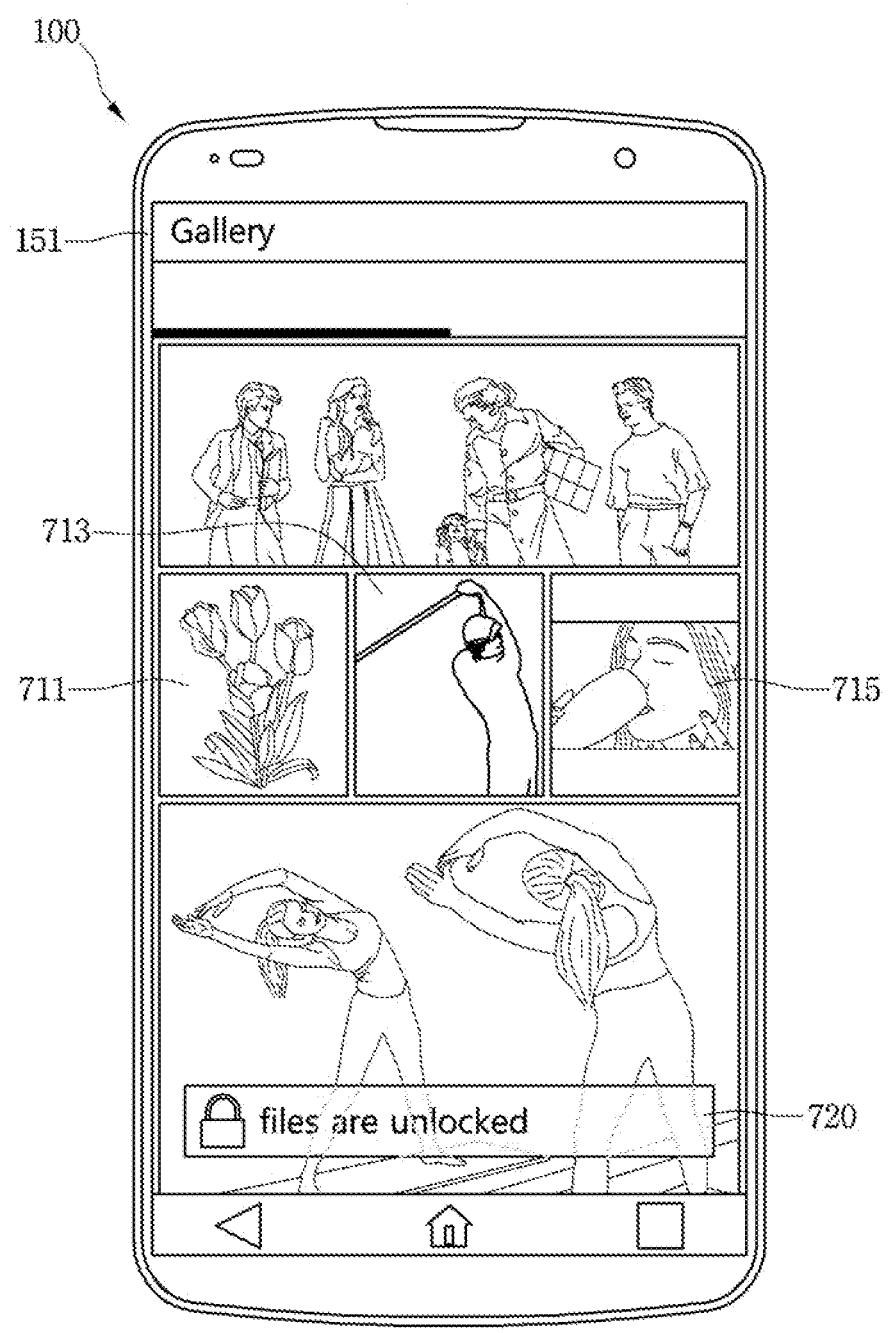

Referring FIG. 20C, the display unit 151 may display a home button 721. For the home button 721, a two side grip input may be received and an input for moving the two side grip input from a bottom side to a top side may be received. The controller 180 may display a unlock screen 723 for unlocking a file as illustrated in FIG. 20D in response to an input for moving the two side grip input from the bottom side to the top side. The lock release screen 723 may be configured with a touch pattern recognition type, a password input type, or a fingerprint input recognition type. For example, when a password is input on the unlock screen 723, the controller 180 may display unlocked files including first to third photos 711, 713, and 715, which have been locked, as illustrated in FIG. 20E.

Figure 21A:
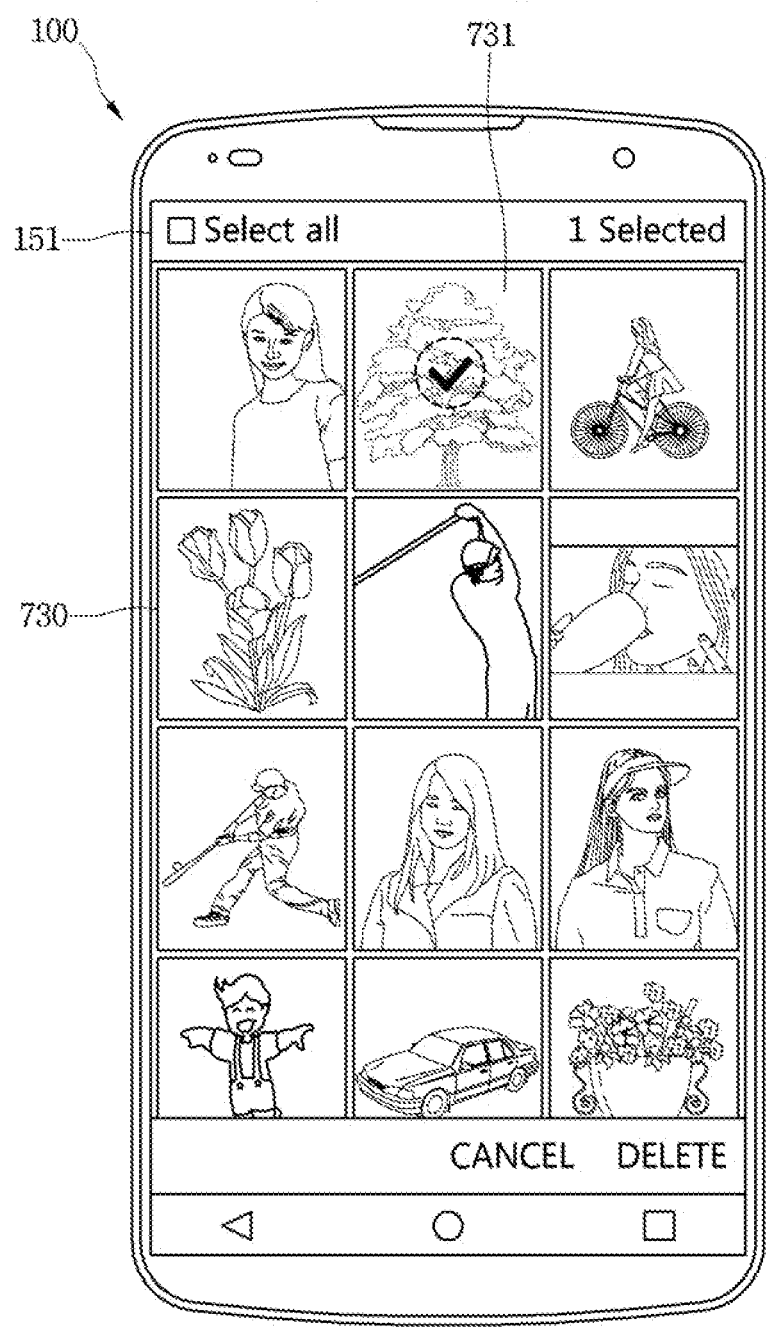
FIGS. 21A, 21B and 21C are views for explaining a function providable according to a combination of rear and front touch inputs according to an embodiment.
Figure 21B:
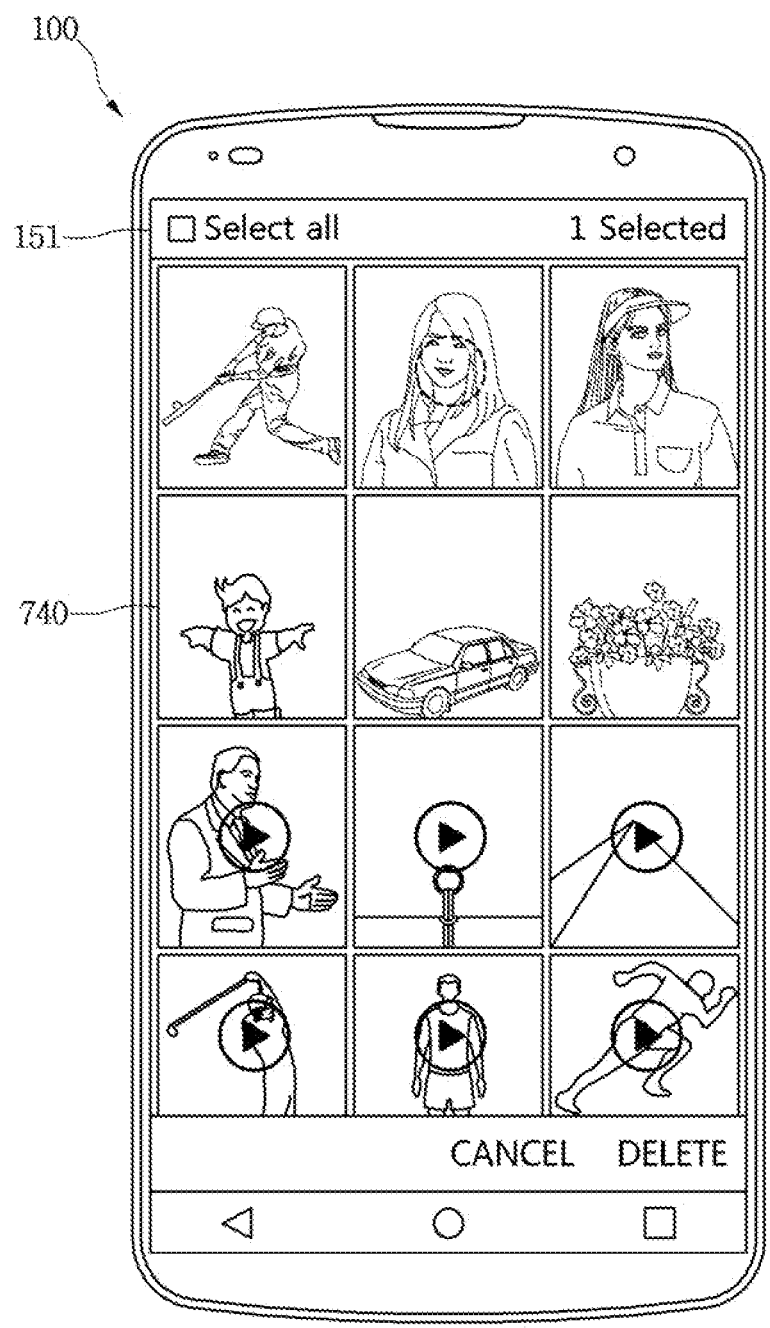
Figure 21C:
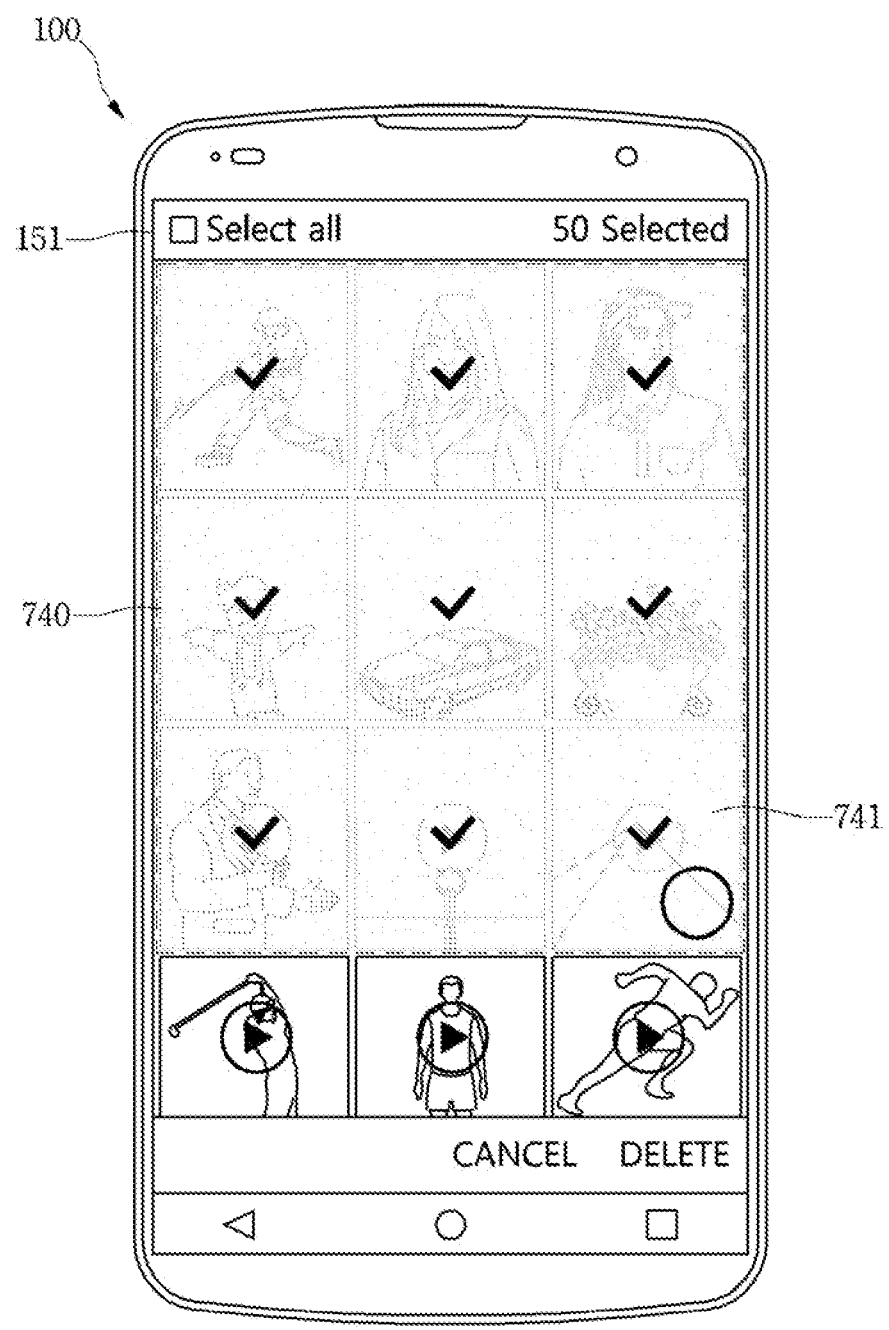

FIGS. 21A to 21C are views for explaining a function providable according to a combination of rear and front touch inputs according to an embodiment.

Referring to FIG. 21A, the display unit 151 displays the execution screen 730 of the gallery application. The controller 180 may receive a rear touch input for first content 731 on the execution screen 730. The controller 180 may set the first content as a start point for selecting a plurality of contents, when the rear touch input for the first content 731 is received for a predetermined time or longer. When the rear touch input for the first content 731 is maintained, a screen may be moved according to an input for dragging a front touch input. In other words, as illustrated in FIG. 21B, while the rear touch input is maintained, another execution screen 740 of the gallery application may be displayed according to the input for dragging the front touch input. In this state, when a front touch input to second content 741 located on the other execution screen 740 is received, the controller 180 may set the second content 741 as an end point for selecting a plurality of contents. Accordingly, all contents disposed between the first and second contents 731 and 741 may be selected. The user may easily select the plurality of contents with a combination of the front and rear touch inputs.

FIGS. 22A to 22D are views for explaining a function providable in response to a pinch-in or pinch-out input for content on the rear side of the display unit according to an embodiment.

Figure 22A:
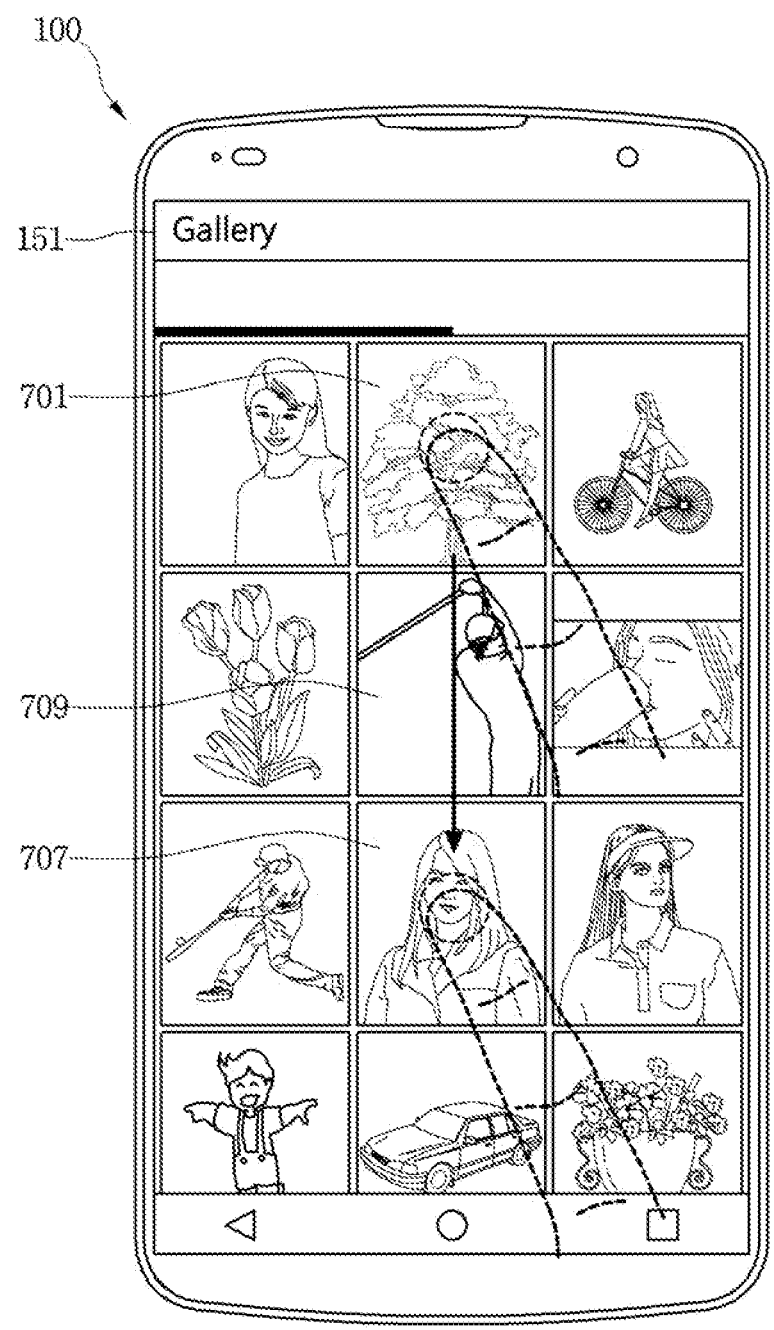
FIGS. 22A, 22B, 22C and 22D are views for explaining a function providable in response to a pinch-in or pinch-out input for content on the rear side of the display unit according to an embodiment.
Figure 22B:
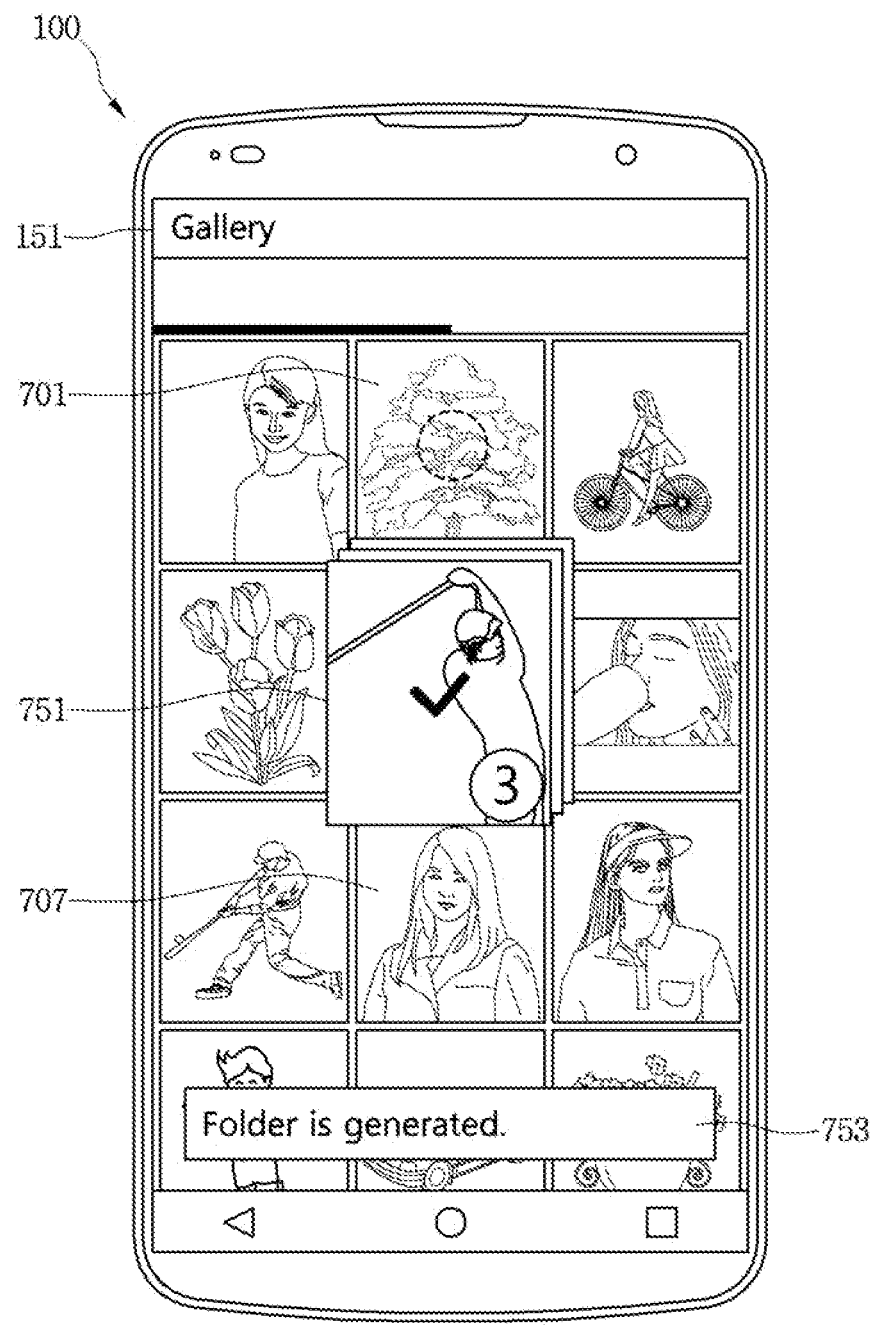

Referring to FIG. 22A, the display unit 151 of the transparent display device 100 may display an execution screen of a gallery application. A plurality of photos are displayed on the execution screen of the gallery application. Typically, when a pinch-in or pinch-out input is received on the front side of the display unit 151, the execution screen may be contracted or enlarged. When a first rear touch input is received for touching a first photo 701 among the plurality of photos on the rear side of the display unit 151, a second rear touch input is received for touching a second photo 707 on the rear side of the display unit 151, and an input is received for pinching in the first and second rear touch inputs, the controller 180 may generate one folder 751 including the first and second photos 701 and 707, and a third photo 709 disposed therebetween as illustrated in FIG. 22B. The generated folder 751 may be displayed on the execution screen of the gallery application. In addition, the message window 753 may be displayed which represents that the folder 751 is generated according to the pinch-in input.

As another example, when a plurality of photos are selected by a front touch input on the execution screen of the gallery application and a pinch-in input is received on the rear side of the display unit 151, the controller 180 may condense the plurality of selected photos through one folder.

Figure 22C:
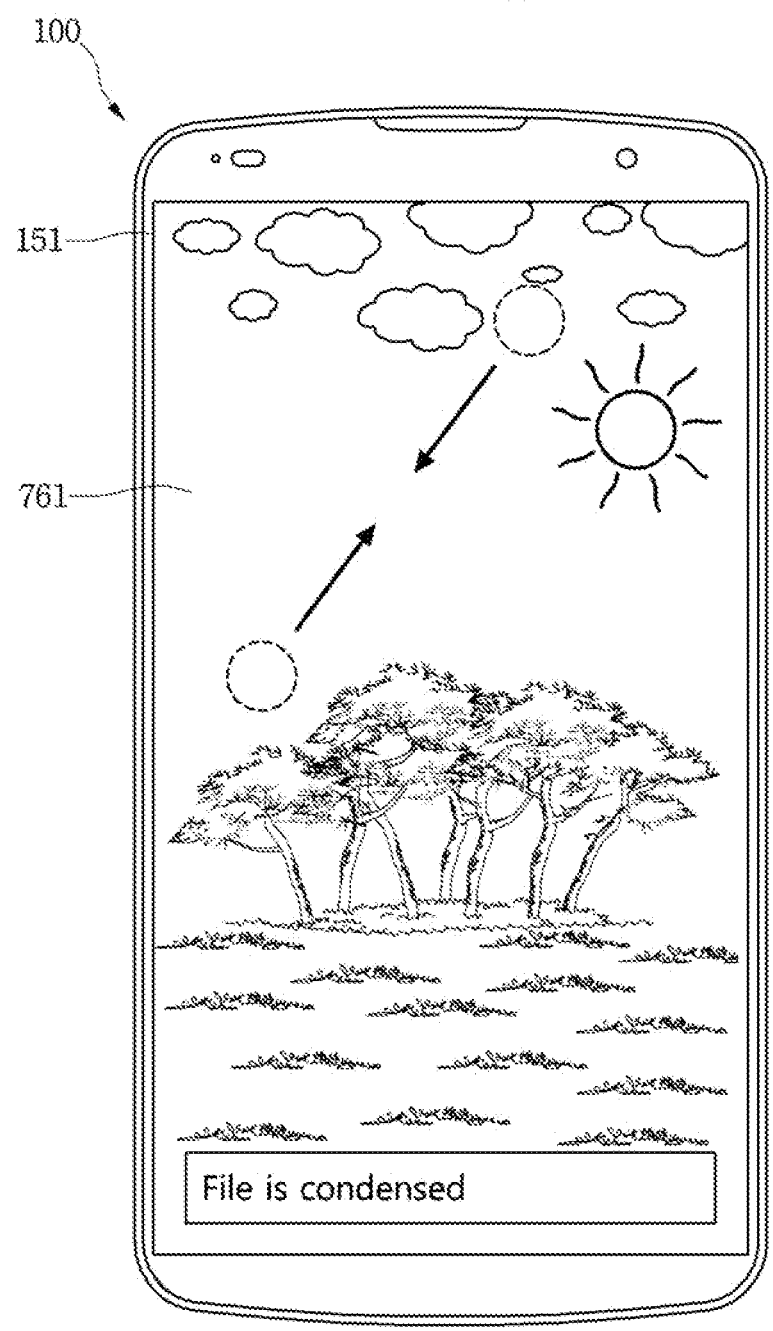
Figure 22D:
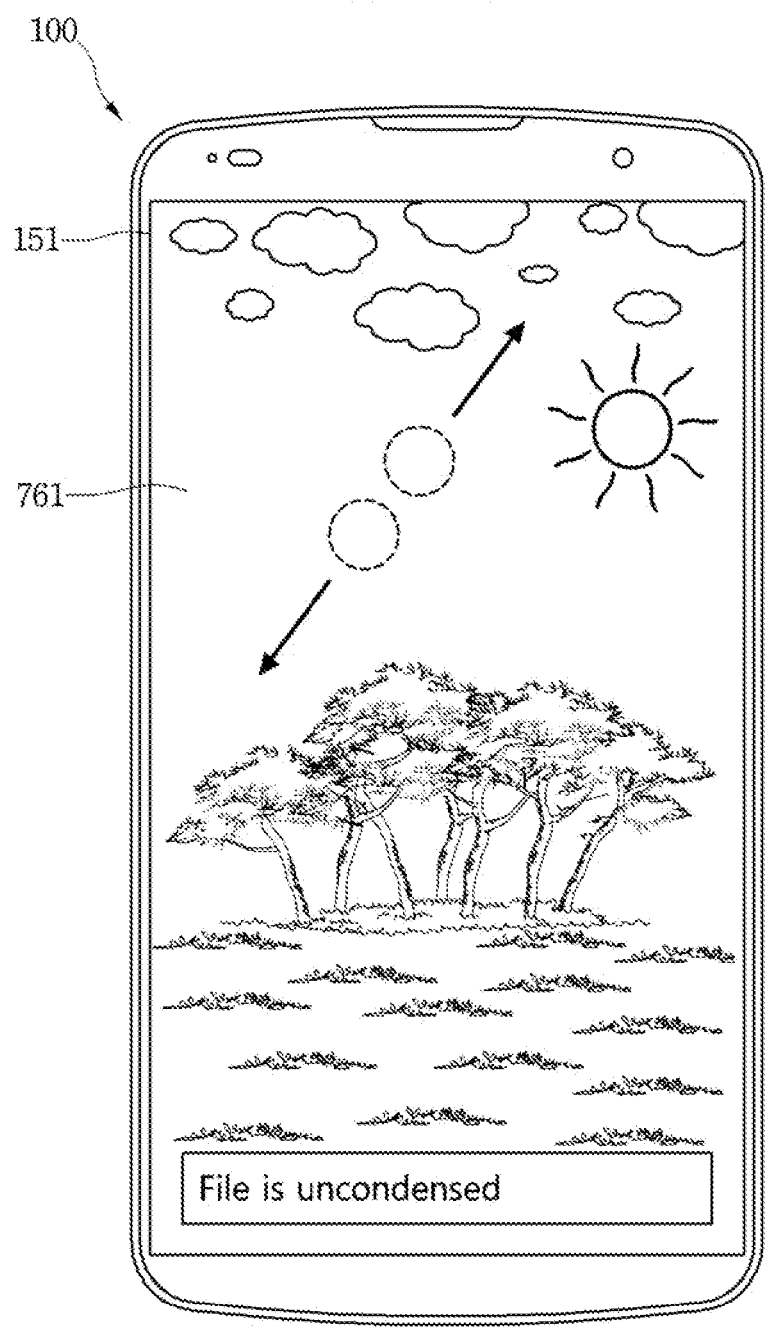

Next, referring FIG. 22C, the display unit 151 displays one image 761. Typically, when a pinch-in or pinch-out input is received on the front side of the display unit 151, the execution screen may be contracted or enlarged to be displayed. When the pinch-in input is received on the rear side of the display unit 151, the controller 180 may condense the image 761 to generate a condensed image. On the other hand, as illustrated in FIG. 22D, when a pinch-out input is received on the rear side of the display unit 151, the controller 180 may uncondense the condensed image.

According to another embodiment, the user may adjust transparency of the screen of the display unit 151 by dragging the rear touch.

Figure 23A:
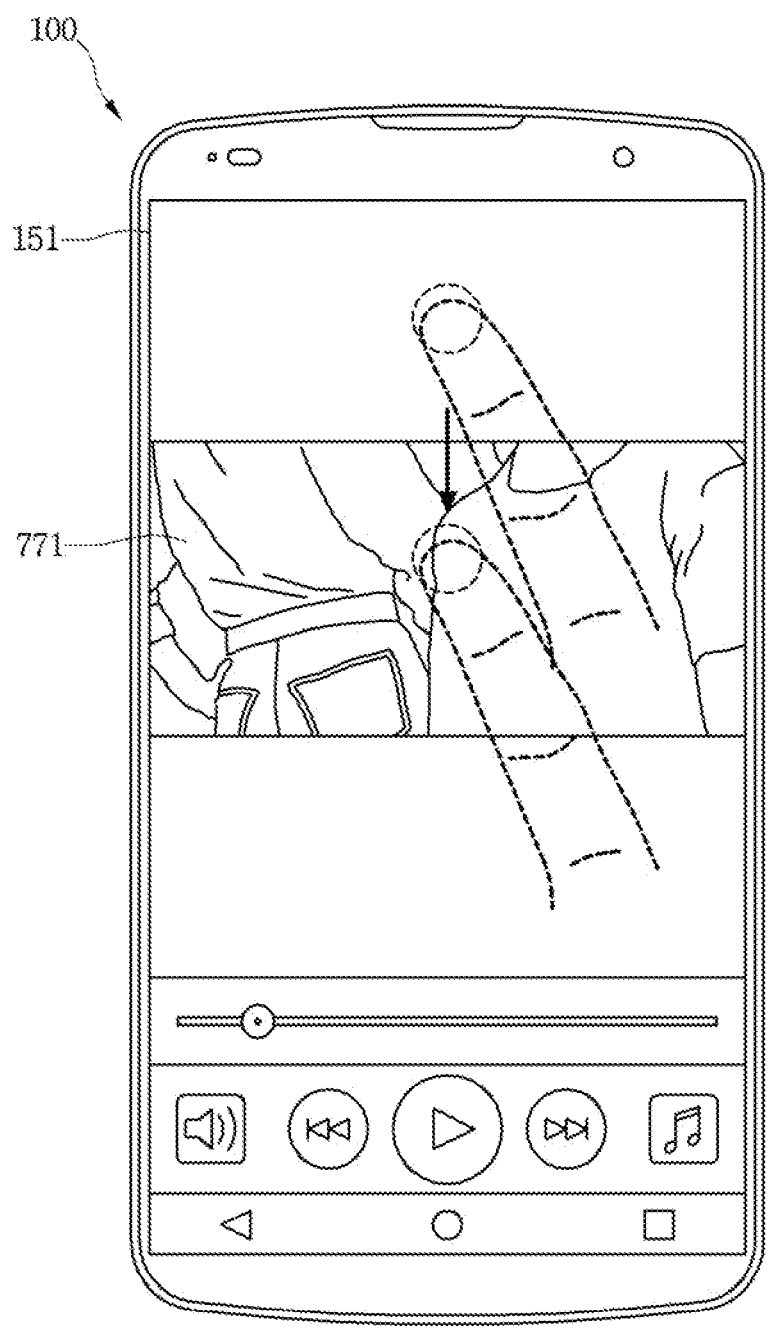
FIGS. 23A, 23B and 23C are views for explaining an example for adjusting transparency of a screen according to an input for dragging a rear touch according to an embodiment.
Figure 23B:
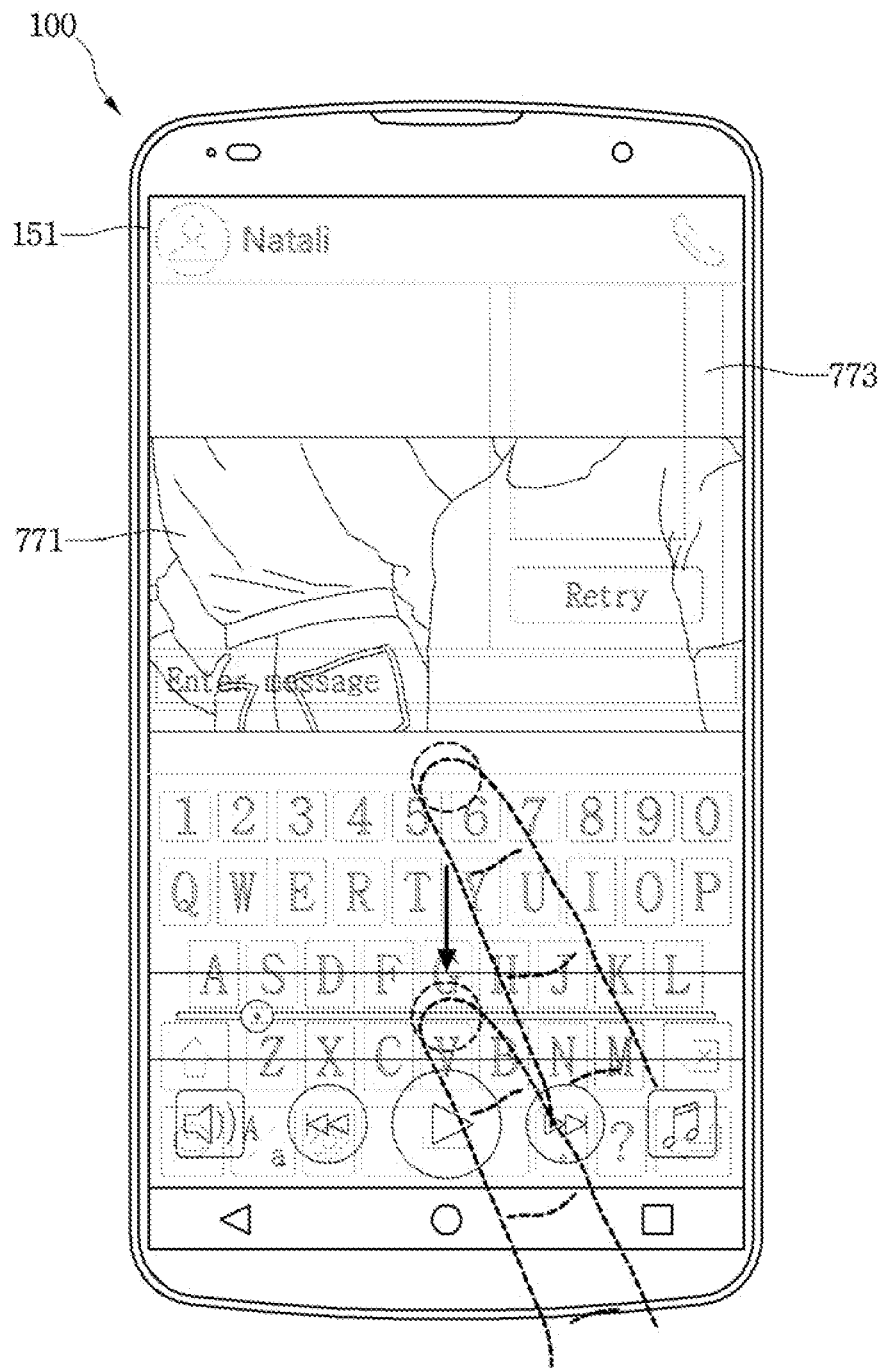
Figure 23C:
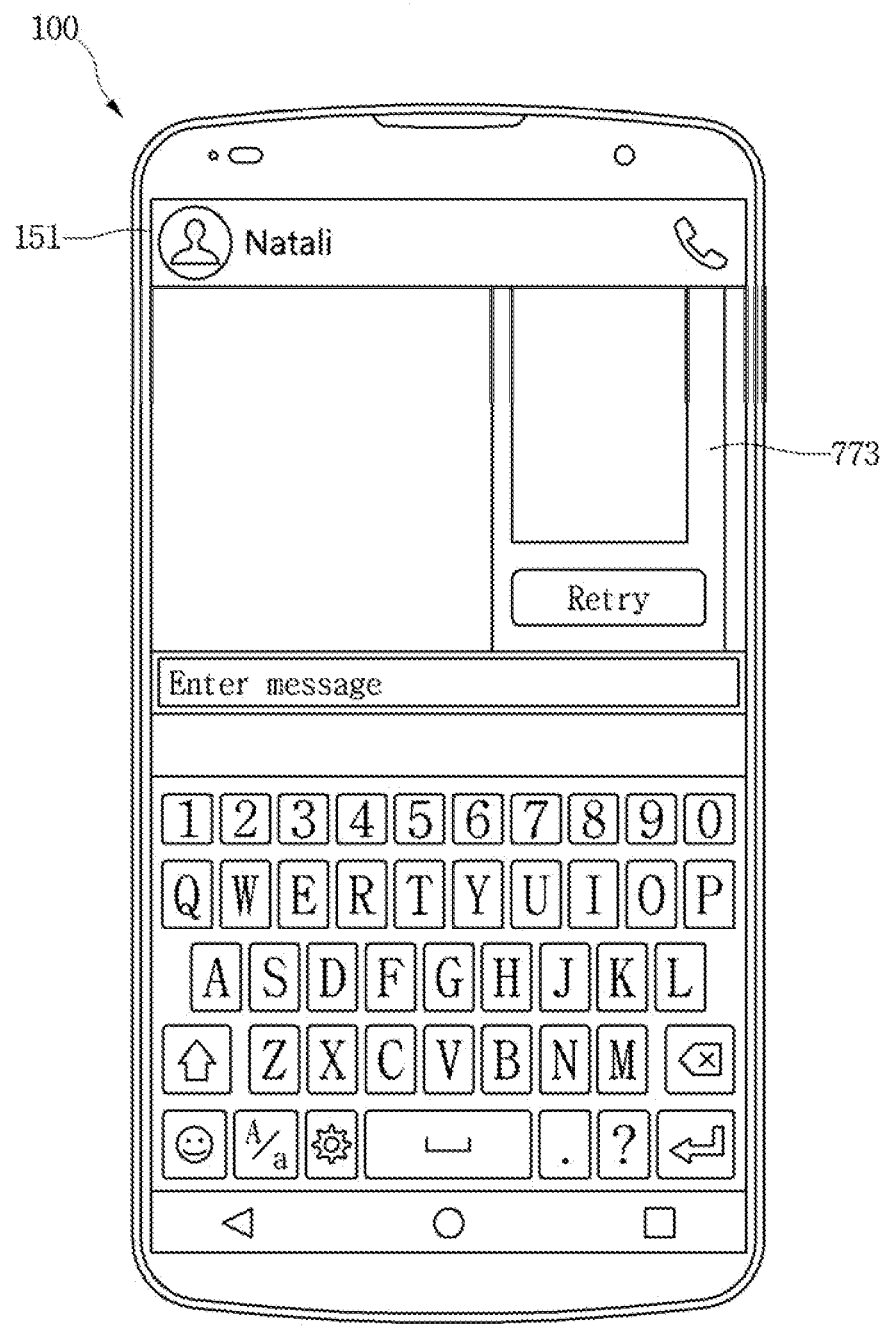

FIGS. 23A to 23C are views for explaining an example for adjusting transparency of a screen according to an input for dragging a rear touch according to an embodiment.

Referring to FIG. 23A, the display unit 151 displays an execution screen 771 of a video player application for video playback. When a drag input for moving a rear touch for touching one point on the rear side of the display unit 151 downwardly, the controller 180 may increase the screen transparency of the display unit 151. In other words, as illustrated in FIG. 23B, the transparency of the execution screen 771 of the video player application may be increased. According to the increase in transparency of the execution screen 771 of the video player application, an execution screen 773 of a text message application, which was being executed, may gradually appear. The controller 180 may adjust screen transparency according to a length that the rear touch is dragged. In other word, the controller 180 may further increase transparency as the drag length of the rear touch becomes longer. In FIG. 23B, when an input for further dragging the rear touch downwardly is received, the controller 180 may adjust the transparency of the execution screen 771 of the video player application as illustrated in FIG. 23C. Accordingly, the execution screen 771 of the video player application may disappear. In addition, with the disappearance of the execution screen 771 of the video player application, the execution screen 773 of the text message application that was being executed may be shown in a state of transparency of 0%.

Furthermore, the transparency of the execution screen 771 of the video player application may be reduced according to an input for dragging the rear touch upwardly.

The user may perform multi-tasking by adjusting the screen transparency only with an action for dragging the rear touch.

FIGS. 24A to 24D are views for explaining an example for storing or registering content as a favorite in response to the input for dragging the rear touch according to an embodiment.

Figure 24A:
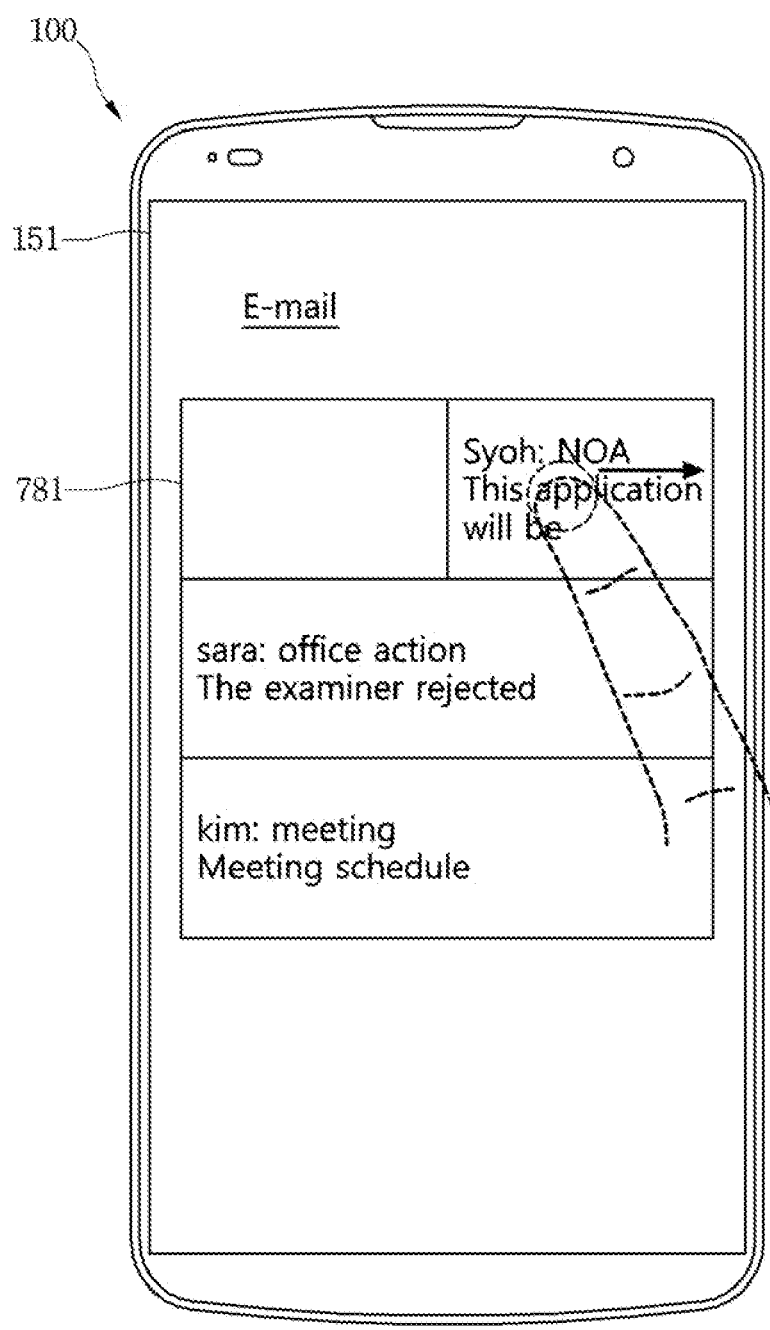
FIGS. 24A, 24B, 24C and 24D are views for explaining an example for storing or registering content as a favorite in response to the input for dragging a rear touch according to an embodiment.
Figure 24B:
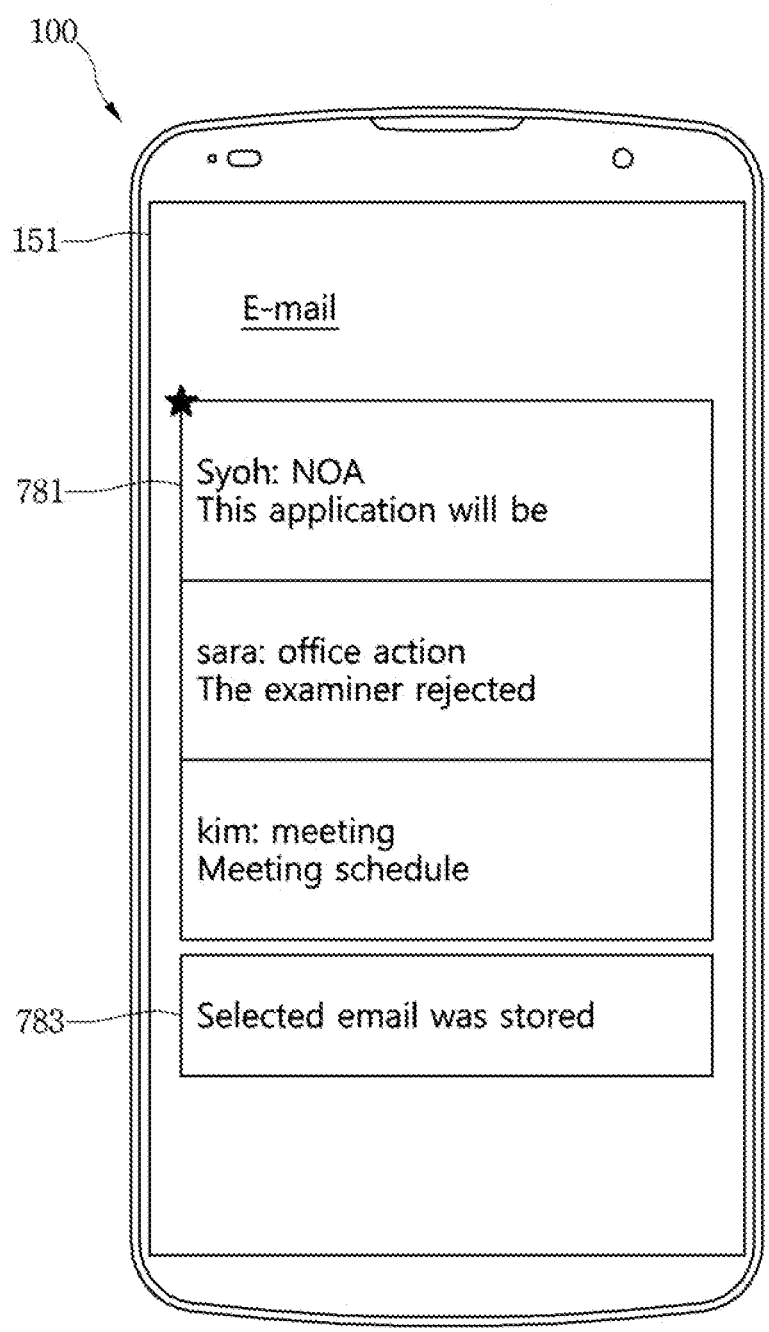

Referring to FIG. 24A, the display unit 151 displays the execution screen of an email application. On the execution screen of the email application, an email list received through a user account is displayed. When a rear touch input for a predetermined email 781 in the email list is received and an input for dragging the rear touch input from the left to the right is received, the controller 180 may store the email 781 in the memory 170 or keep the email 781 in a storage box provided by the email application. At the same time, the controller 180 may display a message window 783 for notifying the storage or keeping of the email 781 through the display unit 151 as illustrated in FIG. 24B. Furthermore, when an input for touching the front side of the email 781 to drag it is received, the email 781 may be deleted from the list.

Figure 24C:
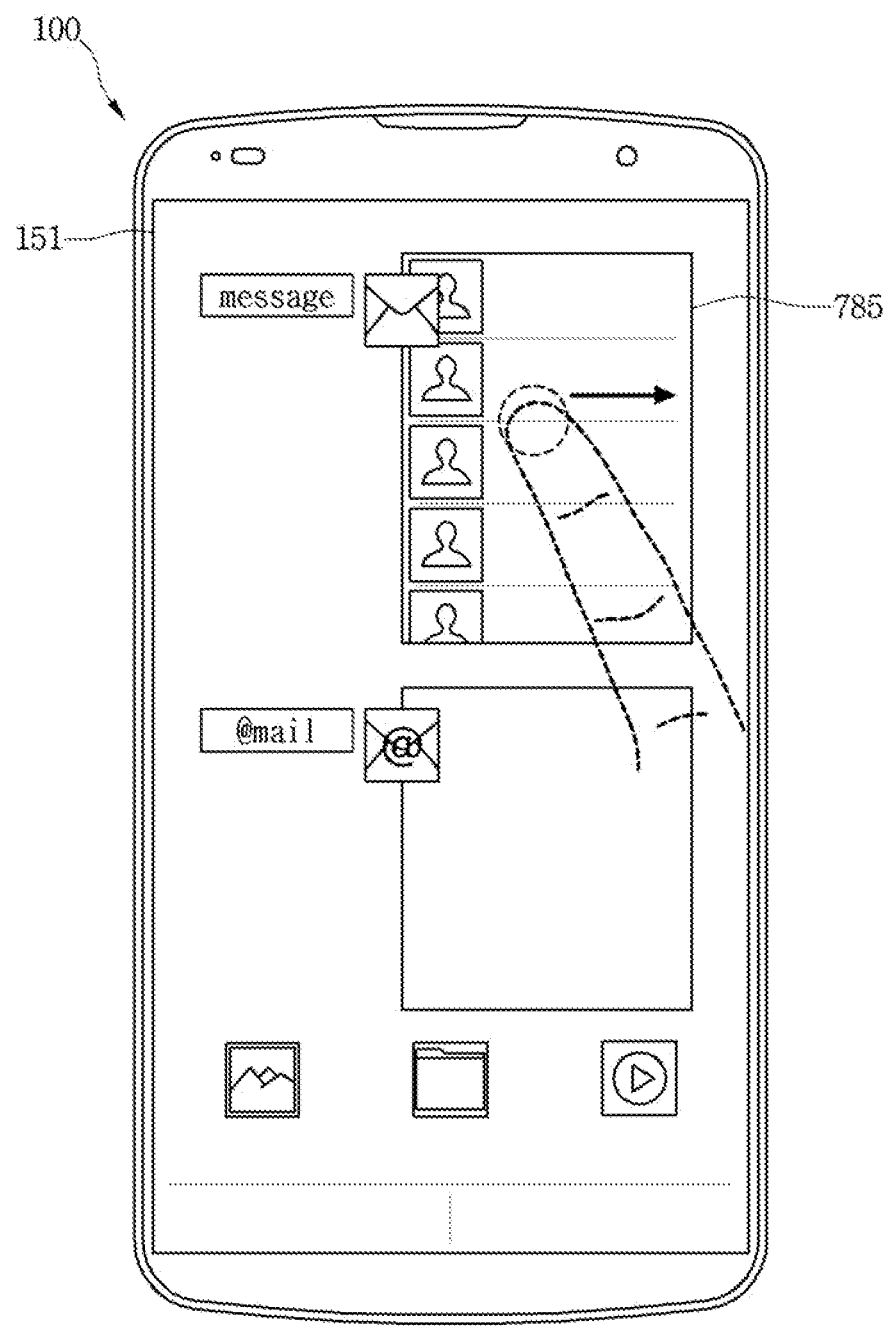
Figure 24D:
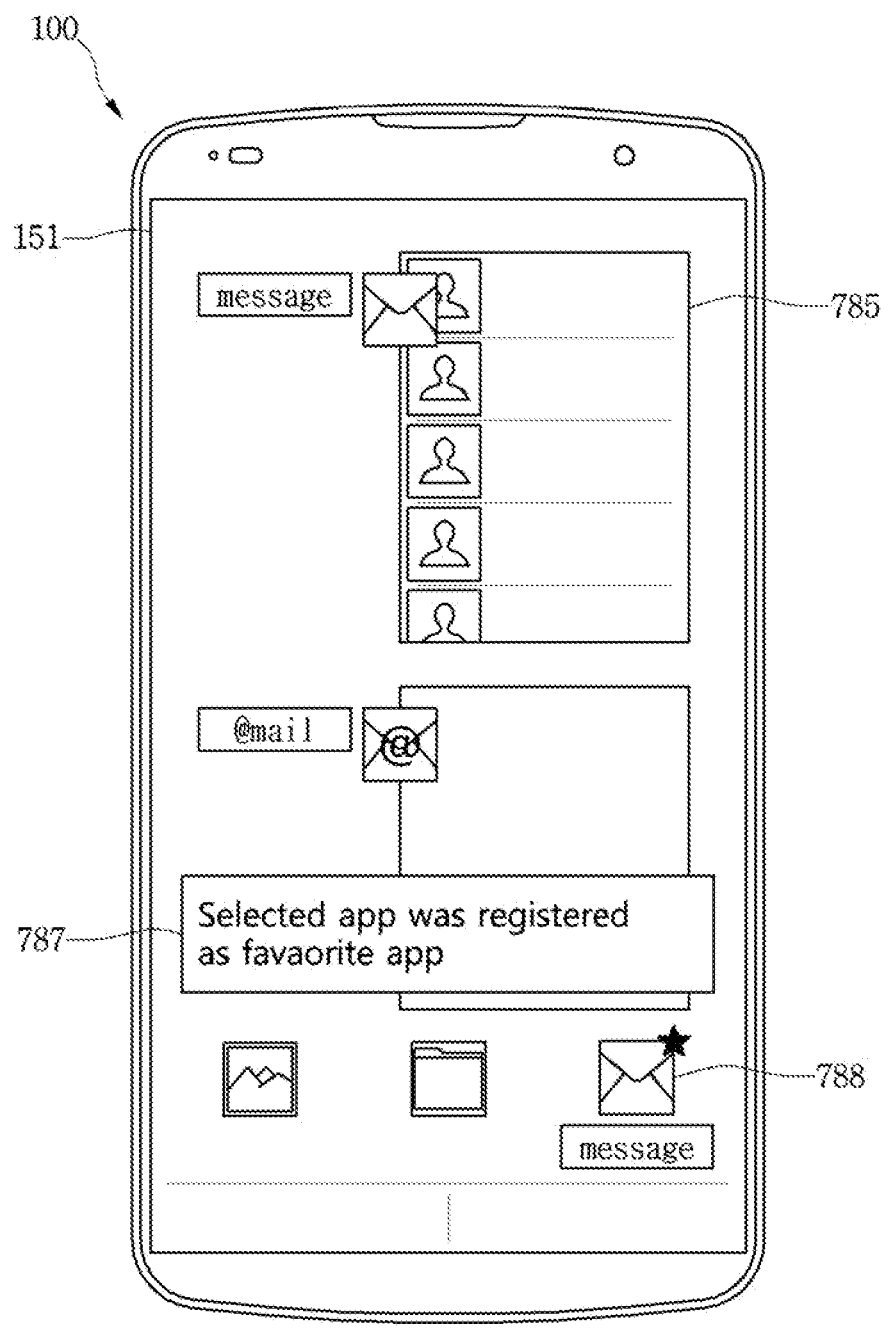

Referring to FIG. 24C, the display unit 151 displays execution screens respectively corresponding to recently executed applications. Among the execution screens, when a rear touch input for an execution screen 785 of the text message application is received and an input for dragging the rear touch input from the left to the right is received, as illustrated in FIG. 24D, the controller 180 may register, as a favorite, a text app icon 788 corresponding to the execution screen 785 of the text message application. At the same time, a message window 787 for notifying that the text application is registered as a favorite may be displayed. Furthermore, when a front touch input to the execution screen 785 of the text application is received, the controller 180 may display the execution screen 785 of the text application in full screen of the display unit 151.

FIGS. 25A to 25E are views for explaining an embodiment for editing a home screen in response to a rear touch input or two side grip input.

Figure 25A:
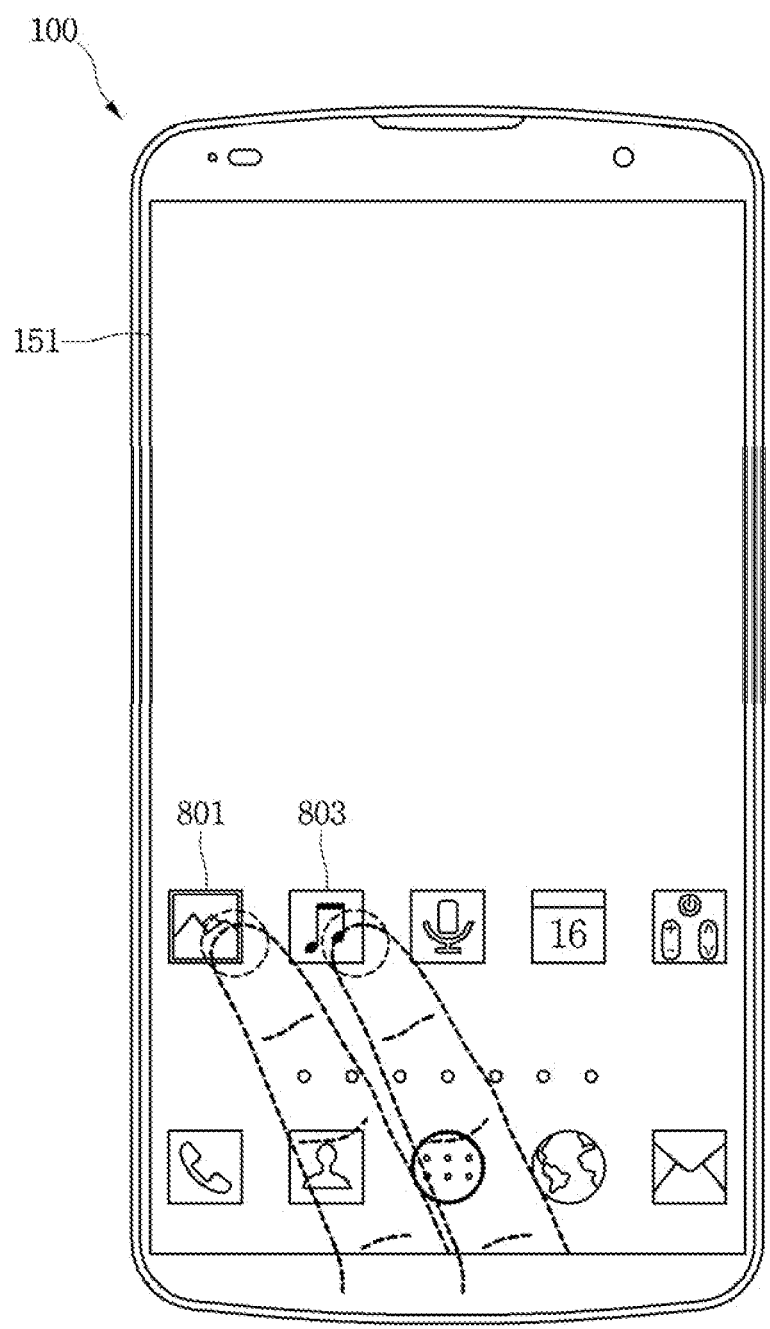
FIGS. 25A, 25B, 25C, 25D and 25E are views for explaining an embodiment for editing a home screen in response to a rear touch input or two side grip input.
Figure 25B:
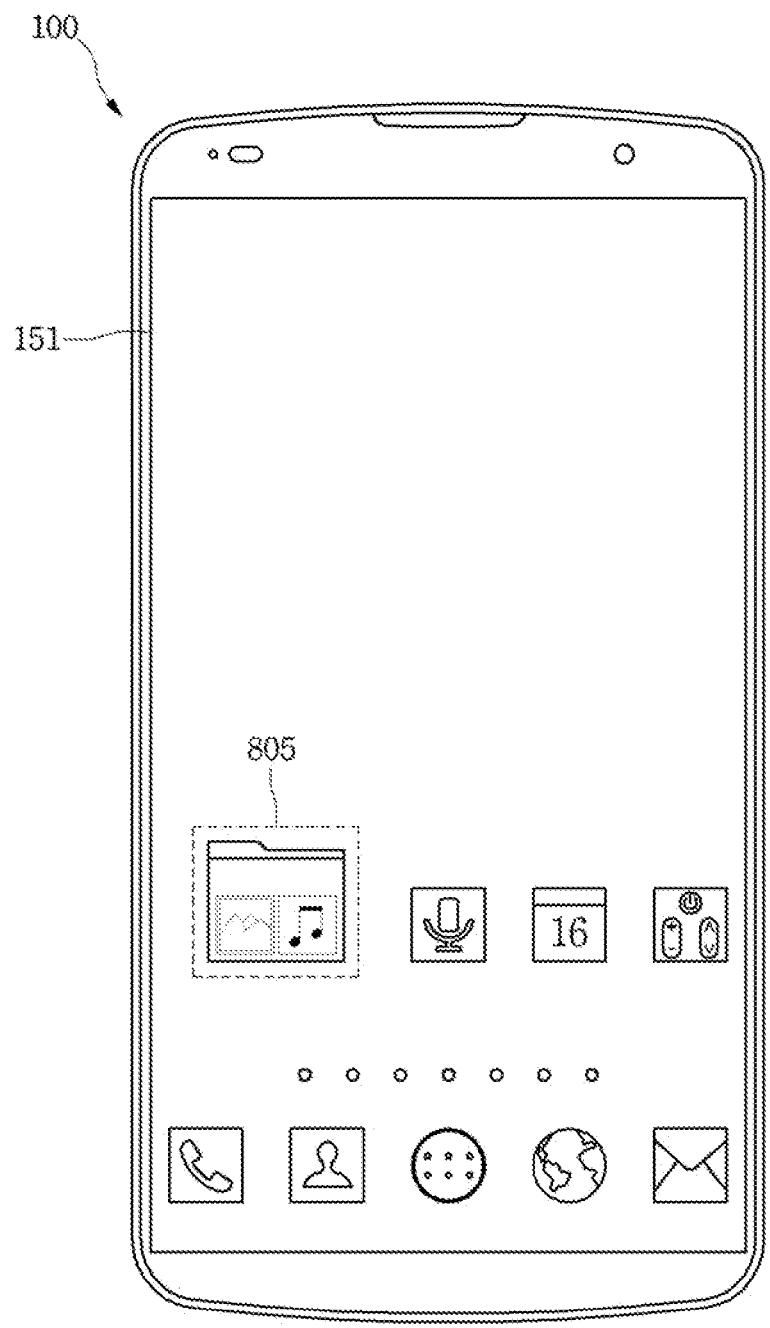
Figure 25C:
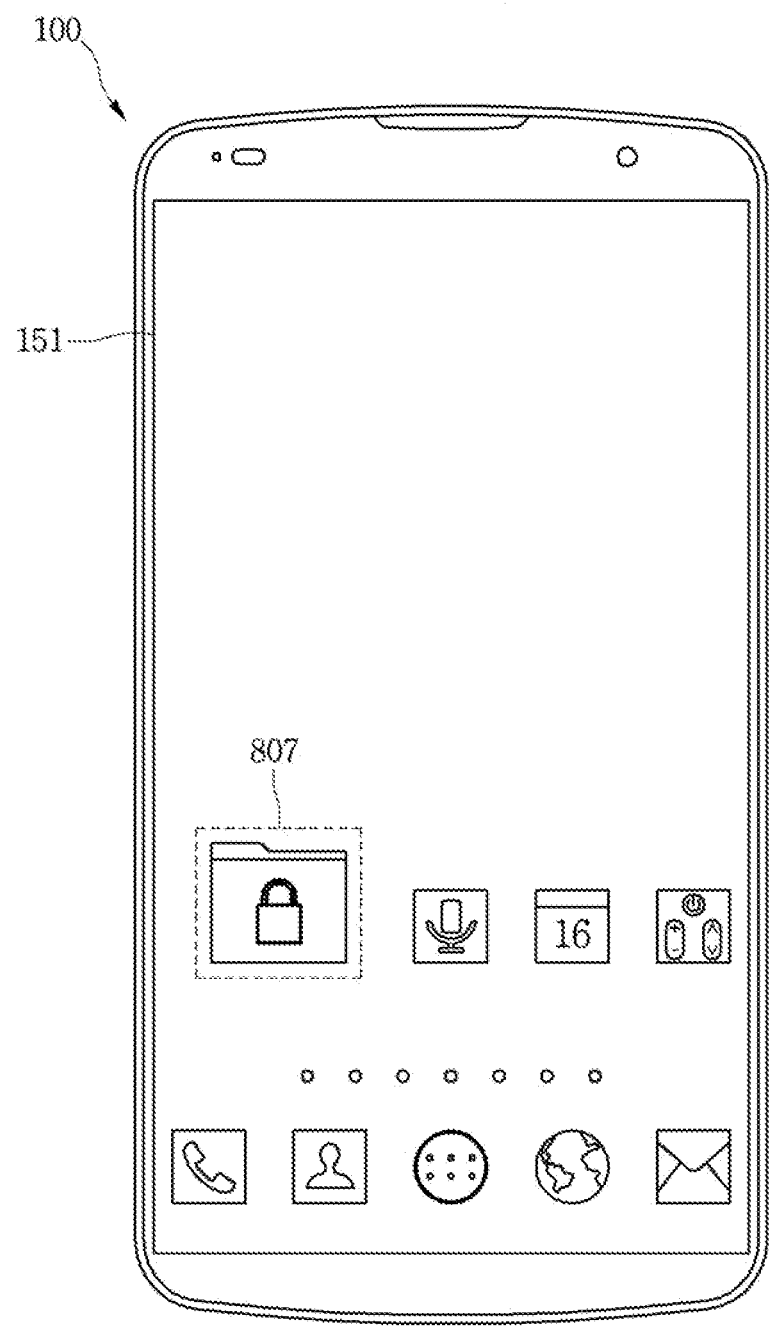

Referring to FIG. 25A, the display unit 151 displays a home screen. On the home screen, a first app icon 801 and a second app icon 803 may be displayed. When a rear touch input is provided to the first and second app icons 801 and 803 at the same time, the controller 180 may generate to display one folder icon 805 including the first and second app icons 801 and 803 as illustrated in FIG. 25B. When an input for gripping two sides of the folder icon 805, the controller 180 may display a lock icon 807 for representing that the folder icon 805 may be locked and the folder icon 805 is locked as illustrated in FIG. 25C.

Figure 25D:
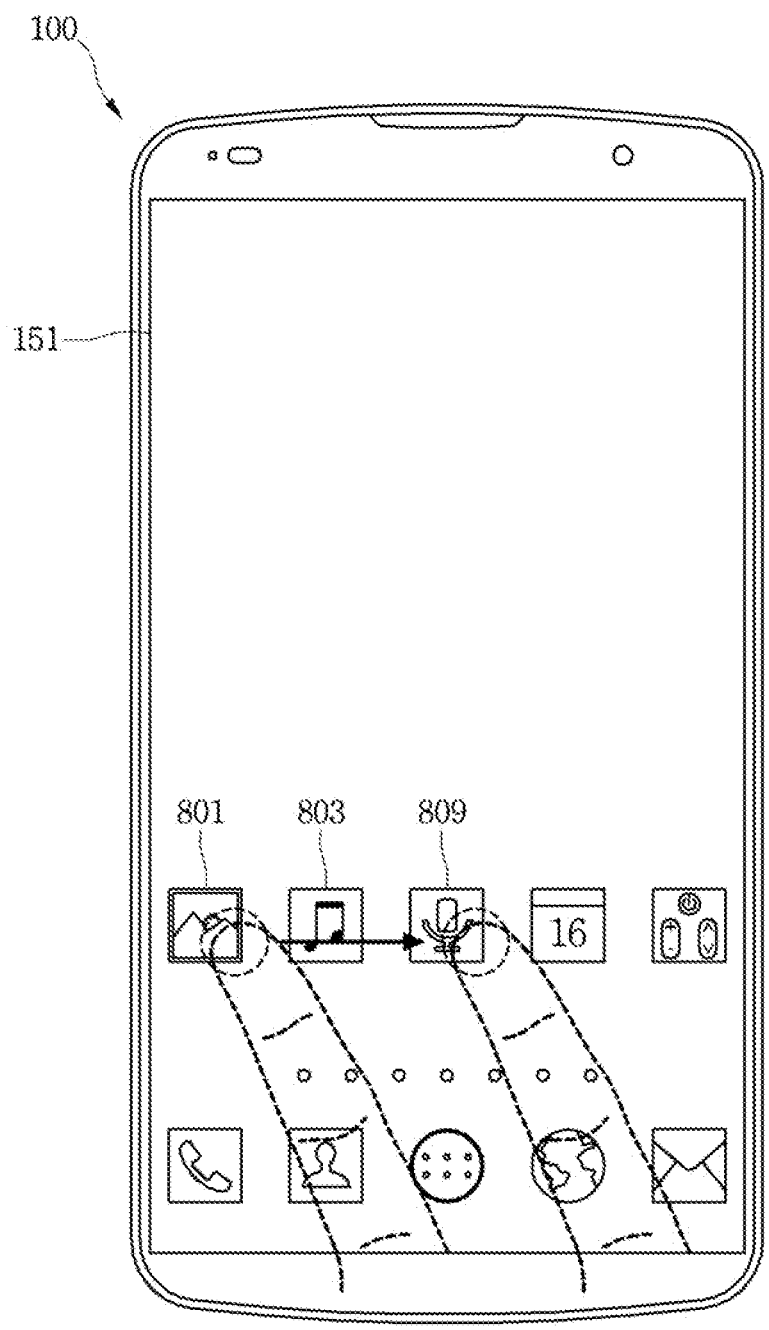
Figure 25E:
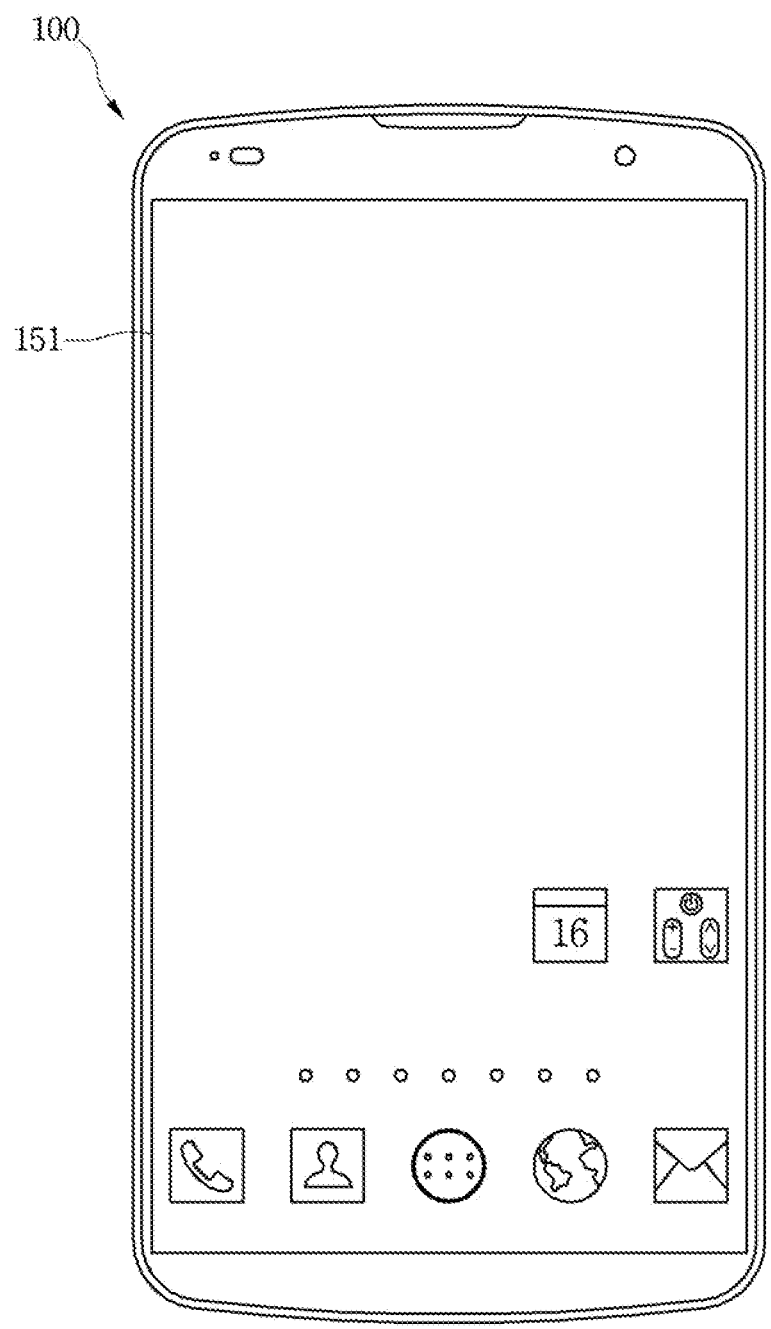

Referring to FIG. 25D, the controller 180 may receive an input for touching the rear side of the first app icon 801 and dragging the rear touch toward the third app icon 809 via the second app icon 803. Accordingly, the controller 180 may delete the first to third app icons 801, 803, and 809 from the home screen as illustrated in FIG. 25E.

FIGS. 26A to 26E are views for explaining a function executable in response to a rear touch input according to another embodiment.

Figure 26A:
FIGS. 26A, 26B, 26C, 26D and 26E are views for explaining a function executable in response to a rear touch input according to another embodiment.

Referring to FIG. 26A, the display unit 151 displays an execution screen 810 of a contact application. On the execution screen 810 of the contact application, contact information on a plurality of contacts may be displayed.

Figure 26B:
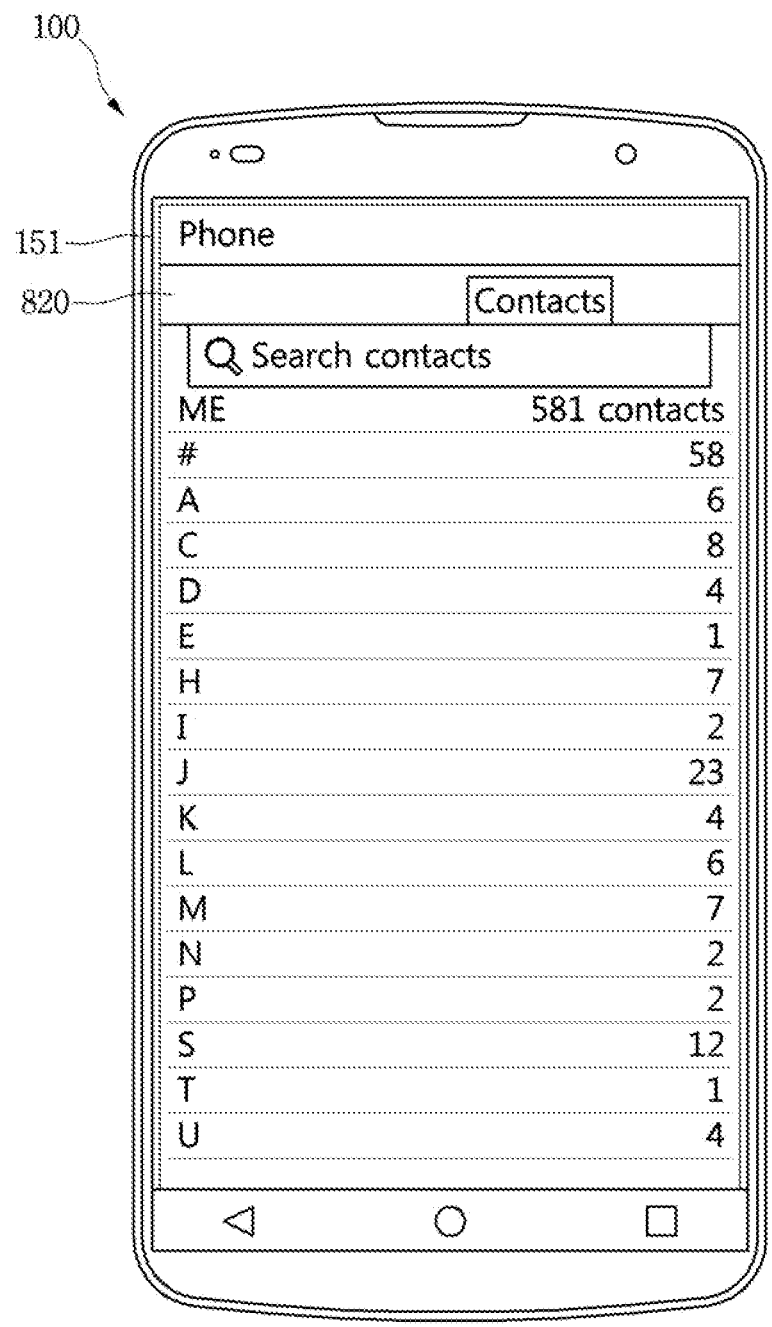

When a touch input is received on the rear side of the execution screen 810 of the contact application and an input for dragging the rear touch input downwardly, the controller 180 may display an index screen 820 including index information that contact information is gathered and arranged in alphabetic order as illustrated in FIG. 26B.

Figure 26C:
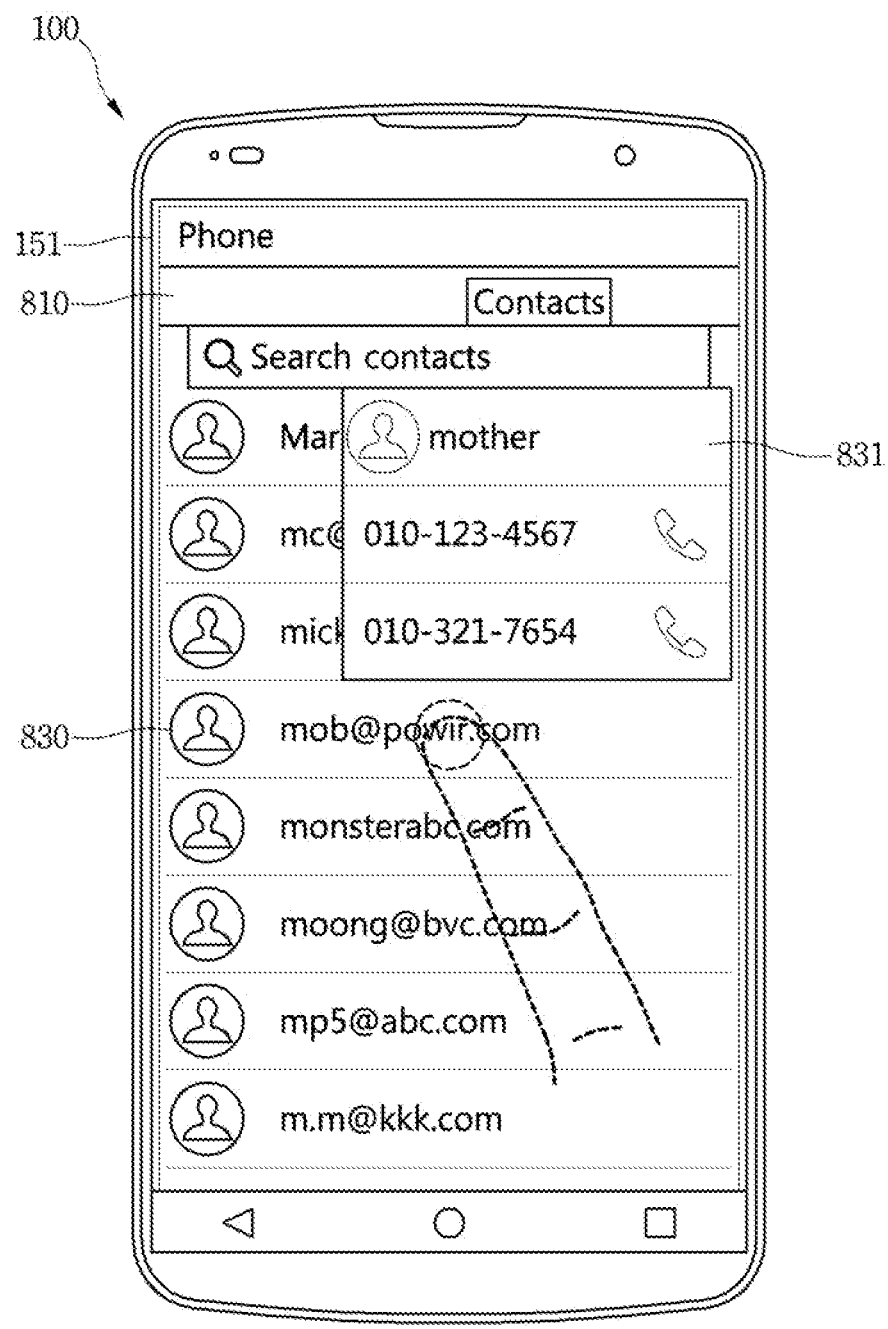

Referring to FIG. 26C, when a rear touch input is received to an contact on the execution screen 810 of the contact application for a predetermined time or longer, the controller 180 may control the display unit 151 to display detailed information 831 on a contact number of the contact corresponding to the contact item 830.

Figure 26D:
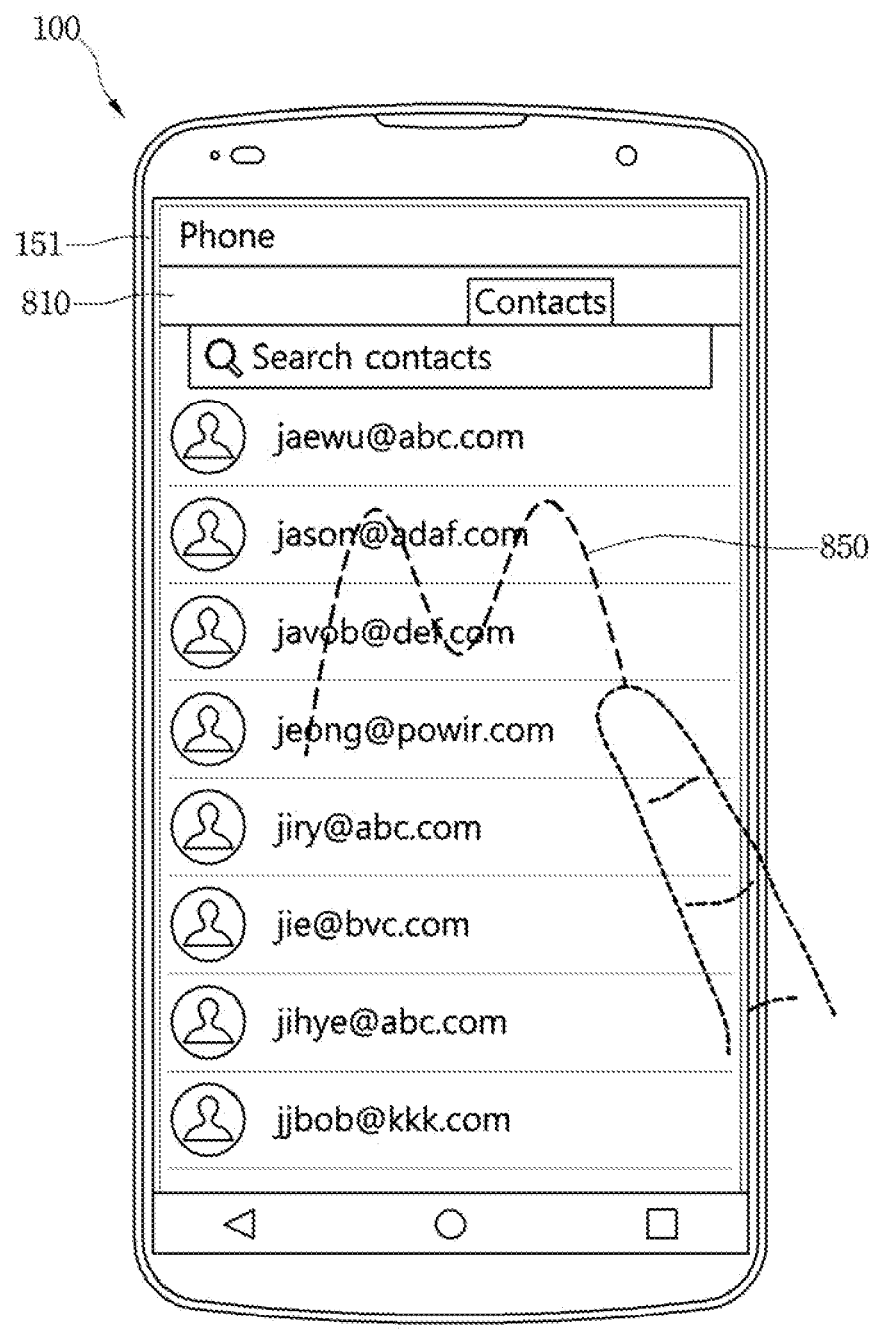
Figure 26E:
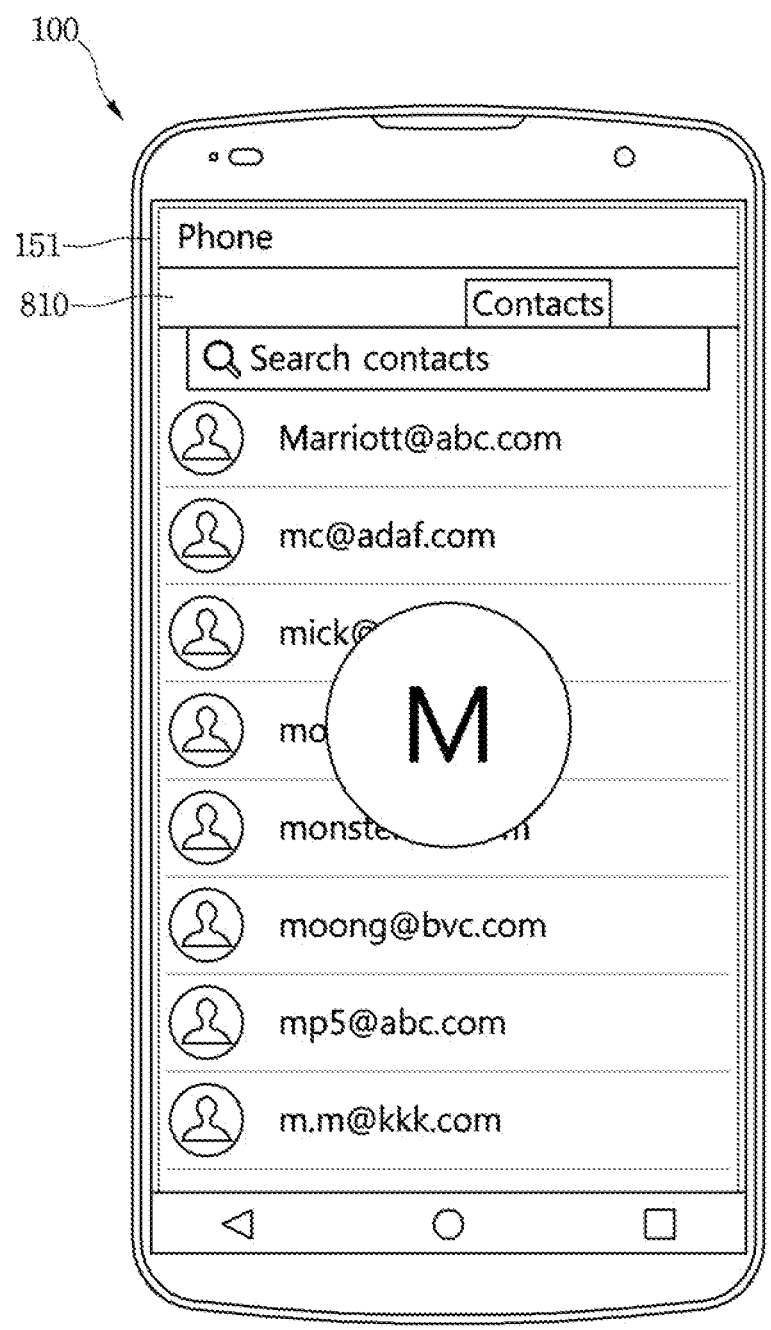

Referring FIG. 26D, when an input for drawing alphabet "M" 850 is received on the rear side of the display unit 151 in a state where the execution screen 810 of the contact application is displayed, the controller 180 may control the display unit 151 to search for and display information on contacts whose name starts with "M" as illustrated in FIG. 26E.

The embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and carrier waves (such as data transmission through the Internet). In addition, the computer may also include the controller 180 of the terminal.

According to at least one of the above described embodiments, a user may perform more diverse functions through the front and rear sides of a transparent display device.

In addition, the user may easily check desired information by performing operations for gripping and unfolding two sides of a display unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transparent display device comprising:
    a transparent display unit configured display information; and
    a controller configured to:
    receive a first input for touching a point on a front side of the display unit and a point on a rear side of the display unit;
    receive a second input for moving the touched point on the front side of the display unit in a first direction and moving the touched point on the rear side of the display unit in a second direction;
    control the display unit to display a plurality of first type objects according to the received second input;
    receive a third input for moving the touched point on the front side of the display unit in the second direction and moving the touched point on the rear side of the display unit in the first direction; and control the display unit to display a plurality of second type of objects according to the received third input.

2. The display device according to claim 1, wherein the controller is further configured to:
receive a fourth input for touching one of the displayed plurality of first type objects on both the front side of the display unit and the rear side of the display unit;
receive a fifth input for moving the touched point on the front side of the display unit in the first direction and moving the touched point on the rear side of the display unit in the second direction; and
control the display unit to display a plurality of lower layer objects according to the received fifth input, the plurality of lower layer objects related to the touched one of the displayed plurality of first type objects.

3. The display device according to claim 2, wherein:
the touched one of the displayed plurality of first type objects corresponds to a screen of a recently accessed web site; and
each of the displayed plurality of lower layer objects corresponds to a screen previously accessed via the web site.

4. The display device according to claim 1, wherein the controller is further configured to:
receive a sixth input for touching two of the displayed plurality of first type objects on both the front side of the display unit and the rear side of the display unit;
receive an input for moving the touched point on the front side of the display unit in the first direction and moving the touched point on the rear side of the display unit in the second direction; and
control the display unit to change an arrangement of the displayed plurality of first type objects according to the received input.

5. The display device according to claim 4, wherein the controller is further configured to control the display unit to adjust an interval between the displayed plurality of first type objects according to the received seventh input.

6. The display device according to claim 1, wherein the controller is further configured to:
receive an eighth input for touching two of the displayed plurality of first type objects on both the front side of the display unit and the rear side of the display unit; and
control the display unit to display a first execution screen and a second execution screen in response to the received eighth input, the first execution screen corresponding to one of the touched two of the plurality of first type objects and the second execution screen corresponding to the other of the touched two of the plurality of the first type objects.

7. The display device according to claim 1, wherein the plurality of displayed first type objects are related to information displayed on the display unit prior to receiving the first input.

8. The display device according to claim 7, wherein:
the first input and the second input are received when a home screen is displayed on the display unit; and
each of the displayed plurality of first type objects corresponds to either an execution screen of a recently executed application or an execution screen of an application registered as a favorite.

9. A method of operating a transparent display device comprising a transparent display unit, the method comprising:
receiving a first for touching a point on a front side of the display unit and a point on a rear side of the display unit;
receiving a second input for moving the touched point on the front side of the display unit in a first direction and moving the touched point on the rear side of the display unit in a second direction;
displaying a plurality of first type objects according to the received second input;
receiving a third input for moving the touched point on the front side of the display unit in the second direction and moving the touched point on the rear side of the display unit in the first direction; and
displaying a plurality of second type of objects according to the received third input.

10. The method according to claim 9, further comprising:
receiving a fourth input for touching one of the displayed plurality of first type objects on both the front side of the display unit and the rear side of the display unit;
receiving a fifth input for moving the touched point on the front side of the display unit in the first direction and moving the touched point on the rear side of the display unit in the second direction; and
displaying a plurality of lower layer objects according to the received fifth input, the plurality of lower layer objects related to the touched one both of the displayed plurality of first type objects.

11. The method according to claim 10, wherein:
the touched one of the displayed plurality of first type objects corresponds to a screen of a recently accessed web site; and
each of the displayed plurality of lower layer objects corresponds to a screen previously accessed via the web site.

12. The method according to claim 9, further comprising:
receiving a sixth input for touching two of the displayed plurality of first type objects on both the front side of the display unit and the rear side of the display unit;
receiving a seventh input for moving the touched point on the front side of the display unit in the first direction and moving the touched point on the rear side of the display unit in the second direction; and
changing an arrangement of the displayed plurality of first type objects according to the received seventh input.

13. The method according to claim 12, further comprising adjusting an interval between the displayed plurality of first type objects according to the received seventh input.

14. The method according to claim 9, further comprising:
receiving an eighth input for touching two of the displayed plurality of first type objects on both the front side of the display unit and the rear side of the display unit; and
displaying a first execution screen and a second execution screen in response to the received eighth input, the first execution screen corresponding to one of the touched two of the plurality of first type objects and the second execution screen corresponding to the other of the touched two of the plurality of first type objects.

15. The method according to claim 9, wherein the displayed plurality of first type objects are related to information displayed on the display unit prior to receiving the first input.

16. The transparent display device according to claim 7, wherein:
the first input and the second input are received when a home screen is displayed on the display unit; and
each of the displayed plurality of first type objects corresponds to either an execution screen of a recently executed application or an execution screen of an application registered as a favorite.

* * * * *